US010009170B2

(12) United States Patent
Lee et al.

(10) Patent No.: US 10,009,170 B2
(45) Date of Patent: Jun. 26, 2018

(54) APPARATUS AND METHOD FOR PROVIDING FEISTEL-BASED VARIABLE LENGTH BLOCK CIPHER

(71) Applicant: ELECTRONICS AND TELECOMMUNICATIONS RESEARCH INSTITUTE, Daejeon (KR)

(72) Inventors: Jung Keun Lee, Daejeon (KR); Bonwook Koo, Daejeon (KR); Dongyoung Roh, Daejeon (KR); Woo-Hwan Kim, Daejeon (KR); Daesung Kwon, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 369 days.

(21) Appl. No.: 14/810,705

(22) Filed: Jul. 28, 2015

(65) Prior Publication Data
US 2016/0056954 A1 Feb. 25, 2016

(30) Foreign Application Priority Data

Aug. 20, 2014 (KR) .......................... 10-2014-0108236

(51) Int. Cl.
*H04L 9/06* (2006.01)
*H04L 9/08* (2006.01)

(52) U.S. Cl.
CPC .......... *H04L 9/0625* (2013.01); *H04L 9/0861* (2013.01); *H04L 2209/24* (2013.01)

(58) Field of Classification Search
CPC . H04L 9/0625; H04L 9/0861; H04L 2209/24; H04L 2209/12; H04L 2209/20;
(Continued)

(56) References Cited

U.S. PATENT DOCUMENTS

2006/0147040 A1 7/2006 Lee et al.
2008/0114981 A1* 5/2008 Hars ....................... G06F 21/64
                                                          713/170
(Continued)

FOREIGN PATENT DOCUMENTS

KR 10-2004-0108311 A 12/2004
KR 10-2007-0013344 A 1/2007
(Continued)

OTHER PUBLICATIONS

Eric Brier et al., "BPS: a Format-Preserving Encryption Proposal," Submission to NIST, Apr. 2010.

*Primary Examiner* — Abiy Getachew
(74) *Attorney, Agent, or Firm* — LRK Patent Law Firm

(57) ABSTRACT

An apparatus and method for providing a Feistel-based variable length block cipher, which are configured to, when plaintext having a certain bit length is encrypted, generate ciphertext having the same bit length as plaintext, and to decrypt ciphertext into plaintext having the same bit length. The apparatus includes an encryption/decryption key generation unit for generating a number of encryption/decryption keys corresponding to a preset number of rounds, based on a secret key, the length of the secret key, the length of plaintext, and a round constant; an encryption/decryption tweak generation unit for generating an encryption/decryption tweak based on a tweak, a length of tweak, and the length of plaintext; and a ciphertext output unit for outputting ciphertext having length identical to that of plaintext, based on plaintext, the length of the plaintext, the length of the secret key, the encryption/decryption keys, and the encryption/decryption tweak.

8 Claims, 46 Drawing Sheets

(58) Field of Classification Search
CPC ... H04L 9/0618; H04L 9/0681; G06F 21/602; G06F 21/606; G06F 21/6218; G06F 2221/2107
See application file for complete search history.

(56) References Cited

U.S. PATENT DOCUMENTS

2010/0008498 A1* 1/2010 Shirai .................... H04L 9/002
380/44
2010/0111297 A1 5/2010 Pauker et al.

FOREIGN PATENT DOCUMENTS

KR 10-1315683 B1 12/2013
WO 2008/084966 A1 7/2008

* cited by examiner

| $K_L[0]$=MK[0] | MK[0] | $K_R[0]$=0 |
|---|---|---|
| $K_L[1]$=MK[1] | MK[1] | $K_R[1]$=0 |
| $K_L[2]$=MK[2] | MK[2] | $K_R[2]$=0 |
| $K_L[3]$=MK[3] | MK[3] | $K_R[3]$=0 |
| $K_L[4]$=MK[4] | MK[4] | $K_R[4]$=0 |
| $K_L[5]$=MK[5] | MK[5] | $K_R[5]$=0 |
| $K_L[6]$=MK[6] | MK[6] | $K_R[6]$=0 |
| $K_L[7]$=MK[7] | MK[7] | $K_R[7]$=0 |
| $K_L[8]$=MK[8] | MK[8] | $K_R[8]$=0 |
| $K_L[9]$=MK[9] | MK[9] | $K_R[9]$=0 |
| $K_L[10]$=MK[10] | MK[10] | $K_R[10]$=0 |
| $K_L[11]$=MK[11] | MK[11] | $K_R[11]$=0 |
| $K_L[12]$=MK[12] | MK[12] | $K_R[12]$=0 |
| $K_L[13]$=MK[13] | MK[13] | $K_R[13]$=0 |
| $K_L[14]$=MK[14] | MK[14] | $K_R[14]$=0 |
| $K_L[15]$=MK[15] | MK[15] | $K_R[15]$=0 |

FIG. 3

| LENGTH OF SECRET KEY | 128 BITS | 192 BITS | 256 BITS |
|---|---|---|---|
| NUMBER OF ROUNDS A | 12 | 14 | 16 |

FIG. 6

| I | $RCA_i$ |
|---|---|
| 1 | 0x71366FBD8EEF2E7D |
| 2 | 0x9063FF208A85D13F |
| 3 | 0xFDB54B3C9A86CB08 |
| 4 | 0xF2EA772BE55E4DE0 |
| 5 | 0x7C8814F95B9F8D0B |
| 6 | 0xEB21FBFFCCBB8DF5 |

FIG. 7

| I | $RCA_i$ |
|---|---|
| 1 | 0xD2F928B5C6C08B51 |
| 2 | 0x4CBE190CDCC2962C |
| 3 | 0xD0A2A85F772C8A07 |
| 4 | 0xE3FB1D49F5932802 |
| 5 | 0x047117EEE8007DFE |
| 6 | 0x4390E40073A64C7D |
| 7 | 0xEE9FAB45168DDADC |

FIG. 8

| I | $RCA_i$ |
|---|---|
| 1 | 0x8F1C67DA8E609269 |
| 2 | 0x9B705F1835E0CDDC |
| 3 | 0x6BF524A08A50A621 |
| 4 | 0x6B3C821900ADAB39 |
| 5 | 0x1F0EB84F4DE6881C |
| 6 | 0x887FBA6319CBF504 |
| 7 | 0x51547790DD0B8145 |
| 8 | 0xAD7C1F118CA88090 |

FIG. 9

| ROW | \multicolumn{16}{c}{COLUMN} |
| | 0 | 1 | 2 | 3 | 4 | 5 | 6 | 7 | 8 | 9 | a | b | c | d | e | f |
|---|---|---|---|---|---|---|---|---|---|---|---|---|---|---|---|---|
| 0 | 62 | 31 | 70 | 8e | bc | 30 | 9c | 78 | e0 | 5c | ce | bb | 42 | ac | b8 | df |
| 1 | 29 | e7 | 86 | 5f | ee | ba | 3f | 87 | c0 | 36 | c3 | 14 | 7c | ec | 73 | da |
| 2 | 57 | 72 | f6 | 77 | 98 | 3b | c5 | c4 | 4c | 52 | 81 | 20 | 15 | 97 | 26 | fc |
| 3 | 8b | 3c | af | 6e | c8 | 7e | f0 | 40 | 24 | a1 | b1 | 54 | ff | ad | 51 | bd |
| 4 | c1 | 13 | 41 | b5 | 6b | 94 | 63 | d6 | de | 6f | 89 | d2 | a9 | d4 | 17 | 38 |
| 5 | a5 | f2 | e3 | db | 47 | 66 | ed | cb | 4e | d5 | 05 | 60 | 8c | 06 | 92 | a3 |
| 6 | be | 68 | 56 | a7 | 80 | 32 | fa | 6c | 8f | 88 | d9 | 50 | 0a | 21 | 3d | 75 |
| 7 | 71 | 01 | e5 | 7a | c6 | b9 | 82 | 64 | d1 | 00 | 7d | 2b | a0 | 1a | 5e | f5 |
| 8 | 35 | 90 | 2f | 2a | 83 | 49 | 5a | a8 | d8 | 8d | 46 | 96 | dc | b0 | c9 | dd |
| 9 | cd | 65 | 44 | c7 | 43 | 67 | 55 | eb | e1 | 9d | 34 | 74 | b3 | 4a | ca | d7 |
| a | 79 | bf | f7 | 99 | 6a | 2d | ef | 85 | e2 | 5d | fe | 11 | 0f | 19 | cc | e4 |
| b | 58 | 09 | 8a | 1b | 6d | 91 | 9f | 4b | 61 | 2c | 2e | cf | 27 | 10 | 18 | b7 |
| c | 1d | 0c | 9b | 39 | 7f | d3 | 84 | a4 | f9 | 76 | 33 | f4 | f3 | d0 | 07 | 0e |
| d | 22 | 1f | fd | 25 | 12 | 08 | 1e | 4d | b6 | b4 | 53 | 37 | e8 | b2 | 9e | 93 |
| e | 02 | e9 | f1 | 3a | 0b | fb | 45 | 69 | ea | f8 | c2 | 1c | 04 | 59 | 03 | 48 |
| f | 16 | a2 | 4f | 3e | 9a | 23 | aa | ae | 5b | e6 | 95 | ab | 7b | 0d | 28 | a6 |

FIG. 10

$$\begin{bmatrix} Y_0 \\ Y_1 \\ Y_2 \\ Y_3 \\ Y_4 \\ Y_5 \\ Y_6 \\ Y_7 \end{bmatrix} = \begin{bmatrix} 28 & 1A & 7B & 78 & C3 & D0 & 42 & 40 \\ 1A & 7B & 78 & C3 & D0 & 42 & 40 & 28 \\ 7B & 78 & C3 & D0 & 42 & 40 & 28 & 1A \\ 78 & C3 & D0 & 42 & 40 & 28 & 1A & 7B \\ C3 & D0 & 42 & 40 & 28 & 1A & 7B & 78 \\ D0 & 42 & 40 & 28 & 1A & 7B & 78 & C3 \\ 42 & 40 & 28 & 1A & 7B & 78 & C3 & D0 \\ 40 & 28 & 1A & 7B & 78 & C3 & D0 & 42 \end{bmatrix} \cdot \begin{bmatrix} X_0 \\ X_1 \\ X_2 \\ X_3 \\ X_4 \\ X_5 \\ X_6 \\ X_7 \end{bmatrix}$$

FIG. 11

$$\begin{bmatrix} Y_0 \\ Y_1 \end{bmatrix} = \begin{bmatrix} 1 & 1 \\ 1 & 0 \end{bmatrix} \cdot \begin{bmatrix} X_0 \\ X_1 \end{bmatrix} = \begin{bmatrix} X_0 \oplus X_1 \\ X_0 \end{bmatrix}$$

FIG. 12

| LENGTH OF SECRET KEY | 128 BITS | 192 BITS | 256 BITS |
|---|---|---|---|
| NUMBER OF ROUNDS B | 18 | 21 | 24 |

| I | $RCB_i$ |
|---|---|
| 1 | 0xC9E3B39803F2F6AF |
| 2 | 0x40F343267298B62D |
| 3 | 0x8A0D175B8BAAFA2B |
| 4 | 0xE7B876206DEBAC98 |
| 5 | 0x559552FB4AFA1B10 |
| 6 | 0xED2EAE35C1382144 |
| 7 | 0x27573B291169B825 |
| 8 | 0x3E96CA16224AE8C5 |
| 9 | 0x1ACBDA11317C387E |

FIG. 28

| I | $RCB_i$ |
|---|---|
| 1 | 0xA4198D55053B7CB5 |
| 2 | 0xBE1442D9B7E08DF0 |
| 3 | 0x3D97EEEA5149358C |
| 4 | 0xAA9782D20CC69850 |
| 5 | 0x5071F733039A8ED5 |
| 6 | 0x625C15071EA7BCA1 |
| 7 | 0xCF37D8F11024C664 |
| 8 | 0x86D094E21E74D0A5 |
| 9 | 0x47DF6E91FC91754B |
| 10 | 0x1F0B2F23B88200E7 |
| 11 | 0x29816E82B43E6464 |

FIG. 29

| I | $RCB_i$ |
|---|---|
| 1 | 0x93C7673007E5ED5E |
| 2 | 0x81E6864CE5316C5B |
| 3 | 0x141A2EB71755F457 |
| 4 | 0xCF70EC40DBD75930 |
| 5 | 0xAB2AA5F695F43621 |
| 6 | 0xDA5D5C6B82704288 |
| 7 | 0x4EAE765222D3704A |
| 8 | 0x7D2D942C4495D18A |
| 9 | 0x3597B42262F870FD |
| 10 | 0x73D53787626CC076 |
| 11 | 0x4ADF41D8ECAFEE96 |
| 12 | 0xE59D0F633ACA9195 |

FIG. 30

APPARATUS AND METHOD FOR PROVIDING FEISTEL-BASED VARIABLE LENGTH BLOCK CIPHER

CROSS REFERENCE TO RELATED APPLICATION

This application claims the benefit of Korean Patent Application No. 10-2014-0108236, filed Aug. 20, 2014, which is hereby incorporated by reference in its entirety into this application.

BACKGROUND OF THE INVENTION

1. Technical Field

The present invention generally relates to an apparatus and method for providing a Feistel-based variable length block cipher and, more particularly, to an apparatus and method for providing a Feistel-based variable length block cipher for format-preserving encryption that encrypts data such that ciphertext has the same format as plaintext.

2. Description of the Related Art

In order to preserve the confidentiality of messages, the encryption of messages is essential, and for this, various types of block ciphers, such as Advanced Encryption Standard (AES) and Academy, Research Institute, Agency (ARIA), have been used.

However, in existing block ciphers, the sizes of input/output blocks are preset, so that if specific format data, such as a resident registration number, a card number, or an account number, is encrypted, the format of the data is changed depending on the preset block size. That is, in a database (DB) for storing a resident registration number, a card number, or an account number, ciphertext in which data is encrypted must have a format identical to that of a resident registration number, a card number, or an account number so that the management of ciphertext is facilitated, but existing block ciphers do not support such a format.

Generally, encryption that causes plaintext and ciphertext to have the same format is called Format-Preserving Encryption (FPE). Here, the formats of plaintext and ciphertext may be regarded as domains to which the plaintext and the ciphertext belong.

In this way, technology for converting plaintext belonging to any domain into ciphertext belonging to the same domain includes several methods implemented using block cipher-based operation mode types. However, such typical methods must operate a block cipher 10 or more times to encrypt a piece of data, thus deteriorating efficiency.

Further, to desirably manage a Database Management System (DBMS), there is a need to output ciphertext having the same encoding format when plaintext having a specific encoding format is encrypted.

As related preceding technology, Korean Patent Application Publication No. 2007-0013344 describes encoding-format preserving encryption/decryption using any symmetric key encryption algorithm. However, such technology cannot be applied to normal symmetric key encryption algorithms (such as AES, ARIA and SEED algorithms) other than stream ciphers.

As another related preceding technology, Korean Patent No. 1315683 discloses technology devised to use any symmetric key encryption algorithm, but is disadvantageous in that a symmetric key encryption algorithm is used together with a stream cipher, thus making it possible to forge data.

SUMMARY OF THE INVENTION

Accordingly, the present invention has been made keeping in mind the above problems occurring in the prior art, and an object of the present invention is to provide an apparatus and method for providing a Feistel-based variable length block cipher, which are configured to, when plaintext having a bit length of 8 to 128 is encrypted, generate ciphertext having the same bit length as the plaintext, and to decrypt the ciphertext into plaintext having the same bit length.

Another object of the present invention is to generate data having the same encoding format as a specific encoding format when data having the specific encoding format is encrypted or decrypted using a variable length block cipher.

In accordance with an aspect of the present invention to accomplish the above objects, there is provided an apparatus for providing a Feistel-based variable length block cipher, including an encryption/decryption key generation unit for generating a number of encryption/decryption keys corresponding to a preset number of rounds according to a length of a secret key, based on the secret key, the length of the secret key, a length of plaintext, and a round constant; an encryption/decryption tweak generation unit for generating an encryption/decryption tweak based on a tweak, a length of the tweak, and the length of the plaintext; and a ciphertext output unit for outputting ciphertext having a length identical to that of the plaintext, based on the plaintext, the length of the plaintext, the length of the secret key, the encryption/decryption keys, and the encryption/decryption tweak.

The secret key may be configured via a connection of sub-keys, each having an 8-bit length and have a length corresponding to any one of 128 bits, 192 bits, and 256 bits, and the encryption/decryption key generation unit may include a first encryption/decryption key generation round unit for generating an encryption/decryption key generation round function value based on the secret key and the length of the secret key; and a second encryption/decryption key generation round unit for generating an encryption/decryption key generation round function value based on an encryption/decryption key generation round function value from a previous encryption/decryption key generation round, the length of the secret key, the length of the plaintext, and the round constant.

The tweak may have a fixed bit length, and the encryption/decryption tweak generation unit may generate the encryption/decryption tweak using the tweak and the length of the plaintext, among the tweak, the length of the tweak, and the length of the plaintext, wherein the encryption/decryption tweak includes a first encryption/decryption tweak and a second encryption/decryption tweak.

The ciphertext output unit may include a first encryption round unit for outputting an encryption round function value based on the plaintext and the length of the plaintext; a 2-1-th encryption round unit for outputting an encryption round function value based on an encryption round function value from a previous encryption round, the length of the plaintext, the first encryption/decryption tweak, and the encryption/decryption keys; a 2-2-th encryption round unit for outputting an encryption round function value based on an encryption round function value from a previous encryption round, the length of the plaintext, the second encryption/decryption tweak, and the encryption/decryption keys; and a third encryption round unit for outputting the ciphertext based on an encryption round function value from a previous encryption round and the length of the plaintext, and wherein the encryption/decryption keys that are respectively input to the 2-1-th encryption round unit and to the 2-2-th encryption round unit are different from each other.

The tweak may have a variable bit length, and the encryption/decryption tweak generation unit may generate the encryption/decryption tweak using the tweak and the length of the tweak, among the tweak, the length of the tweak, and the length of the plaintext, wherein the encryption/decryption tweak includes a first encryption/decryption tweak and a second encryption/decryption tweak.

The ciphertext output unit may include a first encryption round unit for outputting an encryption round function value based on the plaintext and the length of the plaintext; a 2-1-th encryption round unit for outputting an encryption round function value based on an encryption round function value from a previous encryption round, the length of the plaintext, and the encryption/decryption keys; a 2-2-th encryption round unit for outputting an encryption round function value based on an encryption round function value from a previous encryption round, the length of the plaintext, the first encryption/decryption tweak, and the encryption/decryption keys; a 2-3-th encryption round unit for outputting an encryption round function value based on an encryption round function value from a previous encryption round, the length of the plaintext, the second encryption/decryption tweak, and the encryption/decryption keys; and a third encryption round unit for outputting the ciphertext based on an encryption round function value from a previous encryption round, the length of the secret key, and the length of the plaintext, wherein the encryption/decryption keys that are respectively input to the 2-1-th encryption round unit, the 2-2-th encryption round unit, and the 2-3-th encryption round unit may be different from each other.

In accordance with another aspect of the present invention to accomplish the above objects, there is provided a method for providing a Feistel-based variable length block cipher, including generating, by an encryption/decryption key generation unit, a number of encryption/decryption keys corresponding to a preset number of rounds according to a length of a secret key, based on the secret key, the length of the secret key, a length of plaintext, and a round constant; generating, by an encryption/decryption tweak generation unit, an encryption/decryption tweak based on a tweak, a length of the tweak, and the length of the plaintext; and outputting, by a ciphertext output unit, ciphertext having a length identical to that of the plaintext, based on the plaintext, the length of the plaintext, the length of the secret key, the encryption/decryption keys, and the encryption/decryption tweak.

The secret key may be configured via a connection of sub-keys, each having an 8-bit length, and have a length corresponding to any one of 128 bits, 192 bits, and 256 bits, and generating the encryption/decryption keys may include generating an encryption/decryption key generation round function value based on the secret key and the length of the secret key; and generating an encryption/decryption key generation round function value based on an encryption/decryption key generation round function value from a previous encryption/decryption key generation round, the length of the secret key, the length of the plaintext, and the round constant.

The tweak may have a fixed bit length, and generating the encryption/decryption tweak may include generating the encryption/decryption tweak using the tweak and the length of the plaintext, among the tweak, the length of the tweak, and the length of the plaintext, wherein the encryption/decryption tweak includes a first encryption/decryption tweak and a second encryption/decryption tweak.

Outputting the ciphertext may include outputting an encryption round function value based on the plaintext and the length of the plaintext; outputting an encryption round function value based on an encryption round function value from a previous encryption round, the length of the plaintext, the first encryption/decryption tweak, and the encryption/decryption keys; outputting an encryption round function value based on an encryption round function value from a previous encryption round, the length of the plaintext, the second encryption/decryption tweak, and the encryption/decryption keys; and outputting the ciphertext based on an encryption round function value from a previous encryption round and the length of the plaintext, wherein the encryption/decryption keys in outputting the encryption round function value based on the encryption round function value from the previous encryption round, the length of the plaintext, the first encryption/decryption tweak, and the encryption/decryption keys, and the encryption/decryption keys in outputting the encryption round function value based on the encryption round function value from the previous encryption round, the length of the plaintext, the second encryption/decryption tweak, and the encryption/decryption keys, are different from each other.

The tweak may have a variable bit length, and generating the encryption/decryption tweak may include generating the encryption/decryption tweak using the tweak and the length of the tweak, among the tweak, the length of the tweak, and the length of the plaintext, wherein the encryption/decryption tweak includes a first encryption/decryption tweak and a second encryption/decryption tweak.

Outputting the ciphertext may include outputting an encryption round function value based on the plaintext and the length of the plaintext; outputting an encryption round function value based on an encryption round function value from a previous encryption round, the length of the plaintext, and the encryption/decryption keys; outputting an encryption round function value based on an encryption round function value from a previous encryption round, the length of the plaintext, the first encryption/decryption tweak, and the encryption/decryption keys; outputting an encryption round function value based on an encryption round function value from a previous encryption round, the length of the plaintext, the second encryption/decryption tweak, and the encryption/decryption keys; and outputting the ciphertext based on an encryption round function value from a previous encryption round, the length of the secret key, and the length of the plaintext, wherein the encryption/decryption keys in outputting the encryption round function value based on the encryption round function value from the previous encryption round, the length of the plaintext, and the encryption/decryption keys; the encryption/decryption keys in outputting the encryption round function value based on the encryption round function value from the previous encryption round, the length of the plaintext, the first encryption/decryption tweak, and the encryption/decryption keys; and the encryption/decryption keys in outputting the encryption round function value based on the encryption round function value from the previous encryption round, the length of the plaintext, the second encryption/decryption tweak, and the encryption/decryption keys, are different from each other.

In accordance with a further aspect of the present invention to accomplish the above objects, there is provided an apparatus for providing a Feistel-based variable length block cipher, including an encryption/decryption key generation unit for generating a number of encryption/decryption keys corresponding to a preset number of rounds according to a length of a secret key, based on the secret key, the length of the secret key, a length of plaintext, and a round constant; an encryption/decryption tweak generation unit for generating an encryption/decryption tweak based on a tweak, a length of the tweak, and the length of the plaintext; and a plaintext reconstruction unit for reconstructing plaintext having a length identical to that of ciphertext, based on the ciphertext, a length of the ciphertext, the length of the secret key, the encryption/decryption keys, and the encryption/decryption tweak.

The tweak may have a fixed bit length, and the encryption/decryption tweak generation unit may generate the encryption/decryption tweak using the tweak and the length of the plaintext, among the tweak, the length of the tweak, and the length of the plaintext, wherein the encryption/decryption tweak includes a first encryption/decryption tweak and a second encryption/decryption tweak.

The plaintext reconstruction unit may include a first decryption round unit for outputting a decryption round function value based on the ciphertext and the length of the ciphertext; a 2-1-th decryption round unit for outputting a decryption round function value based on a decryption round function value from a previous decryption round, the length of the ciphertext, the second encryption/decryption tweak, and the encryption/decryption keys; a 2-2-th decryption round unit for outputting a decryption round function value based on a decryption round function value from a previous decryption round, the length of the ciphertext, the first encryption/decryption tweak, and the encryption/decryption keys; and a third decryption round unit for outputting the plaintext based on a decryption round function value from a previous decryption round and the length of the ciphertext, wherein the encryption/decryption keys that are respectively input to the 2-1-th decryption round unit and to the 2-2-th decryption round unit are different from each other.

The tweak may have a variable bit length, and the encryption/decryption tweak generation unit may generate the encryption/decryption tweak using the tweak and the length of the tweak, among the tweak, the length of the tweak, and the length of the plaintext, wherein the encryption/decryption tweak includes a first encryption/decryption tweak and a second encryption/decryption tweak.

The plaintext reconstruction unit may include a first decryption round unit for outputting a decryption round function value based on the ciphertext, the length of the ciphertext, and the length of the secret key; a 2-1-th decryption round unit for outputting a decryption round function value based on a decryption round function value from a previous decryption round, the length of the ciphertext, the second encryption/decryption tweak, and the encryption/decryption keys; a 2-2-th decryption round unit for outputting a decryption round function value based on a decryption round function value from a previous decryption round, the length of the ciphertext, the first encryption/decryption tweak, and the encryption/decryption keys; a 2-3-th decryption round unit for outputting a decryption round function value based on a decryption round function value from a previous decryption round, the length of the ciphertext, and the encryption/decryption keys; and a third decryption round unit for outputting the plaintext based on a decryption round function value from a previous decryption round and the length of the ciphertext, wherein the encryption/decryption keys that are respectively input to the 2-1-th decryption round unit, the 2-2-th decryption round unit, and the 2-3-th decryption round unit are different from each other.

BRIEF DESCRIPTION OF THE DRAWINGS

The above and other objects, features and advantages of the present invention will be more clearly understood from the following detailed description taken in conjunction with the accompanying drawings, in which:

FIG. 3 is a diagram showing an example of an algorithm used by a first encryption/decryption key generation round unit shown in FIG. 2 to generate encryption/decryption key generation round function values when the length of a secret key is 128 bits;

FIG. 6 is a diagram illustrating the number of rounds applicable to the encryption device shown in FIG. 1;

FIG. 7 is a diagram illustrating a round constant used in second encryption/decryption key generation round units shown in FIG. 2 when the length of a secret key is 128 bits;

FIG. 8 is a diagram illustrating a round constant used in the second encryption/decryption key generation round units shown in FIG. 2 when the length of a secret key is 192 bits;

FIG. 9 is a diagram illustrating a round constant used in the second encryption/decryption key generation round units shown in FIG. 2 when the length of a secret key is 256 bits;

FIG. 10 is a diagram illustrating an 8-bit input/output function used by the encryption/decryption key generation unit and a ciphertext output unit shown in FIG. 1;

FIG. 11 is a diagram illustrating a 64-bit input/output function used by the encryption/decryption key generation unit and the ciphertext output unit shown in FIG. 1;

FIG. 12 is a diagram illustrating a 128-bit input/output function used by the encryption/decryption key generation unit and the ciphertext output unit shown in FIG. 1;

FIG. 28 is a diagram illustrating a round constant that is any constant used by second encryption/decryption key generation round units shown in FIG. 26 when the length of a secret key is 128 bits;

FIG. 29 is a diagram illustrating a round constant that is any constant used by the second encryption/decryption key generation round units shown in FIG. 26 when the length of a secret key is 192 bits;

FIG. 30 is a diagram illustrating a round constant that is any constant used by the second encryption/decryption key generation round units shown in FIG. 26 when the length of a secret key is 256 bits;

DESCRIPTION OF THE PREFERRED EMBODIMENTS

Figure 1:
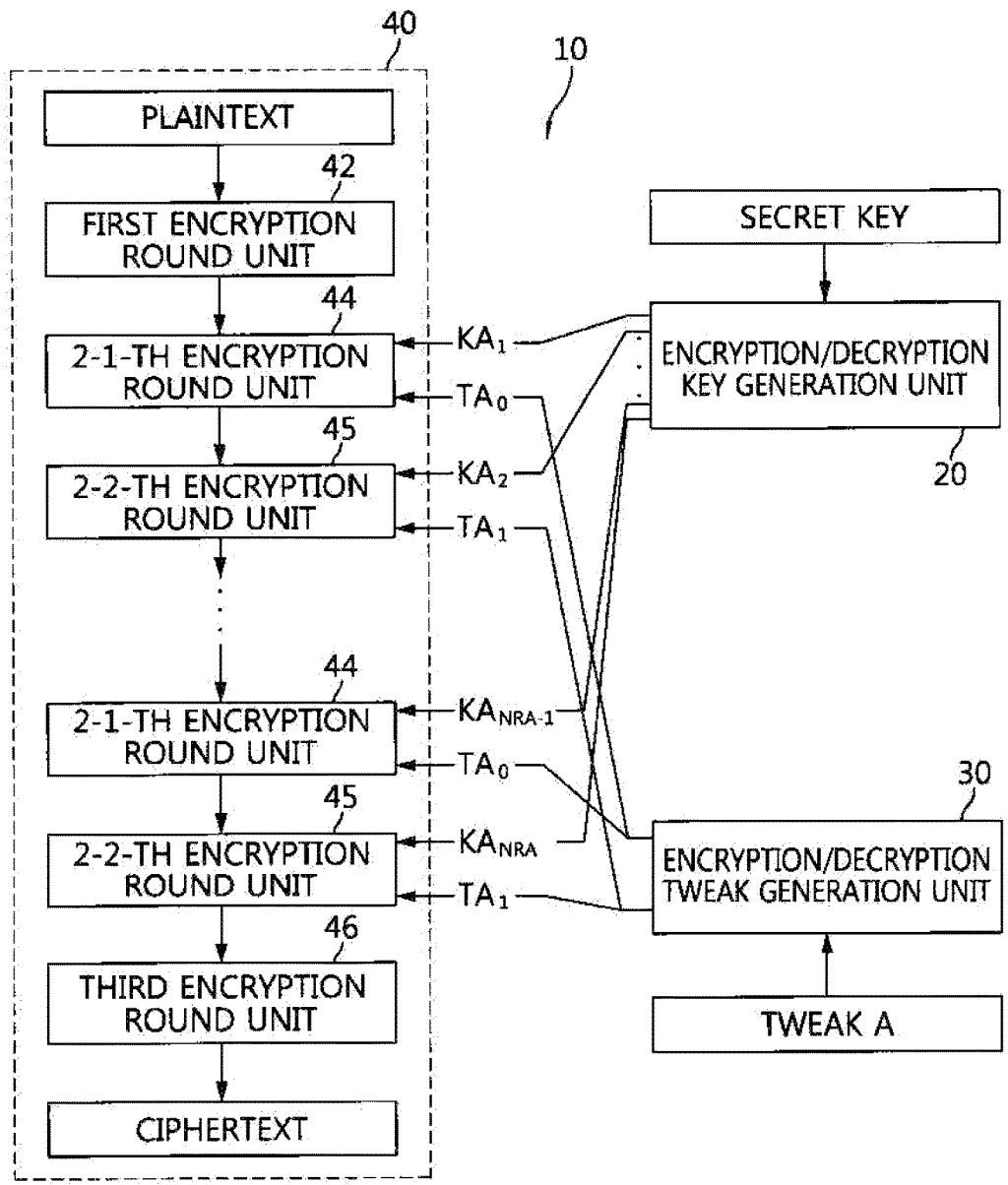
FIG. 1 is a block diagram showing an encryption device in an apparatus for providing a Feistel-based variable length block cipher, which receives a tweak having a fixed bit length, according to an embodiment of the present invention.

The present invention may be variously changed and may have various embodiments, and specific embodiments will be described in detail below with reference to the attached drawings.

However, it should be understood that those embodiments are not intended to limit the present invention to specific disclosure forms and they include all changes, equivalents or modifications included in the spirit and scope of the present invention.

The terms used in the present specification are merely used to describe specific embodiments and are not intended to limit the present invention. A singular expression includes a plural expression unless a description to the contrary is specifically pointed out in context. In the present specification, it should be understood that the terms such as "include" or "have" are merely intended to indicate that features, numbers, steps, operations, components, parts, or combinations thereof are present, and are not intended to exclude a possibility that one or more other features, numbers, steps, operations, components, parts, or combinations thereof will be present or added.

Unless differently defined, all terms used here including technical or scientific terms have the same meanings as the terms generally understood by those skilled in the art to which the present invention pertains. The terms identical to those defined in generally used dictionaries should be interpreted as having meanings identical to contextual meanings of the related art, and are not interpreted as being ideal or excessively formal meanings unless they are definitely defined in the present specification.

Embodiments of the present invention will be described in detail with reference to the accompanying drawings. In the following description of the present invention, the same reference numerals are used to designate the same or similar elements throughout the drawings and repeated descriptions of the same components will be omitted.

Figure 19:
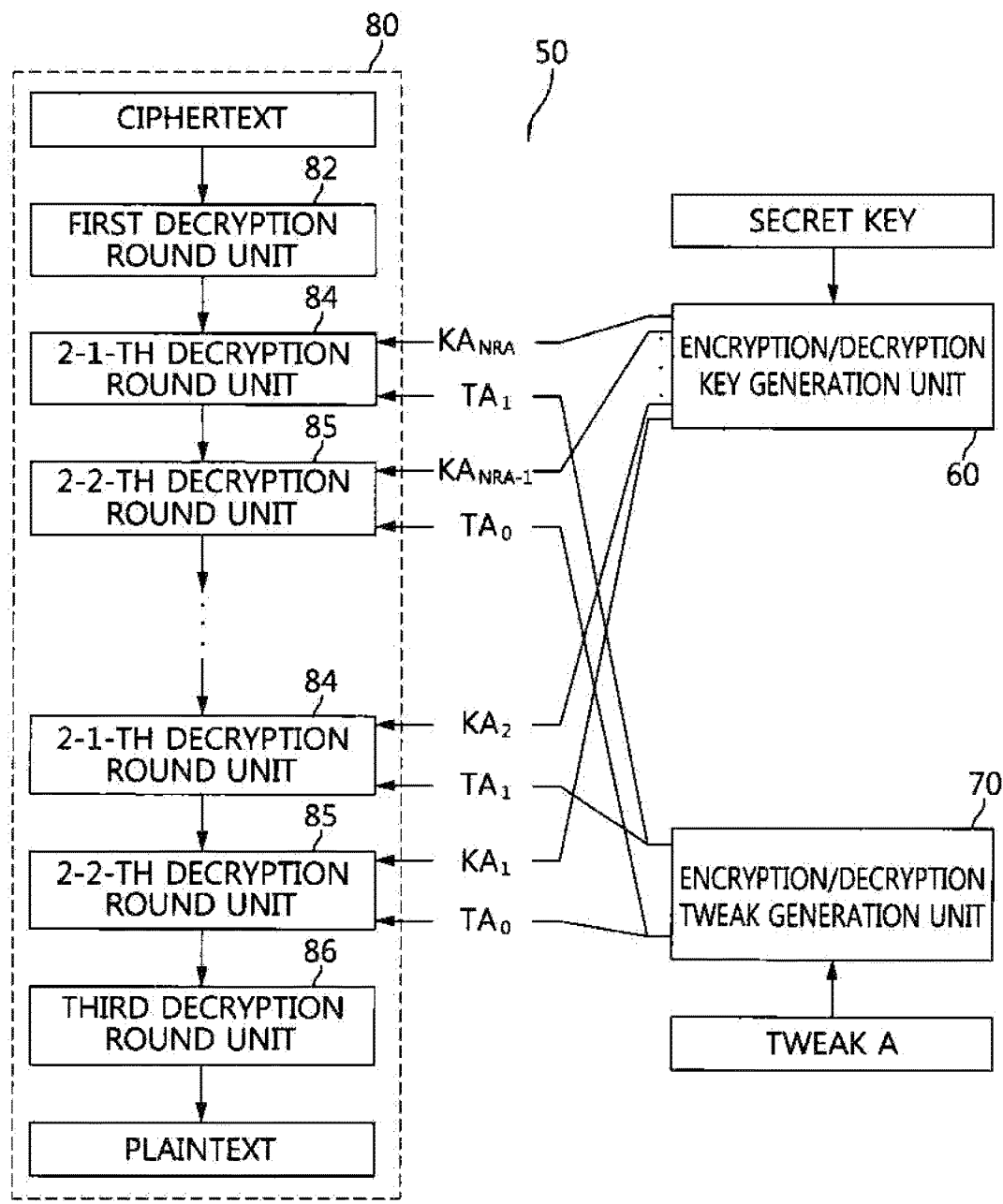
FIG. 19 is a block diagram showing a decryption device in an apparatus for providing a Feistel-based variable length block cipher, which receives a tweak having a fixed bit length, according to an embodiment of the present invention.

An apparatus for providing a Feistel-based variable length block cipher according to an embodiment of the present invention may include the encryption device 10 of FIG. 1 and the decryption device 50 of FIG. 19.

Figure 24:
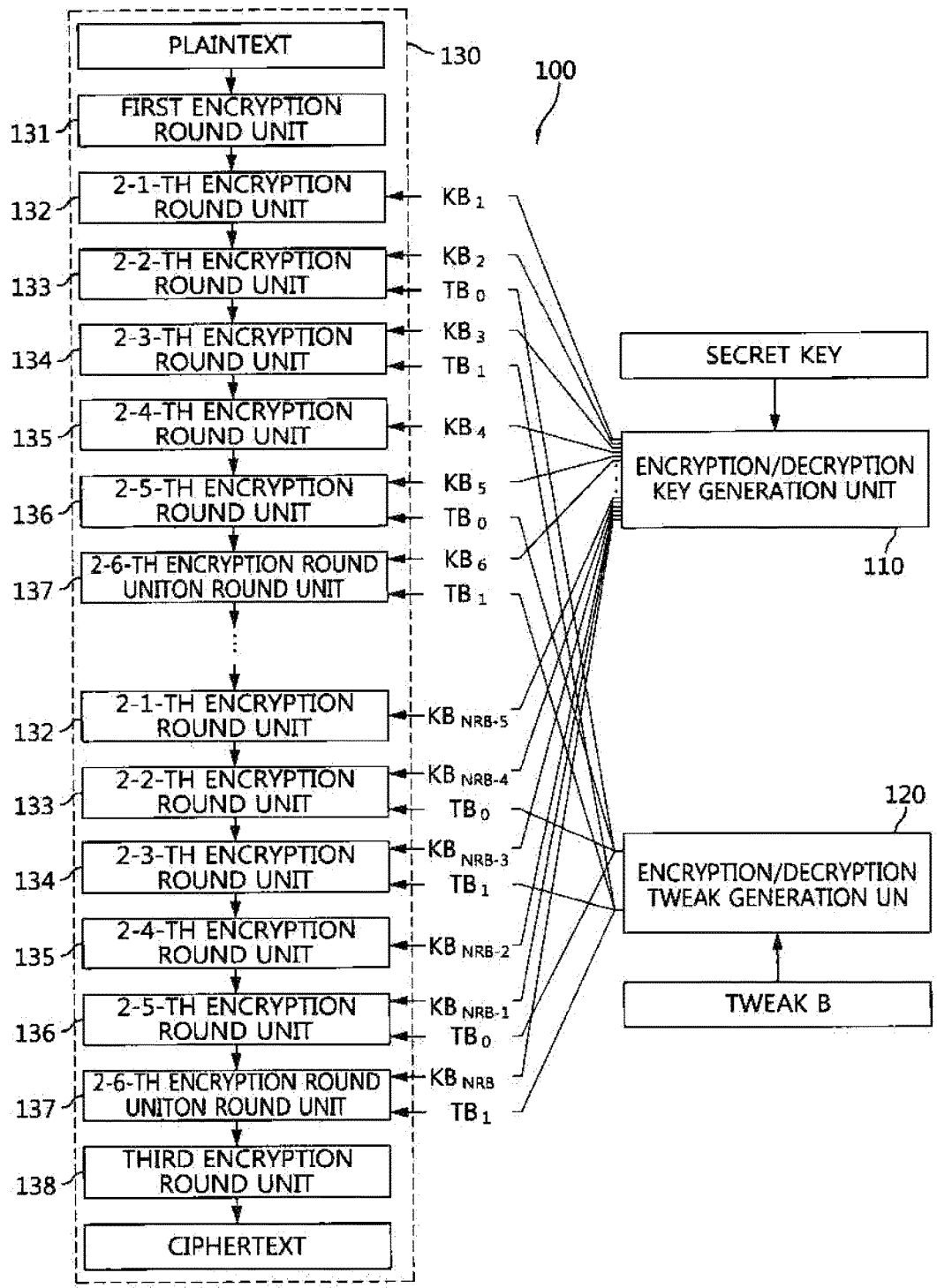
FIG. 24 is a block diagram showing an encryption device in an apparatus for providing a Feistel-based variable length block cipher, which receives a tweak having any bit length, according to an embodiment of the present invention when the length of a secret key is 128 or 256 bits.
Figure 25:
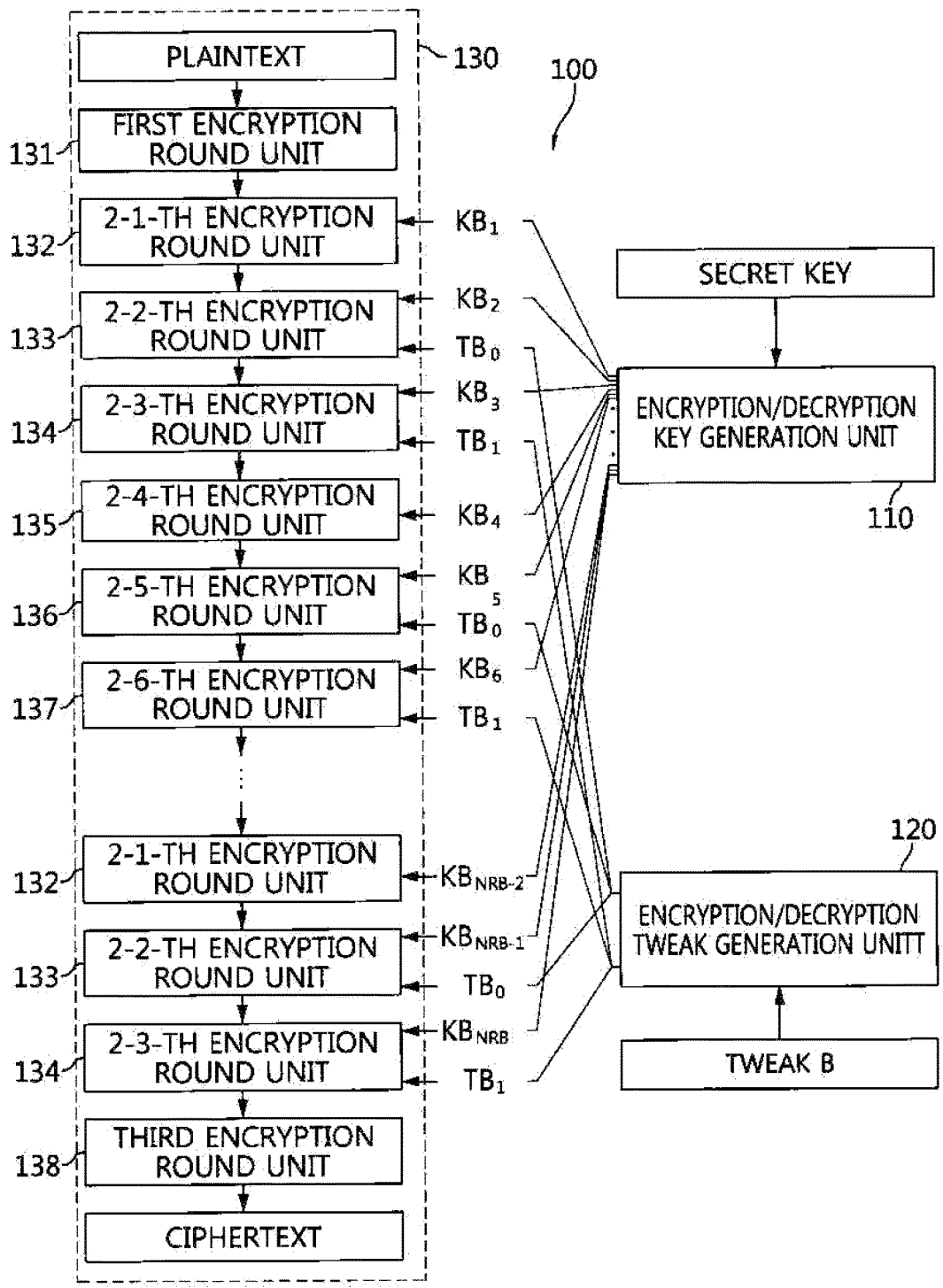
FIG. 25 is a block diagram showing an encryption device in the apparatus for providing a Feistel-based variable length block cipher, which receives a tweak having any bit length, according to an embodiment of the present invention when the length of a secret key is 192 bits.
Figure 42:
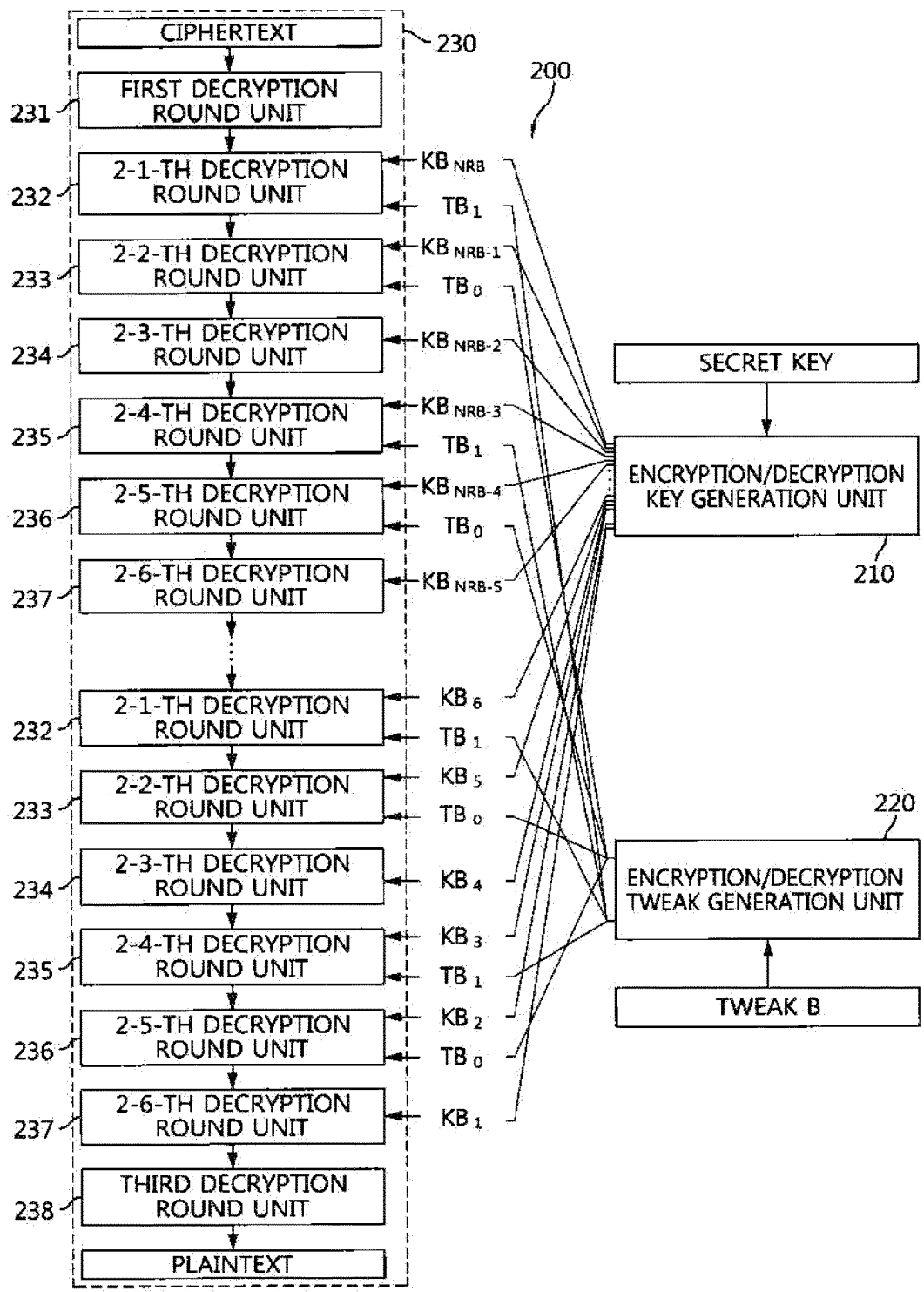
FIG. 42 is a block diagram showing a decryption device in an apparatus for providing a Feistel-based variable length block cipher, which receives a tweak having any bit length, according to an embodiment of the present invention when the length of a secret key is 128 or 256 bits.
Figure 43:
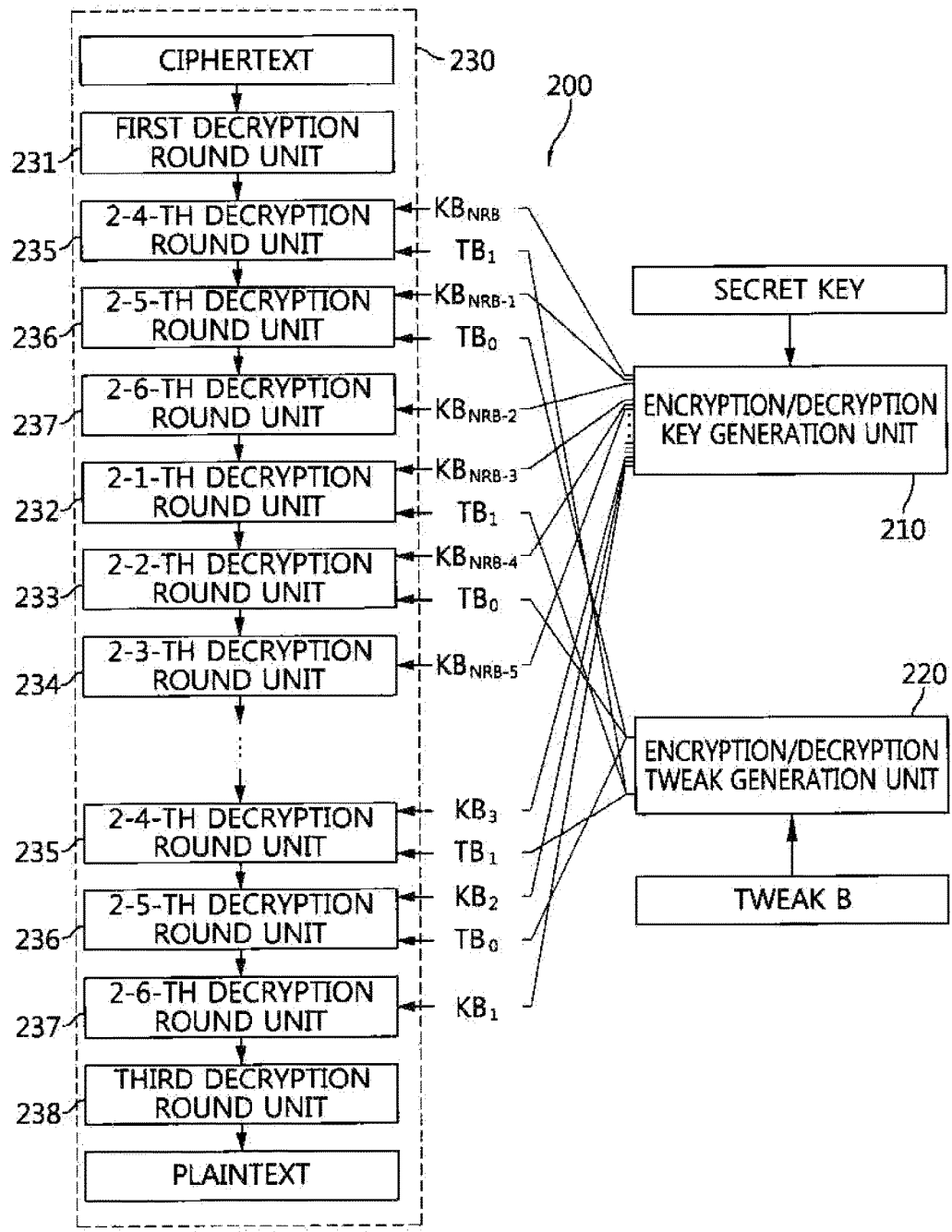
FIG. 43 is a block diagram showing a decryption device in the apparatus for providing a Feistel-based variable length block cipher, which receives a tweak having any bit length, according to an embodiment of the present invention when the length of a secret key is 192 bits.

Meanwhile, an apparatus for providing a Feistel-based variable length block cipher according to another embodiment of the present invention may include the encryption device 100 of FIGS. 24 and 25 and the decryption device 200 of FIGS. 42 and 43.

Below, '⊕ operation' used in each drawing denotes an exclusive OR (XOR) operation. For example, x⊕y denotes an XOR operation on two bit strings or respective bits of two byte strings x and y.

Below, '∥ operation' used in each drawing denotes a connection of bit strings. For example, x∥y denotes a result of connection of two bit strings.

Below, when the length of plaintext (Plen) is given, HL(Plen) and HR(Plen) are defined by the following Equation (1). That is, when k is a natural number and Plen=2k, HL(Plen)=HR(Plen)=k is satisfied. When Plen=2k+1, HL(Plen)=k+1 and HR(Plen)=k are satisfied.

$$HL(Plen) = \lceil Plen/2 \rceil$$

$$HR(Plen) = \lfloor Plen/2 \rfloor \qquad (1)$$

FIG. 1 is a block diagram showing an encryption device of an apparatus for providing a Feistel-based variable length block cipher, which receives a tweak having a fixed bit length, according to an embodiment of the present invention.

An encryption device 10 shown in FIG. 1 includes an encryption/decryption key generation unit 20, an encryption/decryption tweak generation unit 30, and a ciphertext output unit 40.

The encryption/decryption key generation unit 20 generates encryption/decryption keys A ($KA_1, KA_2, \ldots, KA_{NRA}$) using a secret key (Master Key: MK), the length of the secret key (MKlen), the length of plaintext (Plen), and round constants A ($RCA_1, RCA_2, \ldots, RCA_{NRA/2}$).

Figure 2:
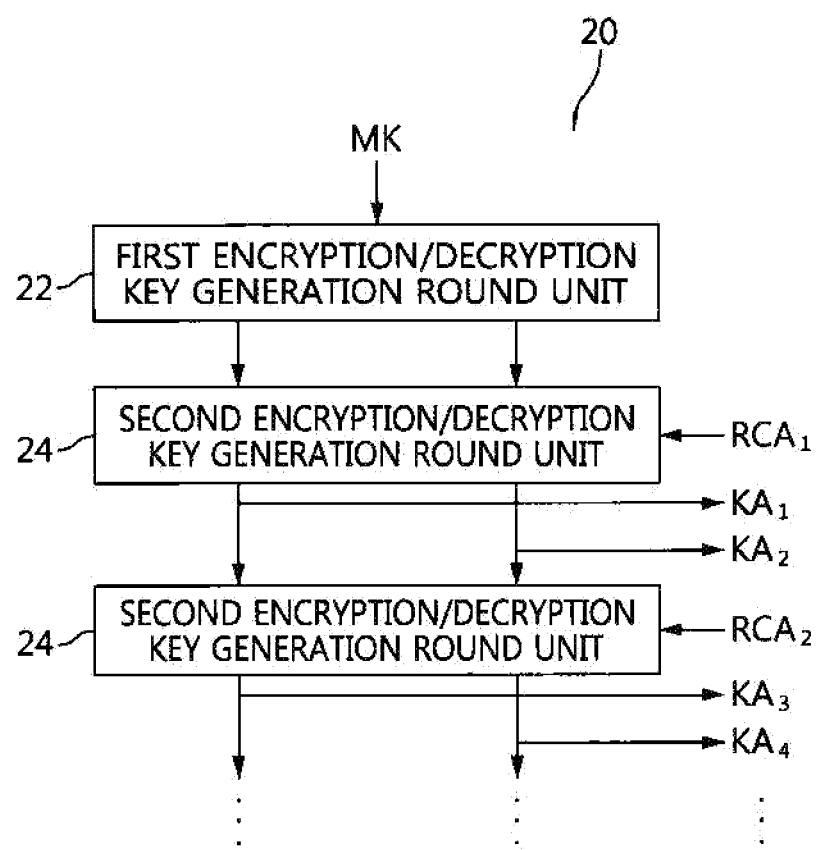
FIG. 2 is an internal configuration diagram showing an encryption/decryption key generation unit shown in FIG. 1.

Below, the internal configuration of the encryption/decryption key generation unit 20 will be described. As shown in FIG. 2, the encryption/decryption key generation unit 20 includes a first encryption/decryption key generation round unit 22, and second encryption/decryption key generation round units 24.

The first encryption/decryption key generation round unit 22 may receive a secret key (MK) and the length of the secret key (MKlen), and generates encryption/decryption key generation round function values ($K_L, K_R$).

Here, the input secret key (MK) may have a length of 128 bits, 192 bits or 256 bits, and may be configured by connecting sub-keys, each having an 8-bit length. For example, the secret key (MK) may be a value having a 128 bit length (MK=MK[0]∥MK[1]∥ . . . ∥MK[15]) configured via a connection of 16 8-bit sub-keys (MK[0], MK[1], . . . , MK[15]), a value having a 192-bit length (MK=MK[0]∥MK[1]∥ . . . ∥ MK[23]) configured via a connection of 24 8-bit sub-keys (MK[0], MK[1], . . . , MK[23]), or a value having a 256-bit length (MK=MK[0]∥MK[1]∥ . . . ∥MK[31]) configured via a connection of 32 8-bit sub-keys (MK[0], MK[1], . . . , MK[31]). The length of the input secret key (MKlen) may be 128, 192 or 256 bits. Further, the output encryption/decryption key generation round function values ($K_L, K_R$) may include $K_L$ and $K_R$, each having a 128-bit length.

An example of an algorithm used by the first encryption/decryption key generation round unit 22 to generate the encryption/decryption key generation round function values ($K_L, K_R$) when the length of the secret key (MKlen)=128 bits will be described in detail with reference to FIG. 3. Referring to FIG. 3, when the length of a secret key (MKlen)=128 bits, the first encryption/decryption key generation round unit 22 receives a secret key (MK=MK[0]∥MK[1]∥ . . . ∥MK[15]) and generates encryption/decryption key generation round function values $K_L$ and $K_R$ by setting $K_L[i]$=MK[i](0≤i≤15) and $K_R[i]$=0(0≤i≤15).

Figure 4:
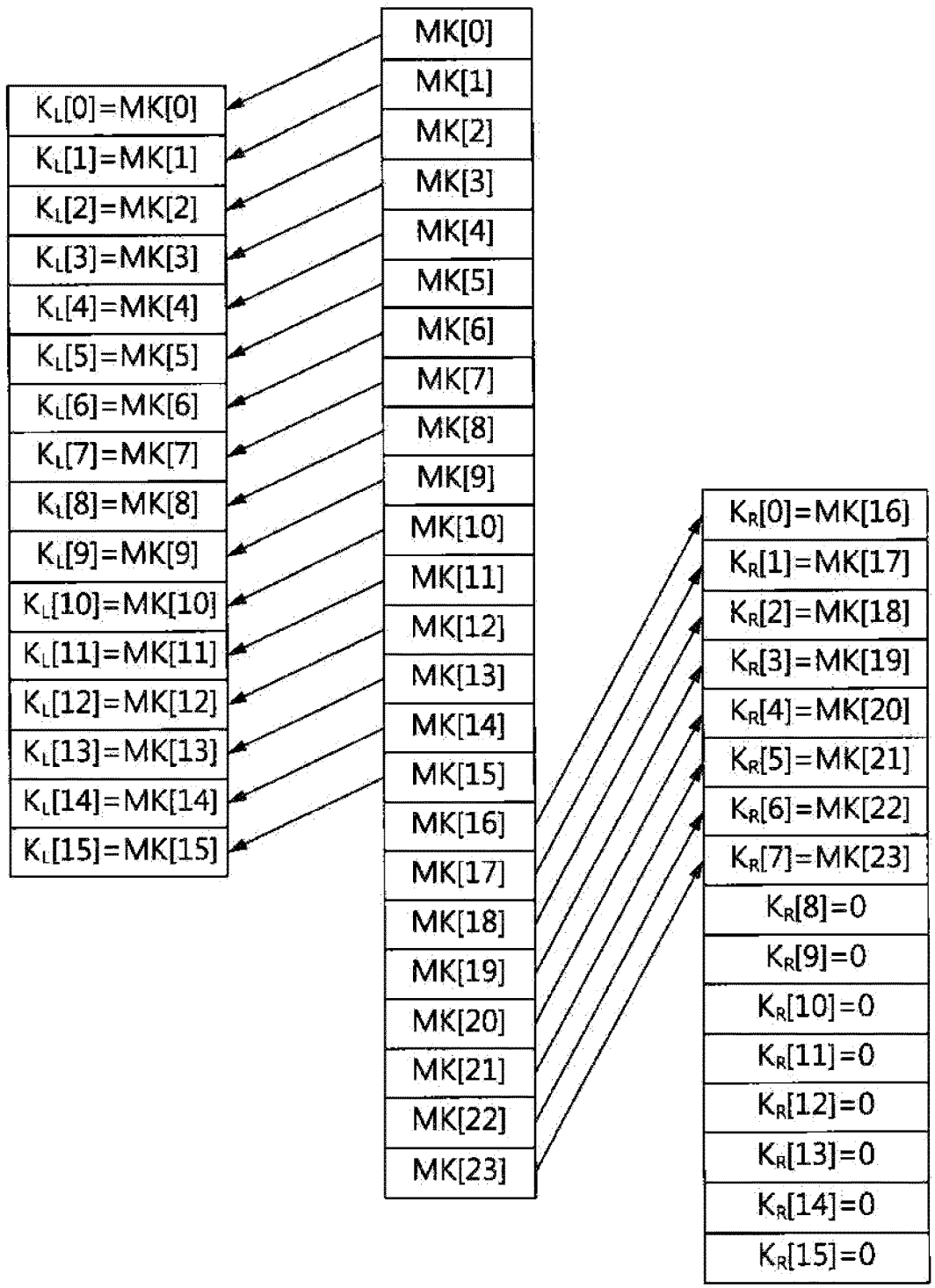
FIG. 4 is a diagram showing an example of an algorithm used by a first encryption/decryption key generation round unit shown in FIG. 2 to generate encryption/decryption key generation round function values when the length of a secret key is 192 bits.

Next, an example of an algorithm used by the first encryption/decryption key generation round unit 22 to generate the encryption/decryption key generation round function values ($K_L, K_R$) when the length of the secret key (MKlen)=192 bits will be described in detail with reference to FIG. 4. Referring to FIG. 4, when the length of the secret key (MKlen)=192 bits, the first encryption/decryption key generation round unit 22 receives a secret key (MK=MK[0]∥MK[1]∥ . . . ∥MK[23]) and generates encryption/decryption key generation round function values $K_L$ and $K_R$ by setting $K_L[i]=MK[i](0≤i≤15)$, $K_R[i]=MK[i+16](0≤i≤7)$, and $K_R[i]=0(8≤i≤15)$.

Figure 5:
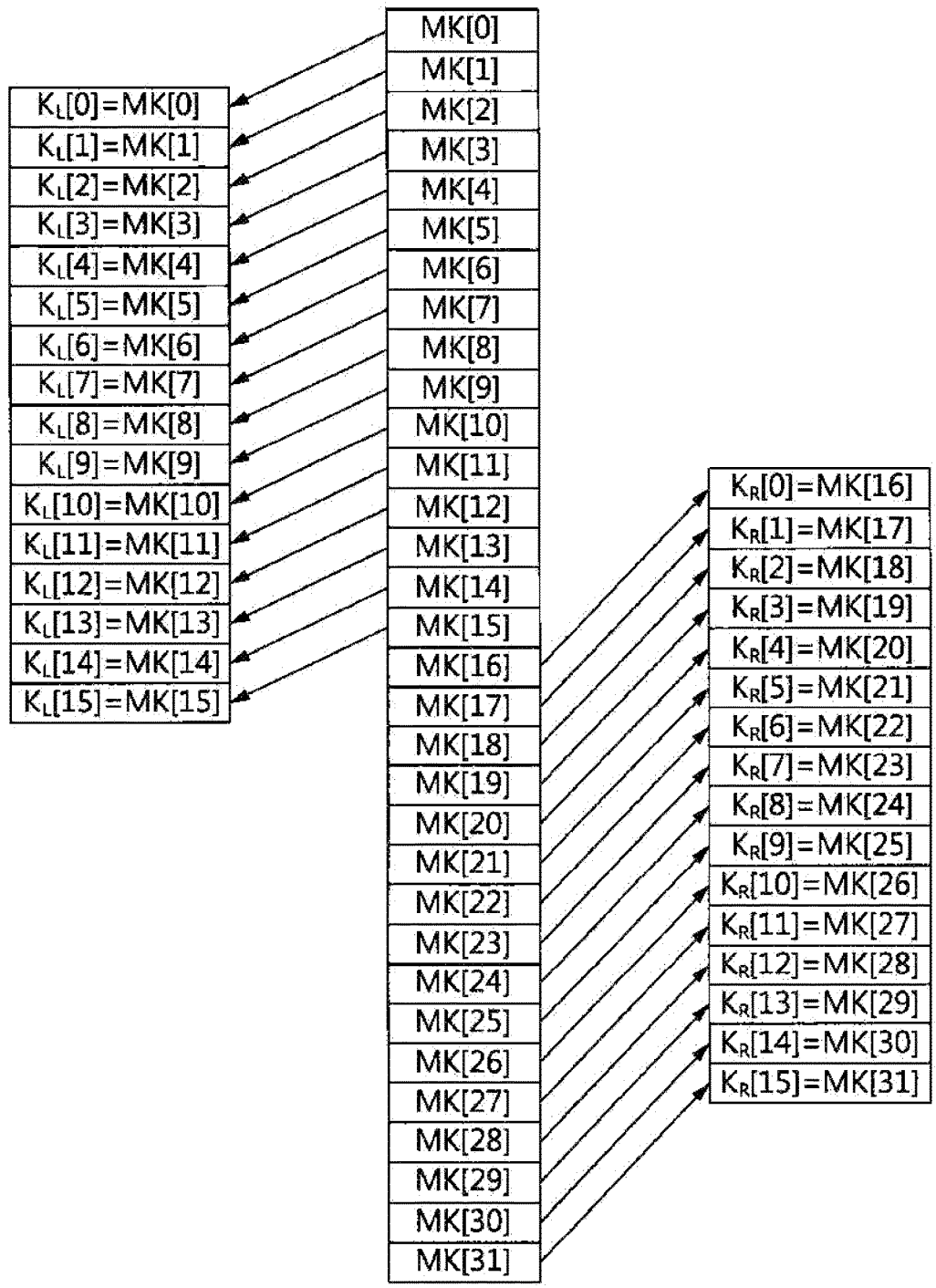
FIG. 5 is a diagram showing an example of an algorithm used by a first encryption/decryption key generation round unit shown in FIG. 2 to generate encryption/decryption key generation round function values when the length of a secret key is 256 bits.

Next, an example of an algorithm used by the first encryption/decryption key generation round unit 22 to generate the encryption/decryption key generation round function values ($K_L$, $K_R$) when the length of the secret key (MKlen)=256 bits will be described in detail with reference to FIG. 5. Referring to FIG. 5, when the length of the secret key (MKlen)=256 bits, the first encryption/decryption key generation round unit 22 receives a secret key (MK=MK[0]∥MK[1]∥ . . . ∥MK[31]), and generates encryption/decryption key generation round function values $K_L$ and $K_R$ by setting $K[i]=MK[i](0≤i≤15)$ and $K_R[i]=MK[i+16](0≤i≤15)$.

The second encryption/decryption key generation round units 24 sequentially receive the encryption/decryption key generation round function values ($K_L$, $K_R$) which are output from a previous encryption/decryption key generation round, the length of the secret key (MKlen), the length of the plaintext (Plen), and round constants A($RCA_1$, $RCA_2$, . . . , $RCA_{NRA/2}$), and output encryption/decryption key generation round function values ($K_L$, $K_R$). Here, the encryption/decryption key generation round function values ($K_L$, $K_R$), which are output from the previous round and are input to the second encryption/decryption key generation round units 24, may include $K_L$ and $K_R$, each having a 128-bit length. The length of the secret key (MKlen) may be 128, 192, or 256 bits. The length of the plaintext (Plen) may have a value ranging from 8 to 128. The round constants A($RCA_1$, $RCA_2$, . . . , $RCA_{NRA/2}$) may include NRA/2 values, each having a 64-bit length. Further, the encryption/decryption key generation round function values ($K_L$, $K_R$) output from the second encryption/decryption key generation round units 24 may include $K_L$ and $K_R$, each having a 128-bit length.

Meanwhile, FIG. 6 illustrates the number of rounds (round number) A(NRA), wherein the number of rounds A (NRA) is preset according to the length of a secret key (MKlen). For example, when the length of the secret key (MKlen) is 128 bits, the number of rounds A(NRA) is set to 12. When the length of the secret key (MKlen) is 192 bits, the number of rounds A (NRA) is set to 14. When the length of the secret key (MKlen) is 256 bits, the number of rounds A(NRA) is set to 16.

In this way, the number of rounds A(NRA) may be preset to a suitable value in consideration of the security of a Feistel-based variable length block cipher algorithm for receiving a tweak having a fixed bit length.

FIG. 7 illustrates round constants A ($RCA_1$, $RCA_2$, . . . , $RCA_6$) used by the second encryption/decryption key generation round units 24 for generating the encryption/decryption key generation round function values ($K_L$, $K_R$) when the length of a secret key (MKlen)=128 bits.

As shown in FIG. 7, when the length of the secret key (MKlen)=128 bits, the round constants A($RCA_1$, $RCA_2$, . . . , $RCA_6$) of the second encryption/decryption key generation round units 24 may be generated by extracting each 64-bit value from the 65-th decimal place of a binary number of $|\cos 16 + \sin 16|/\sqrt{2}$.

FIG. 8 illustrates round constants A ($RCA_1$, $RCA_2$, . . . , $RCA_7$) used by the second encryption/decryption key generation round units 24 for generating the encryption/decryption key generation round function values ($K_L$, $K_R$) when the length of the secret key (MKlen)=192 bits.

As shown in FIG. 8, when the length of the secret key (MKlen)=192 bits, the round constants A($RCA_1$, $RCA_2$, . . . , $RCA_7$) of the second encryption/decryption key generation round units 24 may be generated by extracting each 64-bit value from the 65-th decimal place of a binary number of $|\cos 24 + \sin 24|/\sqrt{2}$.

FIG. 9 illustrates round constants A ($RCA_1$, $RCA_2$, . . . , $RCA_8$) used by the second encryption/decryption key generation round units 24 for generating encryption/decryption key generation round function values ($K_L$, $K_R$) when the length of the secret key (MKlen)=256 bits.

As shown in FIG. 9, when the length of the secret key (MKlen)=256 bits, the round constants A ($RCA_1$, $RCA_2$, . . . , $RCA_8$) of the second encryption/decryption key generation round units 24 may be generated by extracting each 64-bit value from the 65-th decimal place of a binary number of $|\cos 32 + \sin 32|/\sqrt{2}$.

FIG. 10 is a diagram showing an S-bit input/output function S( ) used by the encryption/decryption key generation unit 20 and the ciphertext output unit 40 shown in FIG. 1. Further, the 8-bit input/output function S( ) illustrated in FIG. 10 may be used unchanged by an encryption/decryption key generation unit 60 (see FIG. 19), a plaintext reconstruction unit 80 (see FIG. 19), an encryption/decryption key generation unit 110 (see FIGS. 24 and 25) or 210 (see FIGS. 42 and 43), a ciphertext output unit 130 (see FIGS. 24 and 25), and a plaintext reconstruction unit 230 (see FIGS. 42 and 43).

In this case, the 8-bit input/output function S( ) may be a one-to-one function formed to have properties such as low linear probability, differential probability, and high algebraic degree, in order to guarantee the security of a Feistel-based variable length block cipher.

FIG. 11 is a diagram illustrating a 64-bit input/output function D( ) used by the encryption/decryption key generation unit 20 and the ciphertext output unit 40 shown in FIG. 1. The 64-bit input/output function D( ) illustrated in FIG. 11 may be used unchanged by an encryption/decryption key generation unit 60 (see FIG. 19), a plaintext reconstruction unit 80 (see FIG. 19), an encryption/decryption key generation unit 110 (see FIGS. 24 and 25), or 210 (see FIGS. 42 and 43), a ciphertext output unit 130 (see FIGS. 24 and 25), and a plaintext reconstruction unit 230 (see FIGS. 42 and 43).

Here, the 64-bit input/output function D( ) is defined as a 8×8 Maximum-Distance Separable (MDS) matrix defined in a given finite field $GF(2^8)$ so that the security of a Feistel-based variable length block cipher may be guaranteed using diffusion effects.

When an output value for each 64-bit input value of the 64-bit input/output function D( ) is calculated, a multiplication operation over $GF(2^8)$ is applied. To define such a multiplication operation, an irreducible polynomial $x^8+x^6+x^5+x^4+1$ is used.

In FIG. 11, $X_0∥X_1∥ . . . ∥ X_7$ (each having 8 bits) denotes a 64-bit input value, and $Y_0∥Y_1∥ . . . ∥ Y_7$ (each having 8 bits) denotes a 64-bit output value.

FIG. 12 is a diagram illustrating a 128-bit input/output function σ( ) used by the encryption/decryption key generation unit 20 shown in FIG. 1. Further, the 128-bit input/output function σ( ) illustrated in FIG. 12 may be used unchanged by an encryption/decryption key generation unit 110 (see FIGS. 24 and 25) or 210 (see FIGS. 42 and 43).

Here, $X_0$ and $X_1$ denote upper 64 bits and lower 64 bits of each input having a 128-bit length, and $Y_0$ and $Y_1$ denote upper 64 bits and lower 64 bits of each output having a 128-bit length.

An example of an algorithm used by the second encryption/decryption key generation round units 24 to generate the encryption/decryption key generation round function values ($K_L$, $K_R$) will be described in detail with reference to FIG. 13.

Figure 13:
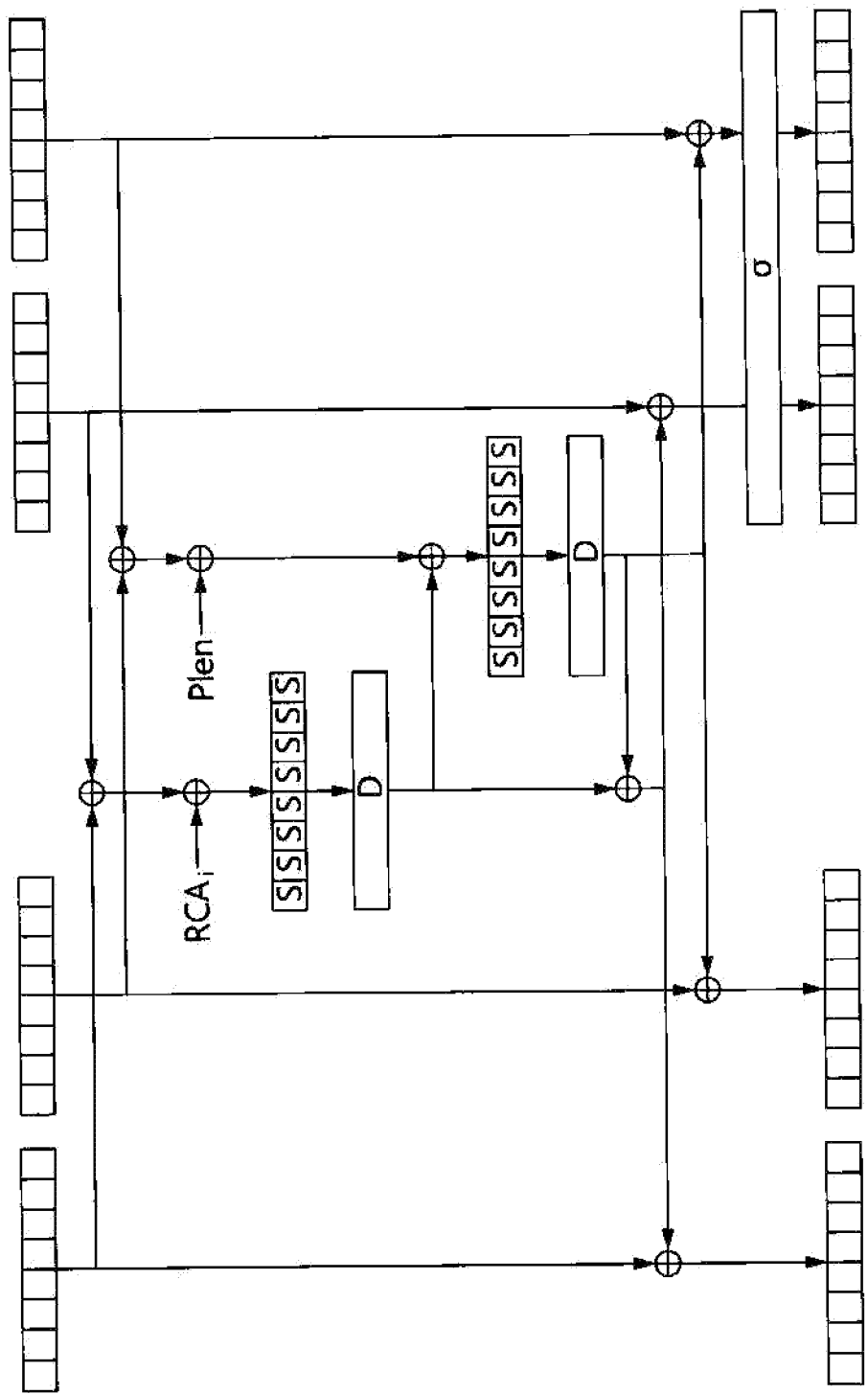
FIG. 13 is a diagram showing an example of an algorithm used by the second encryption/decryption key generation round units shown in FIG. 2 to generate encryption/decryption key generation round function values.

Referring to FIG. 13, the second encryption/decryption key generation round units 24 sequentially receive the encryption/decryption key generation round function values ($K_L$, $K_R$) which are output from a previous encryption/decryption key generation round, the length of a secret key (MKlen), the length of plaintext (Plen), and round constants A($RCA_1$, $RCA_2$, . . . , $RCA_{NRA/2}$).

Thereafter, each second encryption/decryption key generation round unit 24 calculates $A_1$ having a 64-bit length by performing an XOR operation on the upper 64 bits of $K_L$ and upper 64 bits of $K_R$. Then, the second encryption/decryption key generation round unit 24 calculates $B_1$ having a 64-bit length by performing an XOR operation on the lower 64 bits of $K_L$ and the lower 64 bits of $K_R$. $A_2$ having a 64-bit length is calculated by performing an XOR operation on $A_1$ having a 64-bit length and $RCA_i$($1 \le i \le NRA/2$) having a 64-bit length. $B_2$ having a 64-bit length is calculated by performing an XOR operation on $B_1$ having a 64-bit length and a 64-bit expression of the length of plaintext (Plen). $A_3$ having a 64-bit length is calculated by applying eight 8-bit input/output functions S( ) in parallel to $A_2$ having a 64-bit length. $A_4$ having a 64-bit length is obtained by applying a 64-bit input/output function D( ) to $A_3$ having a 64-bit length. $B_3$ having a 64-bit length is calculated by performing an XOR operation on $B_2$ having a 64-bit length and $A_4$ having a 64-bit length. $B_4$ having a 64-bit length is obtained by applying eight 8-bit input/output functions S( ) in parallel to $B_3$ having a 64-bit length. $B_5$ having a 64-bit length is obtained by applying a 64-bit input/output function D( ) to $B_4$ having a 64-bit length. $A_5$ having a 64-bit length is calculated by performing an XOR operation on $A_4$ having a 64-bit length and $B_5$ having a 64-bit length. $U_1$ having a 64-bit length is calculated by performing an XOR operation on the upper 64 bits of $K_L$ and $A_5$ having a 64-bit length. $V_1$ having a 64-bit length is calculated by performing an XOR operation on the upper 64 bits of $K_R$ and $A_5$ having a 64-bit length. $U_2$ having a 64-bit length is calculated by performing an XOR operation on the lower 64 bits of $K_L$ and $B_5$ having a 64-bit length. $V_2$ having a 64-bit length is calculated by performing an XOR operation on the lower 64 bits of $K_R$ and $B_5$ having a 64-bit length. Next, W having a 128-bit length is calculated by connecting $U_1$ having a 64-bit length to $U_2$ having a 64-bit length. X having a 128-bit length is calculated by connecting $V_1$ having a 64-bit length to $V_2$ having a 64-bit length. Y having a 128-bit length is calculated by applying a 128-bit input/output function σ( ) to X having a 128-bit length. Then, the encryption/decryption key generation round function values ($K_L$, $K_R$) are output after $K_L$=W and $K_R$=Y are set.

Meanwhile, in FIG. 1, the encryption/decryption tweak generation unit 30 receives tweak A (TA) and the length of plaintext (Plen) and then generates encryption/decryption tweaks A ($TA_0$, $TA_1$). Here, the input tweak A(TA) may have a bit length corresponding to 128-plaintext length (Plen). The length of plaintext (Plan) may have a value ranging from 8 to 128. The encryption/decryption tweaks may be regarded as additional information associated with encryption/decryption keys.

Accordingly, the output encryption/decryption tweaks A ($TA_0$, $TA_1$) may include $TA_0$ having a 64-HL(Plen)-bit length and $TA_1$ having a 64-HR(Plen)-bit length.

Figure 14:
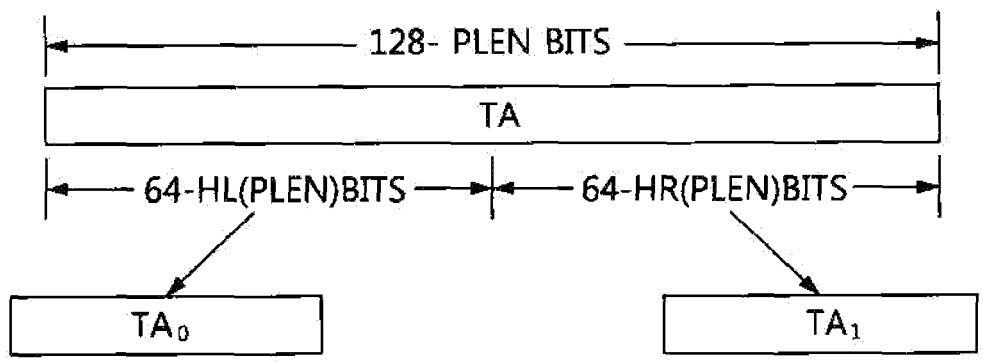
FIG. 14 is a diagram showing an example of an algorithm used by an encryption/decryption tweak generation unit shown in FIG. 1 to generate an encryption/decryption tweak.

Further, an example of an algorithm used by the encryption/decryption tweak generation unit 30 to generate encryption/decryption tweaks A ($TA_0$, $TA_1$) will be described in detail with reference to FIG. 14. Referring to FIG. 14, the encryption/decryption tweak generation unit 30 receives tweak A(TA) and the length of plaintext (Plen). Then, the encryption/decryption tweak generation unit 30 divides the tweak A(TA) into upper 64-HL(Plen) bits and lower 64-HR (Plen) bits, and outputs encryption/decryption tweaks A $TA_0$ and $TA_1$.

Meanwhile, in FIG. 1, the ciphertext output unit 40 may output ciphertext C having the same length as plaintext P using the plaintext P, the length of the plaintext (Plen), the encryption/decryption keys A ($KA_1$, $KA_2$, . . . , $KA_{NRA}$) of the encryption/decryption key generation unit 20, and the encryption/decryption tweaks A ($TA_0$ and $TA_1$) of the encryption/decryption tweak generation unit 30.

The ciphertext output unit 40 may include a first encryption round unit 42, 2-1-th encryption round units 44, 2-2-th encryption round units 45, and a third encryption round unit 46.

The first encryption round unit 42 may receive plaintext P and the length of the plaintext (Plen), and output the encryption round function values ($P_L$, $P_R$). Here, the input plaintext (P) may have a Plen-bit length. The length of plaintext (Plen) may have a value ranging from 8 to 128. Further, the output encryption round function values ($P_L$, $P_R$) may include $P_L$ having an HL(Plen)-bit length and $P_R$ having an HR(Plen)-bit length.

Figure 15:
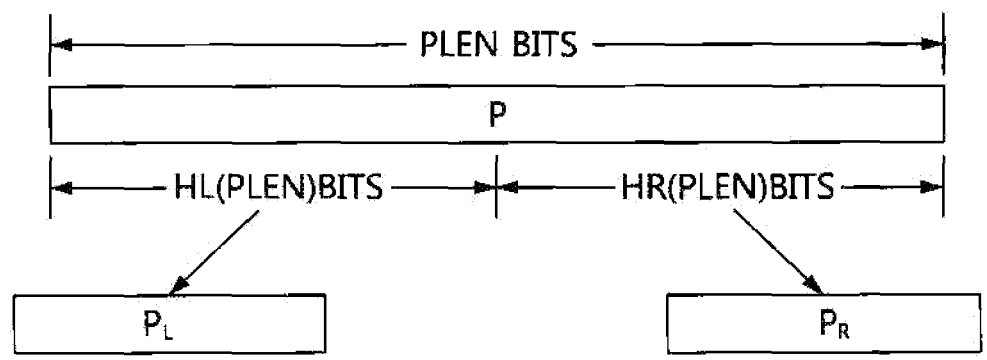
FIG. 15 is a diagram showing an example of an algorithm used by a first encryption round unit shown in FIG. 1 to generate encryption round function values.

An example of an algorithm used by the first encryption round unit 42 to generate the encryption round function values ($P_L$, $P_R$) will be described in detail with reference to FIG. 15. Referring to FIG. 15, the first encryption round unit 42 receives plaintext P and the length of the plaintext (Plen). Then, the first encryption round unit 42 divides the plaintext P into upper HL(Plen) bits and lower HR(Plen) bits, and outputs encryption round function values $P_L$ and $P_R$.

The 2-1-th encryption round units 44 sequentially receive the encryption round function values ($P_L$, $P_R$) which are output from a previous encryption round, the length of the plaintext (Plen), encryption/decryption tweak A($TA_0$), and encryption/decryption keys A($KA_1$, $KA_3$, . . . , $KA_{NRA-1}$), and output encryption round function values ($P_L$, $P_R$). In this case, the received encryption round function values ($P_L$, $P_R$) output from the previous encryption round may include $P_L$ having an HL(Plen)-bit length and $P_R$ having an HR(Plen)-bit length. The length of plaintext (Plen) may have a value ranging from 8 to 128. The encryption/decryption tweak A($TA_0$) may have a 64-HL(Plen)-bit length. The encryption/decryption keys A($KA_1$, $KA_3$, . . . , $KA_{NRA-1}$) may have NRA/2 values, each having a 128-bit length. Further, the output encryption round function values ($P_L$, $P_R$) may have $P_L$ having an HR(Plen)-bit length and $P_R$ having an HL(Plen)-bit length.

Figure 16:
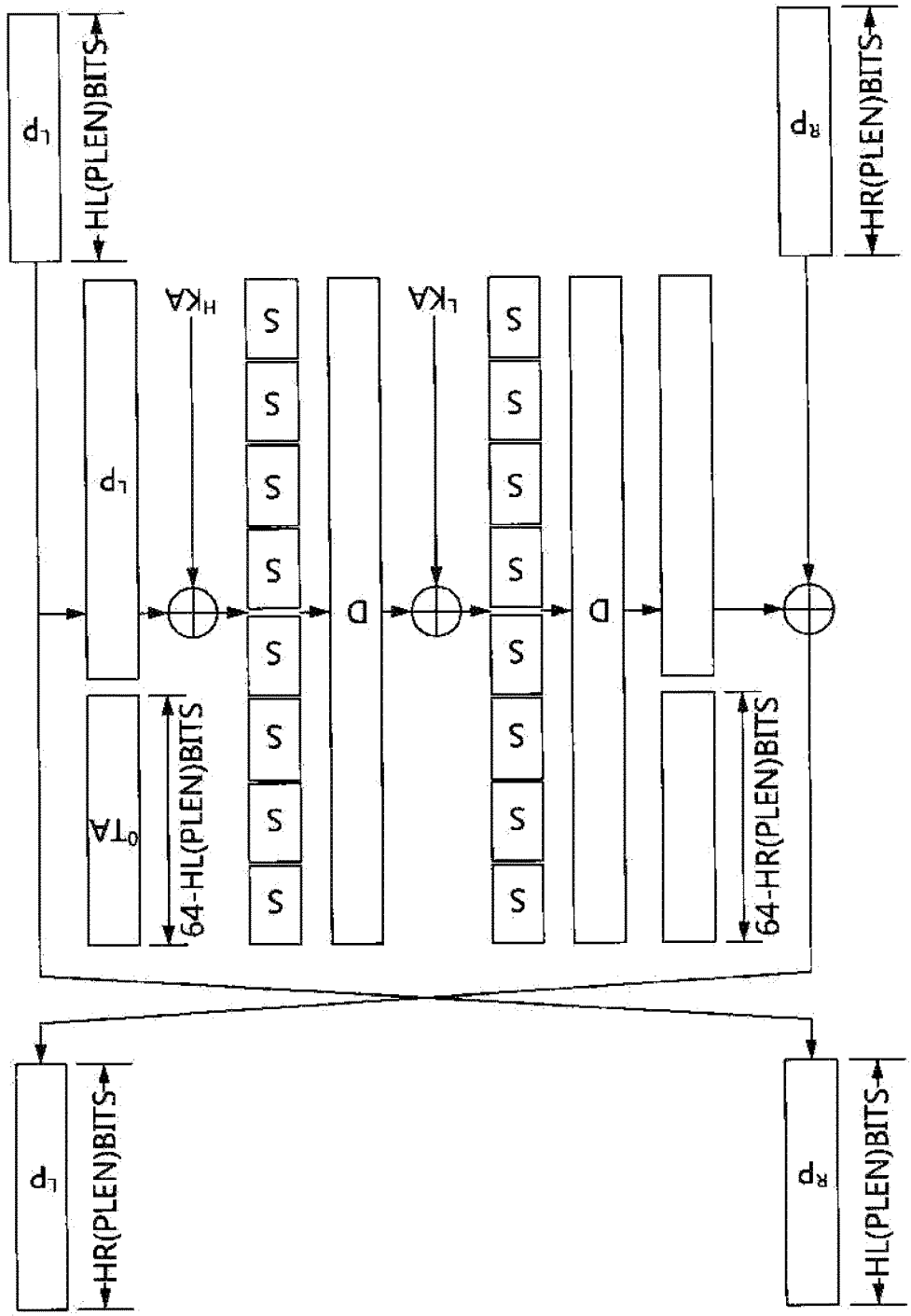
FIG. 16 is a diagram showing an example of an algorithm used by a 2-1-th encryption round unit shown in FIG. 1 to generate encryption round function values.

An example of an algorithm used by the 2-1-th encryption round units 44 to generate the encryption round function values ($P_L$, $P_R$) will be described in detail with reference to FIG. 16. Referring to FIG. 16, the 2-1-th encryption round units 44 sequentially receive encryption round function values ($P_L$, $P_R$) which are output from a previous round, the length of plaintext (Plen), encryption/decryption tweak A($TA_0$), and encryption/decryption keys ($KA_1$, $KA_3$, . . . , $KA_{NRA-1}$). Thereafter, each 2-1-th encryption round unit 44 configures A having a 64-bit length by connecting $TA_0$ having a 64-HL(Plen)-bit length to a portion after $P_L$ having an HL(Plen)-bit length, calculates B having a 64-bit length by performing an XOR operation on A having a 64-bit length and upper 64 bits ($KA_H$) of $KA_{2i-1}$($1 \le i \le NRA/2$), obtains U having a 64-bit length by applying eight 8-bit input/output functions S( ) in parallel to B having a 64-bit length, obtains V having a 64-bit length by applying a 64-bit input/output function D( ) to U having a 64-bit length, calculates W having a 64-bit length by performing an XOR operation on V having a 64-bit length and lower 64 bits ($KA_L$) of $KA_{2i-1}$(1≤i≤NRA/2) having a 64-bit length, obtains X having a 64-bit length by applying eight 8-bit input/output functions S( ) in parallel to W having a 64-bit length, obtains Y having a 64-bit length by applying a 64-bit input/output function D( ) to X having a 64-bit length, obtains Z by selecting upper HR(Plen) bits of Y having a 64-bit length, and then outputs encryption round function values ($P_L$, $P_R$) after $P_L = P_R \oplus Z$ and $P_R = P_L$ are set.

Meanwhile, the 2-2-th encryption round units 45 sequentially receive encryption round function values ($P_L$, $P_R$) which are output from a previous encryption round, the length of plaintext (Plen), encryption/decryption tweak A($TA_1$), and encryption/decryption keys A($KA_2$, $KA_4$, . . . , $KA_{NRA}$), and output encryption round function values ($P_L$, $P_R$). Here, the received encryption round function values ($P_L$, $P_R$) output from the previous encryption round may include $P_L$ having an HR(Plen)-bit length and $P_R$ having an HL(Plen)-bit length. The length of plaintext (Plen) may have a value ranging from 8 to 128. The encryption/decryption tweak A($TA_1$) may have a 64-HR(Plen)-bit length. The encryption/decryption keys A($KA_2$, $KA_4$, . . . , $KA_{NRA}$) may have NRA/2 values, each having a 128-bit length. Further, the output encryption round function values ($P_L$, $P_R$) may include $P_L$ having an HL(Plen)-bit length and $P_R$ having an HR(Plen)-bit length.

Figure 17:
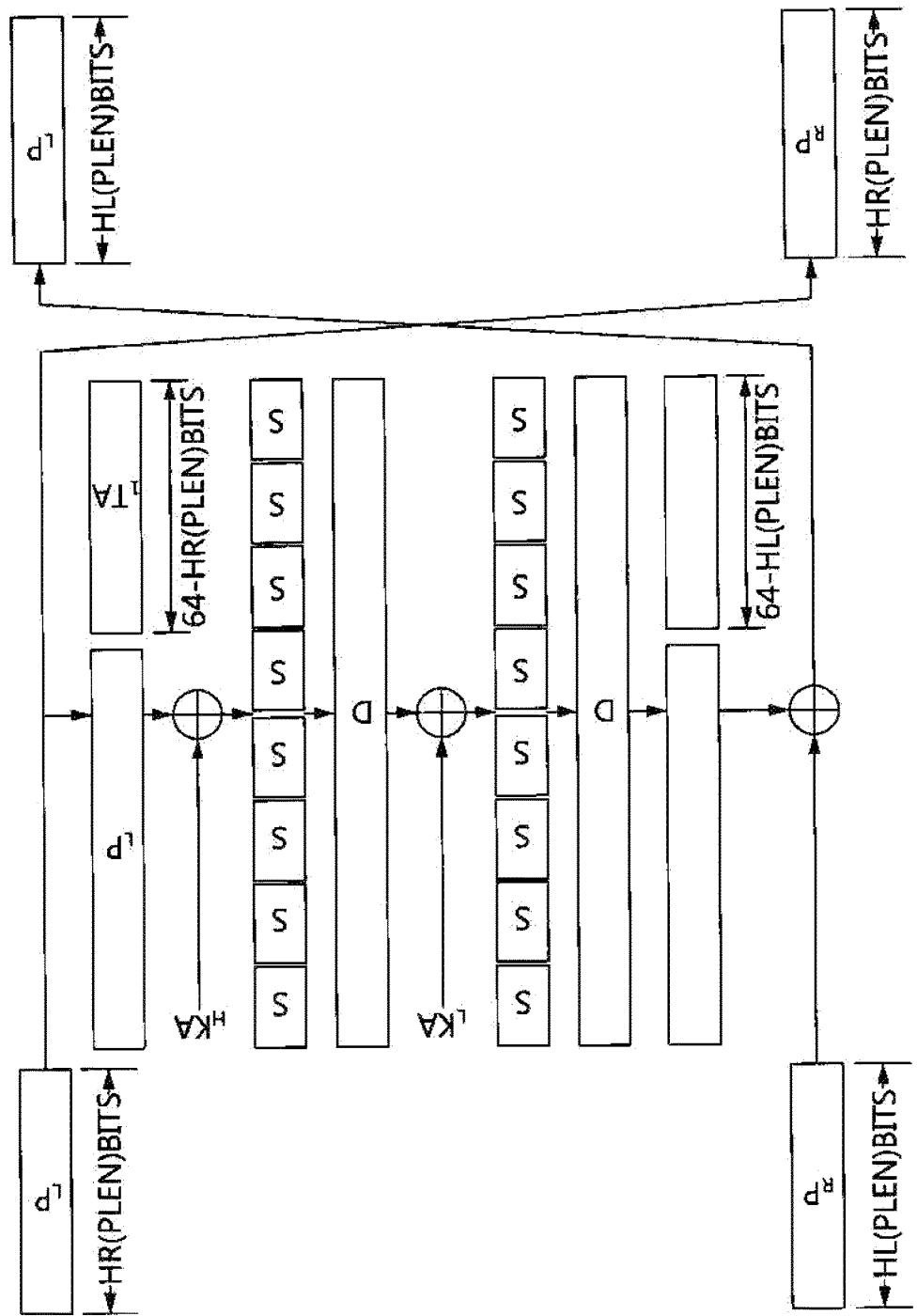
FIG. 17 is a diagram showing an example of an algorithm used by a 2-2-th encryption round unit shown in FIG. 1 to generate encryption round function values.

An example of an algorithm used by the 2-2-th encryption round units 45 to generate the encryption round function values ($P_L$, $P_R$) will be described in detail with reference to FIG. 17. Referring to FIG. 17, the 2-2-th encryption round units 45 sequentially receive encryption round function values ($P_L$, $P_R$) which are output from a previous encryption round, the length of plaintext (Plen), encryption/decryption tweak A($TA_1$), and encryption/decryption keys A ($KA_2$, $KA_4$, . . . , $KA_{NRA}$). Thereafter, each 2-2-th encryption round unit 45 configures A having a 64-bit length by connecting $TA_1$ having a 64-HR(Plen)-bit length to a portion after $P_L$ having an HR(Plen)-bit length. Then, the 2-2-th encryption round unit 45 calculates B having a 64-bit length by performing an XOR operation on A having a 64-bit length and upper 64 bits ($KA_H$) of $KA_{2i}$(1≤i≤NRA/2). U having a 64-bit length is obtained by applying eight 8-bit input/output functions S( ) in parallel to B having a 64-bit length. V having a 64-bit length is obtained by applying a 64 bit input/output function D( ) to U having a 64-bit length. W having a 64-bit length is calculated by performing an XOR operation on V having a 64-bit length and lower 64 bits ($KA_L$) of $KA_{2i}$(1≤i≤NRA/2). Thereafter, X having a 64-bit length is obtained by applying eight 8-bit input/output functions S( ) in parallel to W having a 64-bit length. Next, Y having a 64-bit length is obtained by applying a 64-bit input/output function D( ) to X having a 64-bit length. Z is obtained by selecting upper HL(Plen) bits of Y having a 64-bit length. Then, the encryption round function values ($P_L$, $P_R$) are output after $P_L = P_R \oplus Z$ and $P_R = P_L$ are set.

Meanwhile, the third encryption round unit 46 receives encryption round function values ($P_L$, $P_R$), output from a previous encryption round, and the length of plaintext (Plen), and outputs ciphertext C. In this case, the received encryption round function values ($P_L$, $P_R$), output from the previous encryption round, may include $P_L$ having an HL(Plen)-bit length and $P_R$ having an HR(Plen)-bit length. The length of plaintext (Plen) may have a value ranging from 8 to 128. Further, the output ciphertext C may have a Plen-bit length.

Figure 18:
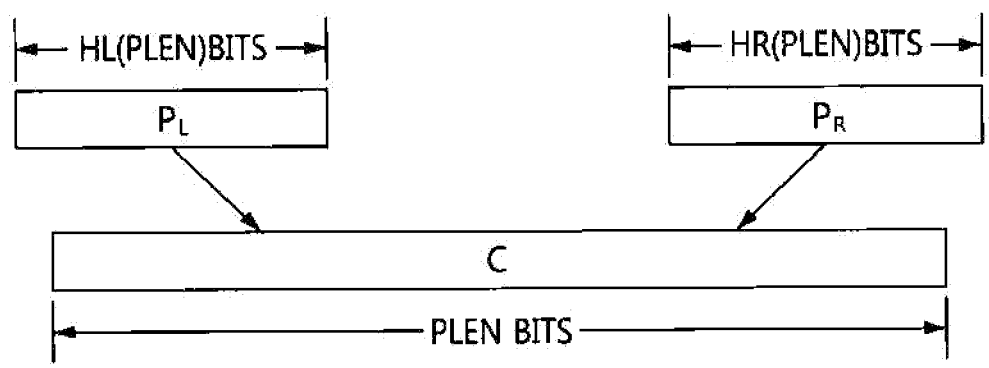
FIG. 18 is a diagram showing an example of an algorithm used by a third encryption round unit shown in FIG. 1 to generate ciphertext.

An example of an algorithm used by the third encryption round unit 46 to generate ciphertext C will be described in detail with reference to FIG. 18. Referring to FIG. 18, the third encryption round unit 46 receives encryption round function values ($P_L$, $P_R$), which are output from a previous encryption round, and the length of plaintext (Plen). Thereafter, the third encryption round unit 46 outputs ciphertext C having a Plen-bit length by connecting two values $P_L$ and $P_R$ to each other.

FIG. 19 is a block diagram of a decryption device in an apparatus for providing a Feistel-based variable length block cipher, which receives a tweak having a fixed bit length, according to an embodiment of the present invention.

The decryption device 50 of FIG. 19 includes an encryption/decryption key generation unit 60, an encryption/decryption tweak generation unit 70, and a plaintext reconstruction unit 80.

The encryption/decryption key generation unit 60 has the same function as the encryption/decryption key generation unit 20 of FIG. 1, and thus a detailed description thereof will be omitted. Also, the encryption/decryption tweak generation unit 70 has the same function as the encryption/decryption tweak generation unit 30 of FIG. 1, and thus a detailed description thereof will be omitted.

The plaintext reconstruction unit 80 may reconstruct plaintext P having the same bit length as ciphertext C by using the ciphertext C, the length of the ciphertext (Clen), encryption/decryption keys A ($KA_1$, $KA_2$, . . . , $KA_{NRA}$) generated by the encryption/decryption key generation unit 60, and encryption/decryption tweaks A($TA_0$, $TA_1$) generated by the encryption/decryption tweak generation unit 70.

The plaintext reconstruction unit 80 may include a first decryption round unit 82, 2-1-th decryption round units 84, 2-2-th decryption round units 85, and a third decryption round unit 86.

The first decryption round units 82 receive the ciphertext C and the length of the ciphertext (Clen), and output decryption round function values ($C_L$, $C_R$). Here, the received ciphertext C may have a Clen-bit length. The length of the ciphertext (Clen) may have a value ranging from 8 to 128. Further, the output decryption round function values ($C_L$, $C_R$) may include $C_L$ having an HL(Clen)-bit length and $C_R$ having an HR(Clen)-bit length.

Figure 20:
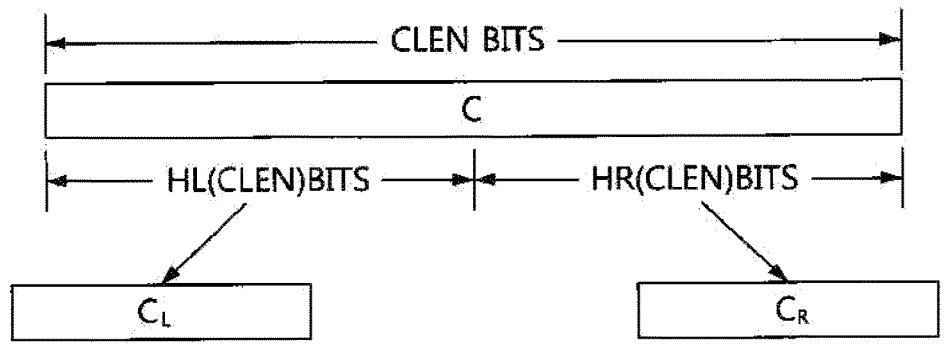
FIG. 20 is a diagram showing an example of an algorithm used by a first decryption round unit shown in FIG. 19 to generate decryption round function values.

An example of an algorithm used by the first decryption round unit 82 to generate decryption round function values ($C_L$, $C_R$) will be described in detail with reference to FIG. 20. Referring to FIG. 20, the first decryption round unit 82 receives ciphertext C and the length of the ciphertext (Clen). Thereafter, the first decryption round unit 82 divides the ciphertext C into upper HL(Clen) bits and lower HR(Clen) bits, and then outputs decryption round function values $C_L$ and $C_R$.

The 2-1 decryption round units 84 sequentially receive decryption round function values ($C_L$, $C_R$) which are output from a previous decryption round, the length of ciphertext (Clen), encryption/decryption tweak A($TA_1$), and encryption/decryption keys A($KA_{NRA}$, $KA_{NRA-2}$, . . . , $KA_2$), and then output decryption round function values ($C_L$, $C_R$). At this time, the input decryption round function values ($C_L$, $C_R$), output from the previous decryption round, may include $C_L$ having an HL(Clen)-bit length and $C_R$ having an HR(Clen)-bit length. The length of ciphertext (Clen) may have a value ranging from 8 to 128. The encryption/decryption tweak A($TA_1$) may have a 64-HR(Clen)-bit length. The encryption/decryption keys A($KA_{NRA}$, $KA_{NRA-2}$, . . . , $KA_2$) may include NRA/2 values, each having a 128-bit length. Further, the output decryption round function values ($C_L$, $C_R$) may include $C_L$ having an HR(Clen)-bit length and $C_R$ having an HL(Clen)-bit length.

Figure 21:
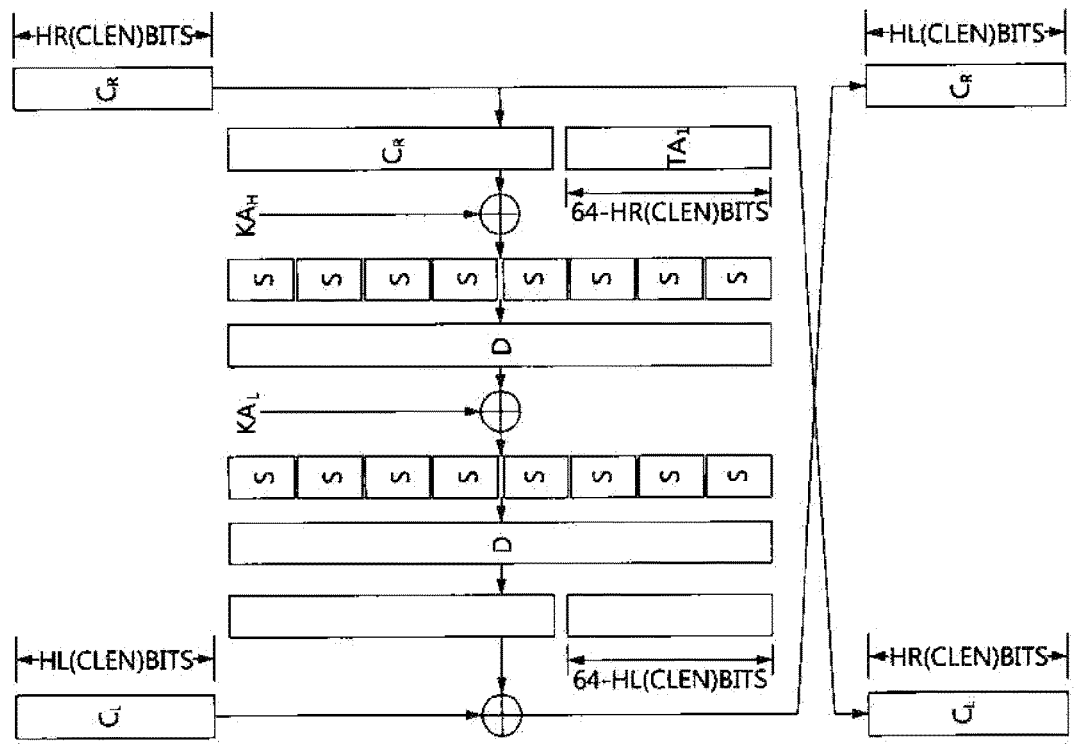
FIG. 21 is a diagram showing an example of an algorithm used by a 2-1-th decryption round unit shown in FIG. 19 to generate decryption round function values.

An example of an algorithm generated by the 2-1-th decryption round units 84 to generate decryption round function values ($C_L$, $C_R$) will be described in detail with reference to FIG. 21. Referring to FIG. 21, the 2-1-th decryption round units 84 sequentially receive decryption round function values ($C_L$, $C_R$) which are output from a previous decryption round, the length of ciphertext (Clen), the encryption/decryption tweak A($TA_1$), and the encryption/decryption keys A($KA_{NRA}$, $KA_{NRA-2}$, . . . , $KA_2$). Thereafter, each 2-1-th decryption round unit 84 configures A having a 64-bit length by connecting $TA_1$ having a 64-HR(Clen)-bit length to a portion after $C_R$ having an HR(Clen)-bit length. Then, B having a 64-bit length is calculated by performing an XOR operation on A having a 64-bit length and upper 64 bits ($KA_H$) of $KA_{NRA+2-2i}$ ($1 \leq i \leq NRA/2$). Then, U having a 64-bit length is obtained by applying eight 8-bit input/output functions S( ) in parallel to B having a 64-bit length. Next, V having a 64-bit length is obtained by applying a 64-bit input/output function D( ) to U having a 64-bit length. Thereafter, W having a 64-bit length is calculated by performing an XOR operation on V having a 64-bit length and lower 64 bits ($KA_L$) of $KA_{NRA+2-2i}$ ($1 \leq i \leq NRA/2$). X having a 64-bit length is obtained by applying eight 8-bit input/output functions S( ) in parallel to W having a 64-bit length. Y having a 64-bit length is obtained by applying a 64-bit input/output function D( ) to X having a 64-bit length. Thereafter, Z is obtained by selecting upper HL (Clen) bits of Y having a 64-bit length. Thereafter, the decryption round function values ($C_L$, $C_R$) are output after $C_L = C_R$ and $C_R = C_L \oplus Z$ are set.

The 2-2-th decryption round units 85 sequentially receive decryption round function values ($C_L$, $C_R$) which are output from a previous decryption round, the length of ciphertext (Clen), encryption/decryption tweak A($TA_0$), and encryption/decryption keys A($KA_{NRA-1}$, $KA_{NRA-3}$, . . . , $KA_1$), and output decryption round function values ($C_L$, $C_R$). At this time, the received decryption round function values ($C_L$, $C_R$) output from the previous decryption round may include $C_L$ having an HR(Clen)-bit length and $C_R$ having an HL(Clen)-bit length. The length of ciphertext (Clen) may have a value ranging from 8 to 128. The encryption/decryption tweak A($TA_0$) may have a 64-HL(Clen)-bit length. The encryption/decryption keys A($KA_{NRA-1}$, $KA_{NRA-3}$, . . . , $KA_L$) may include NRA/2 values, each having a 128-bit length. Further, the output decryption round function values ($C_L$, $C_R$) may include $C_L$ having an HL(Clen)-bit length and $C_R$ having an HR(Clen)-bit length.

Figure 22:
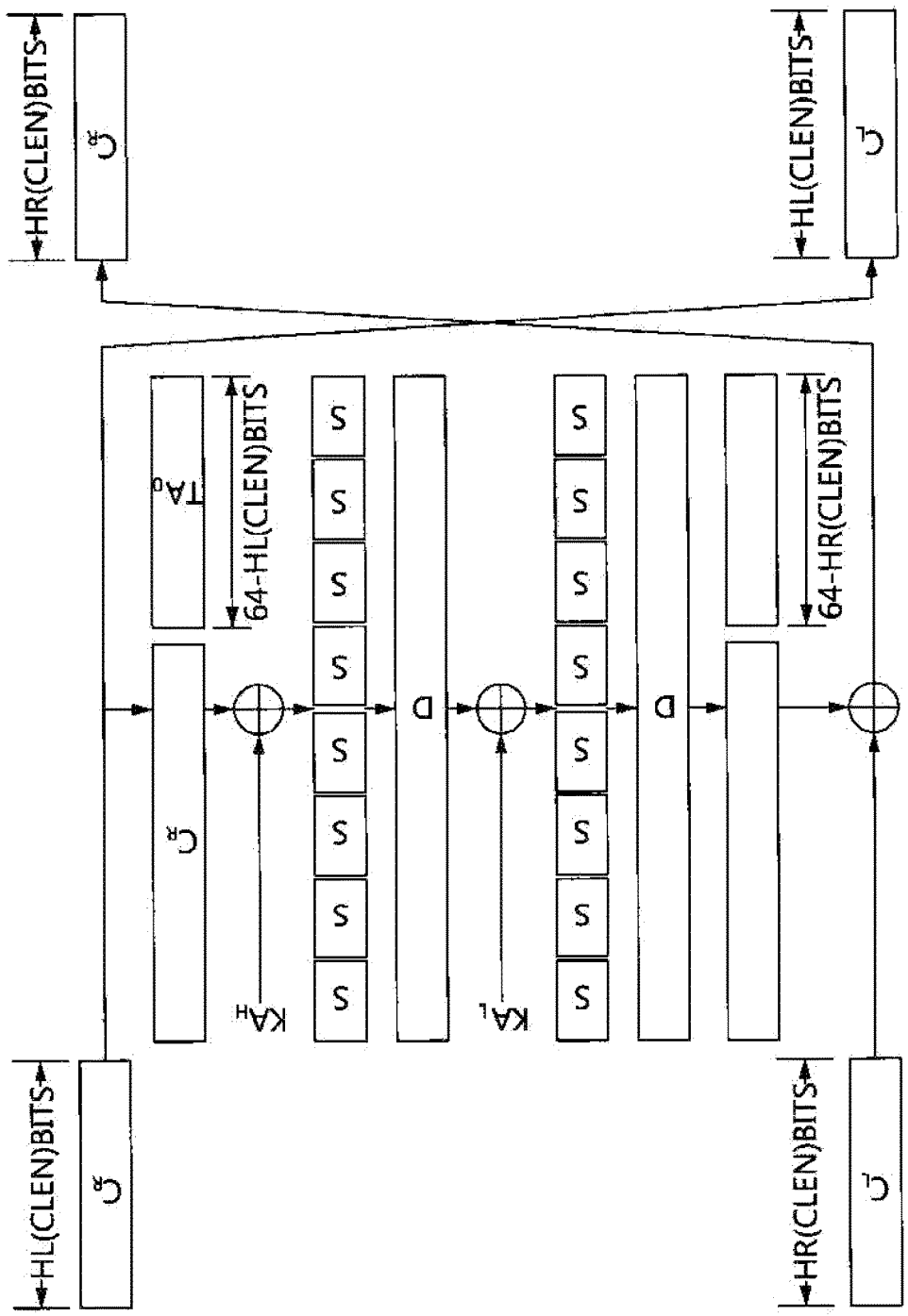
FIG. 22 is a diagram showing an example of an algorithm used by a 2-2-th decryption round unit shown in FIG. 19 to generate decryption round function values.

An example of an algorithm used by the 2-2-th decryption round units 85 to generate decryption round function values ($C_L$, $C_R$) will be described in detail with reference to FIG. 22. Referring to FIG. 22, the 2-2-th decryption round units 85 sequentially receive decryption round function values ($C_L$, $C_R$) output from a previous decryption round, the length of ciphertext (Clen), the encryption/decryption tweak A($TA_0$), and the encryption/decryption keys A($KA_{NRA-1}$, $KA_{NRA-3}$, . . . , $KA_1$). Thereafter, each 2-2-th decryption round unit 85 configures A having a 64-bit length by connecting $TA_0$ having a 64-HL(Clen) bit length to a portion after $C_R$ having an HL(Clen)-bit length. Then, B having a 64-bit length is calculated by performing an XOR operation on A having a 64-bit length and upper 64 bits ($KA_H$) of $KA_{NRA+1-2i}$ ($1 \leq i \leq NRA/2$). Thereafter, U having a 64-bit length is obtained by applying eight 8-bit input/output functions S( ) in parallel to B having a 64-bit length. Then, V having a 64-bit length is obtained by applying a 64-bit input/output function D( ) to U having a 64-bit length. Thereafter, W having a 64-bit length is calculated by performing an XOR operation on V having a 64-bit length and lower 64 bits ($KA_L$) of $KA_{NRA+-2i}$ ($1 \leq i \leq NRA/2$). X having a 64-bit length is obtained by applying eight 8-bit input/output functions S( ) in parallel to W having a 64-bit length. Y having a 64-bit length is obtained by applying a 64-bit input/output function D( ) to X having a 64-bit length. Z is obtained by selecting upper HR (Clen) bits of Y having a 64-bit length. Thereafter, decryption round function values ($C_L$, $C_R$) are output after $C_L = C_R$ and $C_R = C_L \oplus Z$ are set.

The third decryption round unit 86 receives the decryption round function values ($C_L$, $C_R$), which are output from a previous decryption round, and the length of ciphertext (Clen), and outputs plaintext P. In this case, the received decryption round function values ($C_L$, $C_R$) output from the previous decryption round may include $C_L$ having an HL(Clen)-bit length and $C_R$ having an HR(Clen)-bit length. The length of ciphertext (Clen) may have a value ranging from 8 to 128. Further, the output plaintext P may have a Clen-bit length.

Figure 23:
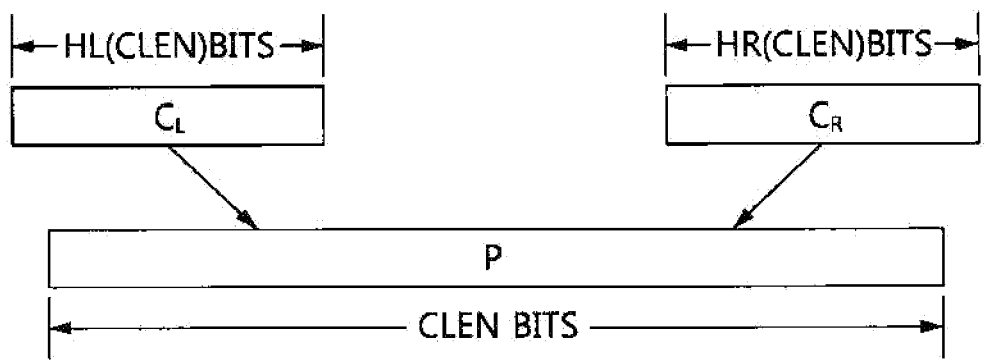
FIG. 23 is a diagram showing an example of an algorithm used by a third decryption round unit shown in FIG. 19 to reconstruct plaintext.

An example of an algorithm used by the third decryption round unit 86 to reconstruct plaintext P will be described in detail with reference to FIG. 23. Referring to FIG. 23, the third decryption round unit 86 receives decryption round function values ($C_L$, $C_R$) which are output from a previous decryption round, and the length of ciphertext (Clen). Next, the third decryption round unit 86 outputs plaintext P having a Clen-bit length by connecting two values $C_L$ and $C_R$ to each other.

FIG. 24 is a block diagram showing an encryption device in an apparatus for providing a Feistel-based variable length block cipher, which receives a tweak having any bit length, according to an embodiment of the present invention when the length of a secret key (MKlen) is 128 or 256 bits, and FIG. 25 is a block diagram showing an encryption device in the apparatus for providing a Feistel-based variable length block cipher, which receives a tweak having any bit length, according to an embodiment of the present invention when the length of a secret key (MKlen) is 192 bits.

An encryption device 100 shown in FIGS. 24 and 25 includes an encryption/decryption key generation unit 110, an encryption/decryption tweak generation unit 120, and a ciphertext output unit 130.

The encryption/decryption key generation unit 110 may receive a secret key (MK), the length of the secret key (MKlen), the length of plaintext (Plen), and round constants B($RCB_1$, $RCB_2$, . . . , $RCB_{[NRB/2]}$), and generate a number of encryption/decryption keys B ($KB_1$, $KB_2$, . . . , $KB_{NRB}$) identical to the preset number of rounds B(NRB) according to the length of the secret key (MKlen).

Figures 26, 27:
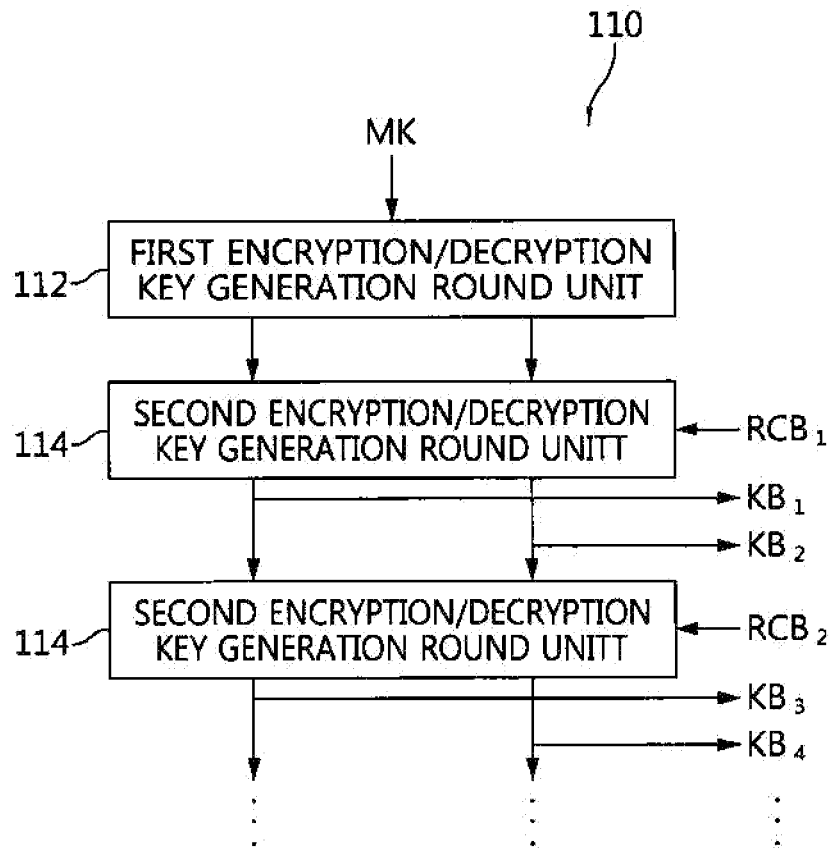
FIG. 26 is an internal configuration diagram of an encryption/decryption key generation unit shown in FIGS. 24 and 25.
FIG. 27 is a diagram illustrating the number of rounds applicable to the encryption device of FIGS. 24 and 25.

As shown in FIG. 26, the encryption/decryption key generation unit 110 may include a first encryption/decryption key generation round unit 112 and second encryption/decryption key generation round units 114.

Here, the first encryption/decryption key generation round unit 112 performs the same function as the first encryption/decryption key generation round unit 22 of FIG. 2, and thus a detailed description thereof is omitted.

The second encryption/decryption key generation round units 114 sequentially receive encryption/decryption key generation round function values ($K_L$, $K_R$) which are output from a previous encryption/decryption key generation round, the length of a secret key (MKlen), the length of plaintext (Plen), and round constants B(RCB$_1$, RCB$_2$, ..., RCB$_{[NRB/2]}$), and output encryption/decryption key generation round function values (K$_L$, K$_R$). In this case, the received encryption/decryption key generation round function values (K$_L$, K$_R$) output from the previous round may include K$_L$ and K$_R$, each having a 128-bit length. The length of the secret key (MKlen) may be 128, 192 or 256 bits. The length of plaintext (Plen) may have a value ranging from 8 to 128. The round constants B(RCB$_1$, RCB$_2$, ..., RCB$_{[NRB/2]}$) may include $\lceil NRB/2 \rceil$ values, each having a 64-bit length. Further, the output encryption/decryption key generation round function values (K$_L$, K$_R$) may include K$_L$ and K$_R$, each having a 128-bit length.

Meanwhile, FIG. 27 illustrates the number of rounds (round number) B(NRB), wherein the number of rounds B(NRB) is preset according to the length of the secret key (MKlen). For example, when the length of a secret key (MKlen) is 128 bits, the number of rounds B(NRB) is preset to 18. When the length of the secret key (MKlen) is 192 bits, the number of rounds B(NRB) is set to 21. When the length of the secret key (MKlen) is 256 bits, the number of rounds B(NRB) is set to 24.

In this way, the number of rounds B(NRB) may be preset to a suitable value in consideration of the security of a Feistel-based variable length block cipher algorithm for receiving a tweak having any bit length.

FIG. 28 illustrates round constants B(RCB$_1$, RCB$_2$, ..., RCB$_9$), which are arbitrary constants used by the second encryption/decryption key generation round units 114 for generating encryption/decryption key generation round function values (K$_L$, K$_R$) when MKlen=128 bits. In this case, the round constants (RCB$_1$, RCB$_2$, ..., RCB$_9$) may be generated by extracting each 64-bit value from the 65-th decimal place of a binary number of log(1+1).

FIG. 29 illustrates round constants B(RCB$_1$, RCB$_2$, ..., RCB$_{11}$), which are arbitrary constants used by the second encryption/decryption key generation round units 114 for generating encryption/decryption key generation round function values (K$_L$, K$_R$) when MKlen=192 bits. In this case, the round constants B(RCB$_1$, RCB$_2$, ..., RCB$_{11}$) may be generated by extracting each 64-bit value from the 65-th decimal place of a binary number of log(1+2).

FIG. 30 illustrates round constants B(RCB$_1$, RCB$_2$, ..., RCB$_{12}$), which are arbitrary constants used by the second encryption/decryption key generation round units 114 for generating encryption/decryption key generation round function values (K$_L$, K$_R$) when MKlen=256 bits. In this case, the round constants B(RCB$_1$, RCB$_2$, ..., RCB$_{12}$) may be generated by extracting each 64-bit value from the 65-th decimal place of a binary number of log(1+3).

Figure 31:
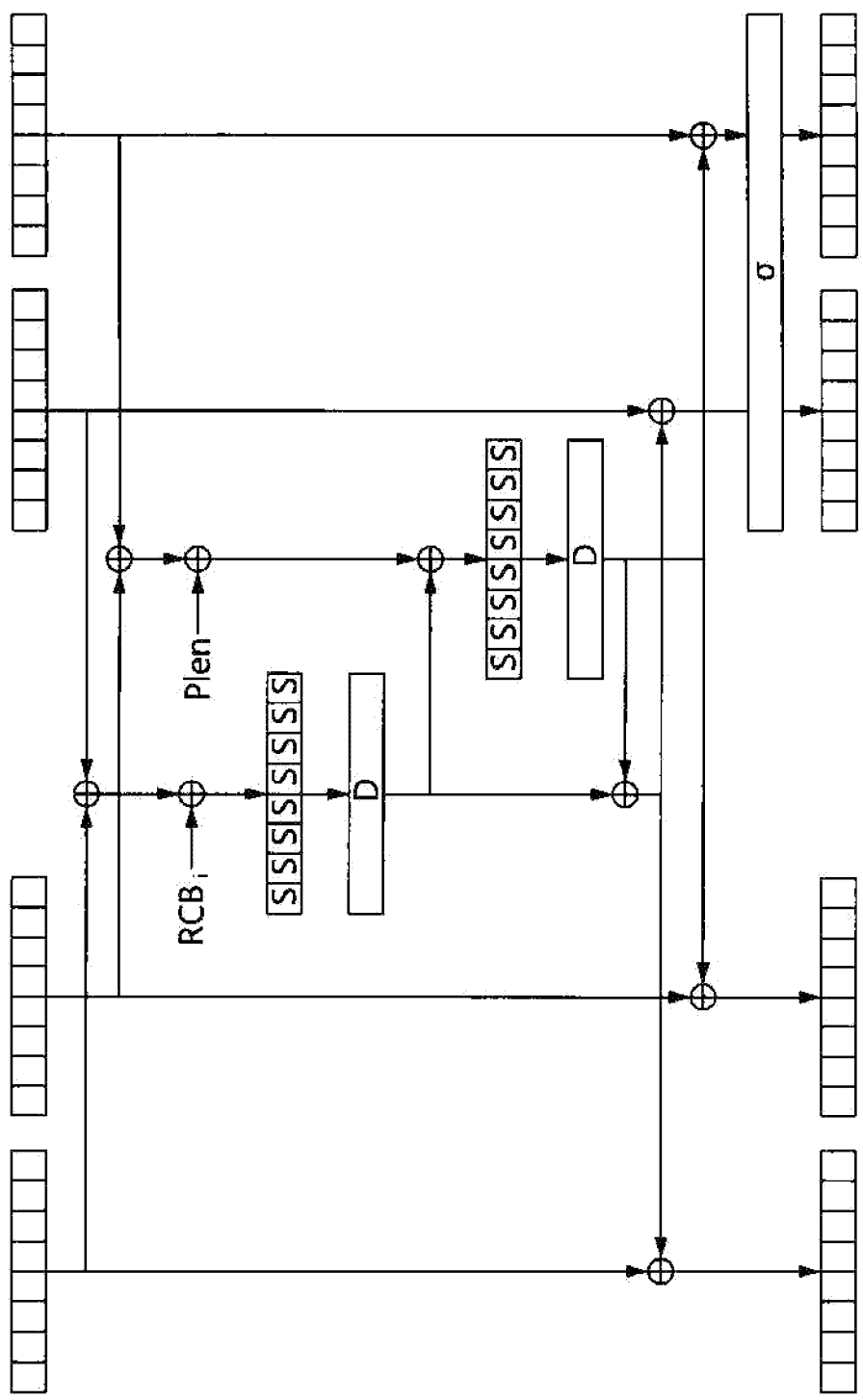
FIG. 31 is a diagram showing an example of an algorithm used by the second encryption/decryption key generation round units shown in FIG. 26 to generate encryption/decryption key generation round function values.

An example of an algorithm used by the second encryption/decryption key generation round units 114 to generate encryption/decryption key generation round function values (K$_L$, K$_R$) will be described in detail with reference to FIG. 31. Referring to FIG. 31, the second encryption/decryption key generation round units 114 sequentially receive encryption/decryption key generation round function values (K$_L$, K$_R$) which are output from a previous encryption/decryption key generation round, the length of a secret key (MKlen), the length of plaintext (Plen), and round constants B (RCB$_1$, RCB$_2$, ..., RCB$_{[NRB/2]}$). Thereafter, each second encryption/decryption key generation round unit 114 calculates A$_1$ having a 64-bit length by performing an XOR operation on upper 64 bits of K$_L$ and upper 64 bits of K$_R$. Then, B$_1$ having a 64-bit length is calculated by performing an XOR operation on lower 64 bits of K$_L$ and lower 64 bits of K$_R$. Thereafter, A$_2$ having a 64-bit length is calculated by performing an XOR operation on A$_1$ having a 64-bit length and RCB$_i$(1≤i≤⌈NRB/2⌉) having a 64-bit length. Then, B$_2$ having a 64-bit length is calculated by performing an XOR operation on B$_1$ having a 64-bit length and a 64-bit expression of Plen. Next, A$_3$ having a 64-bit length is calculated by applying eight 8-bit input/output functions S( ) in parallel to A$_2$ having a 64-bit length. A$_4$ having a 64-bit length is obtained by applying a 64-bit input/output function D( ) to A$_3$ having a 64-bit length. B$_3$ having a 64-bit length is calculated by performing an XOR operation on B$_2$ having a 64-bit length and A$_4$ having a 64-bit length. B$_4$ having a 64-bit length is calculated by applying eight 8-bit input/output functions S( ) in parallel to B$_3$ having a 64-bit length. Then, B$_5$ having a 64-bit length is obtained by applying a 64-bit input/output function D( ) to B$_4$ having a 64-bit length. Next, A$_5$ having a 64-bit length is obtained by performing an XOR operation on A$_4$ having a 64-bit length and B$_5$ having a 64-bit length. Thereafter, U$_1$ having a 64-bit length is calculated by performing an XOR operation on the upper 64 bits of K$_L$ and A$_5$ having a 64-bit length. Then, V$_1$ having a 64-bit length is calculated by performing an XOR operation on the upper 64 bits of K$_R$ and A$_5$ having a 64-bit length. Next, U$_2$ having a 64-bit length is calculated by performing an XOR operation on lower 64 bits of K$_L$ and B$_5$ having a 64-bit length. Thereafter, V$_2$ having a 64-bit length is calculated by performing an XOR operation on lower 64 bits of K$_R$ and B$_5$ having a 64-bit length. Thereafter, K$_L$ having a 128-bit length is calculated by connecting U$_1$ having a 64-bit length and U$_2$ having a 64-bit length to each other. Then, W having a 128-bit length is calculated by connecting V$_1$ having a 64-bit length and V$_2$ having a 64-bit length to each other. Next, K$_R$ having a 128-bit length is calculated by applying a 128-bit input/output function σ( ) to W having a 128-bit length. Then, the encryption/decryption key generation round function values (K$_L$, K$_R$) are output.

The encryption/decryption tweak generation unit 120 receives tweak B(TB) and the length of the tweak B (TBlen), and generates encryption/decryption tweaks B(TB$_0$, TB$_1$). In this case, the received tweak B(T$_B$) may have a TBlen-bit length. The length of the tweak B(TBlen) may have any size. Further, the output encryption/decryption tweak B may be composed of TB$_0$ having a 64-bit length and TB$_1$ having a 64-bit length.

Figure 32:
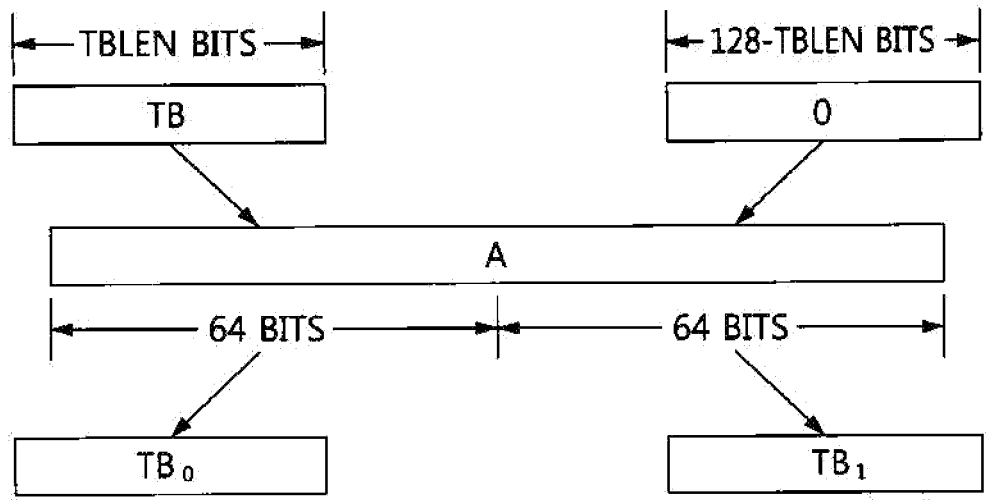
FIG. 32 is a diagram showing an example of an algorithm used by an encryption/decryption tweak generation unit shown in FIGS. 24 and 25 to generate an encryption/decryption tweak when the length of a tweak is equal to or less than 128 bits.

An example of an algorithm used by the encryption/decryption tweak generation unit 120 to generate encryption/decryption tweaks B(TB$_0$, TB$_1$) when the length of the tweak B (TBlen) is equal to or less than 128 bits will be described in detail with reference to FIG. 32. Referring to FIG. 32, when the length of the tweak B (TBlen) is equal to or less than 128 bits, the encryption/decryption tweak generation unit 120 receives the tweak B(TB) and the length of the tweak B (TBlen). Then, the encryption/decryption tweak generation unit 120 obtains A having a 128-bit length by connecting 0's corresponding to a 128-TBlen-bit length to the tweak B(TB) having a TBlen-bit length. Then, A having a 128-bit length is divided into upper 64 bits and lower 64 bits, and thus encryption/decryption tweaks B TB$_0$ and TB$_1$ are output.

Figure 33:
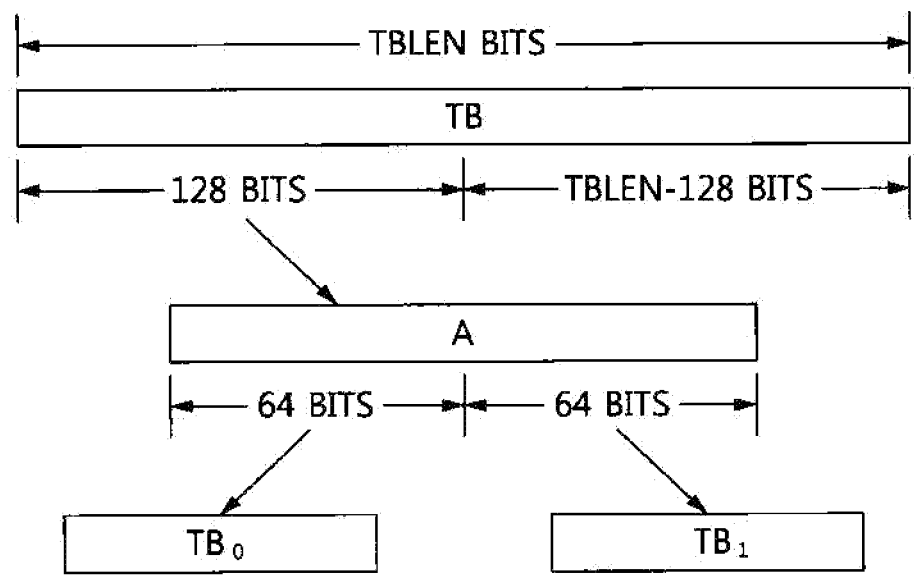
FIG. 33 is a diagram showing an example of an algorithm used by the encryption/decryption tweak generation unit shown in FIGS. 24 and 25 to generate an encryption/decryption tweak when the length of a tweak is greater than 128 bits.

An example of an algorithm used by the encryption/decryption tweak generation unit 120 to generate encryption/decryption tweaks B(TB$_0$, TB$_1$) when the length of the tweak B (TBlen) is greater than 128 bits will be described in detail with reference to FIG. 33. Referring to FIG. 33, when the length of the tweak B (TBlen) is greater than 128 bits, the encryption/decryption tweak generation unit 120 receives tweak B(TB) and the length of the tweak B (TBlen).

Then, the encryption/decryption tweak generation unit 120 obtains A having a 128-bit length by selecting upper 128 bits of the tweak B(TB) having a TBlen-bit length. Then, A having a 128-bit length is divided into upper 64 bits and lower 64 bits, and thus encryption/decryption tweaks B TB$_0$ and TB$_1$ are output.

The ciphertext output unit 130 may output ciphertext C having the same bit length (Plen) as plaintext P using the plaintext P, the length of the plaintext (Plen), the length of a secret key (MKlen), generated encryption/decryption keys B(KB$_1$, KB$_2$, . . . , KB$_{NRB}$), and encryption/decryption tweaks B(TB$_0$, TB$_1$).

The ciphertext output unit 130 includes a first encryption round unit 131, 2-1-th encryption round units 132, 2-2-th encryption round units 133, 2-3-th encryption round units 134, 2-4-th encryption round units 135, 2-5-th encryption round units 136, 2-6-th encryption round units 137, and a third encryption round unit 138.

Here, the first encryption round unit 131 performs the same function as the first encryption round unit 42 of FIG. 1, and thus a detailed description thereof will be omitted.

The 2-1-th encryption round units 132 sequentially receive encryption round function values (P$_L$, P$_R$) which are output from a previous encryption round, the length of plaintext (Plen), and encryption/decryption keys B(KB$_1$, KB$_7$, . . . , KB$_{6-\lceil NRB/6 \rceil-5}$), and output encryption round function values (P$_L$, P$_R$). In this case, the received encryption round function values (P$_L$, P$_R$) output from the previous encryption round may be a combination of P$_L$ having an HL(Plen)-bit length and P$_R$ having an HR(Plen)-bit length. The length of plaintext (Plen) may have a value ranging from 8 to 128. The encryption/decryption keys B(KB$_1$, KB$_7$, . . . , KB$_{6-\lceil NRB/6 \rceil-5}$) may include $\lceil NRB/6 \rceil$ values, each having a 128-bit length. Further, the output encryption round function values (P$_L$, P$_R$) may be a combination of P$_L$ having an HR(Plen)-bit length and P$_R$ having an HL(Plen)-bit length.

Figure 34:
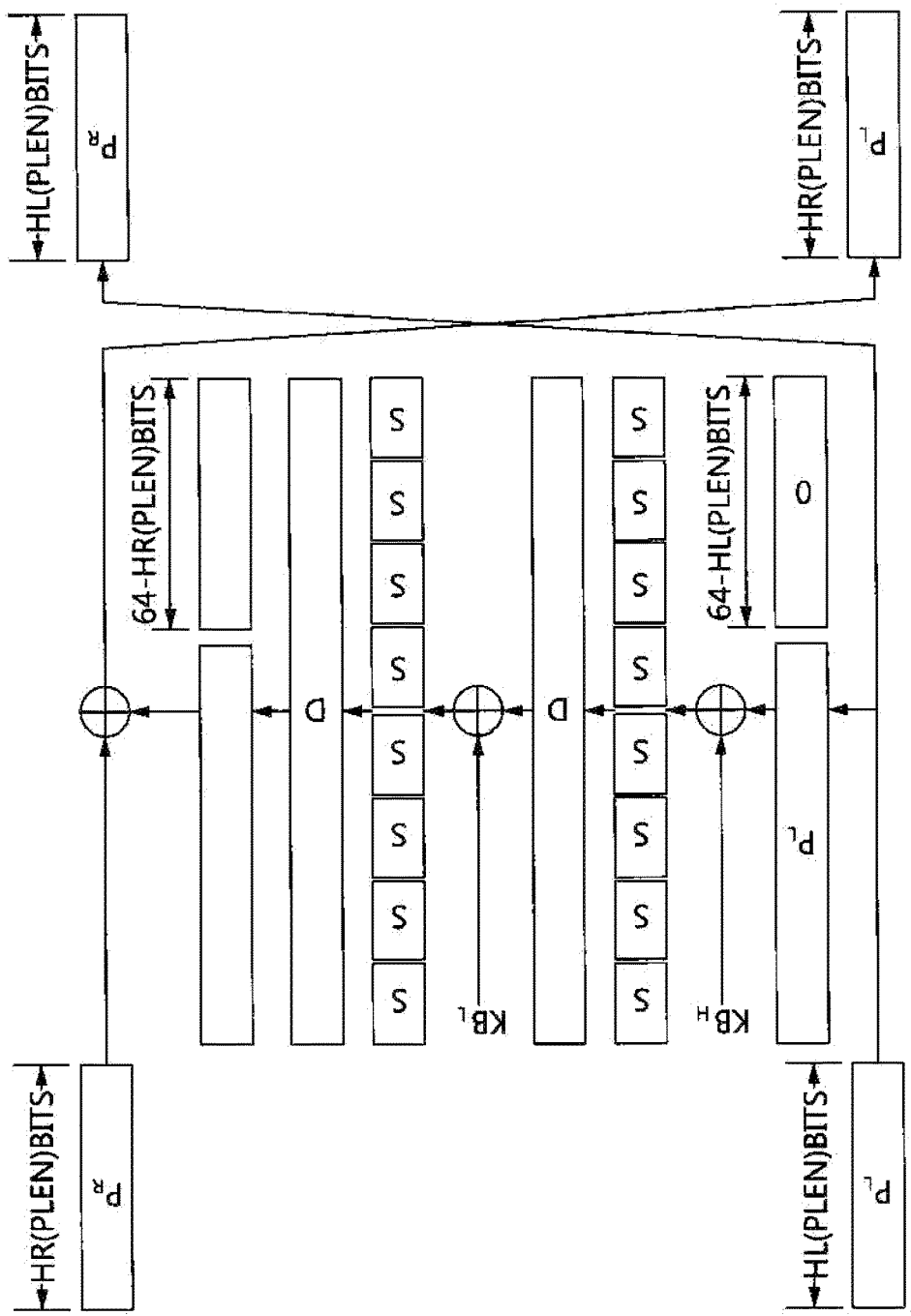
FIG. 34 is a diagram showing an example of an algorithm used by a 2-1-th encryption round unit shown in FIGS. 24 and 25 to generate encryption round function values.

An example of an algorithm used by the 2-1-th encryption round units 132 to generate the encryption round function values (P$_L$, P$_R$) may be described in detail with reference to FIG. 34. Referring to FIG. 34, the 2-1-th encryption round units 132 sequentially receive the encryption round function values (P$_L$, P$_R$) which are output from a previous round, the length of plaintext (Plen), and encryption/decryption keys B(KB$_1$, KB$_7$, . . . , KB$_{6-\lceil NRB/6 \rceil-5}$). Thereafter, each 2-1-th encryption round unit 132 configures A having a 64-bit length by connecting 0's corresponding to a 64-HL(Plen)-bit length to a portion after P$_L$ having an HL(Plen)-bit length. Then, B having a 64-bit length is calculated by performing an XOR operation on A having a 64-bit length and upper 64 bits (KB$_H$) of KB$_{6i-5}$($1 \leq i \leq \lceil NRB/6 \rceil$). U having a 64-bit length is obtained by applying eight 8-bit input/output functions S( ) in parallel to B having a 64-bit length. V having a 64-bit length is obtained by applying a 64-bit input/output function D( ) to U having a 64-bit length. Then, W having a 64-bit length is calculated by performing an XOR operation on V having a 64-bit length and lower 64 bits (KB$_L$) of KB$_{6i-5}$($1 \leq i \leq \lceil NRB/6 \rceil$). Then, X having a 64-bit length is obtained by applying eight 8-bit input/output functions S( ) in parallel to W having a 64-bit length. Thereafter, Y having a 64-bit length is obtained by applying a 64 bit input/output function D( ) to X having a 64-bit length. Next, Z is obtained by selecting upper HR(Plen) bits of Y having a 64-bit length. Then, encryption round function values (P$_L$, P$_R$) are output after P$_L$=P$_R$⊕Z and P$_R$=P$_L$ are set.

The 2-2-th encryption round units 133 sequentially receive the encryption round function values (P$_L$, P$_R$) which are output from a previous encryption round, the length of plaintext (Plen), encryption/decryption tweak B(TB$_0$), and encryption/decryption keys B(KB$_2$, KB$_8$, . . . , KB$_{6-\lceil NRB/6 \rceil-4}$), and output encryption round function values (P$_L$, P$_R$). Here, the received encryption round function values (P$_L$, P$_R$) output from the previous encryption round may be a combination of P$_L$ having an HR(Plen)-bit length and P$_R$ having an HL(Plen)-bit length. The encryption/decryption tweak B(TB$_0$) may have a 64-bit length. The length of plaintext (Plen) may have a value ranging from 8 to 128. The encryption/decryption keys B (KB$_2$, KB$_8$, . . . , KB$_{6-\lceil NRB/6 \rceil-4}$) may include $\lceil NRB/6 \rceil$ values, each having a 128-bit length. Furthermore, the output encryption round function values (P$_L$, P$_R$) may be a combination of P$_L$ having an HL(Plen)-bit length and P$_R$ having an HR(Plen)-bit length.

Figure 35:
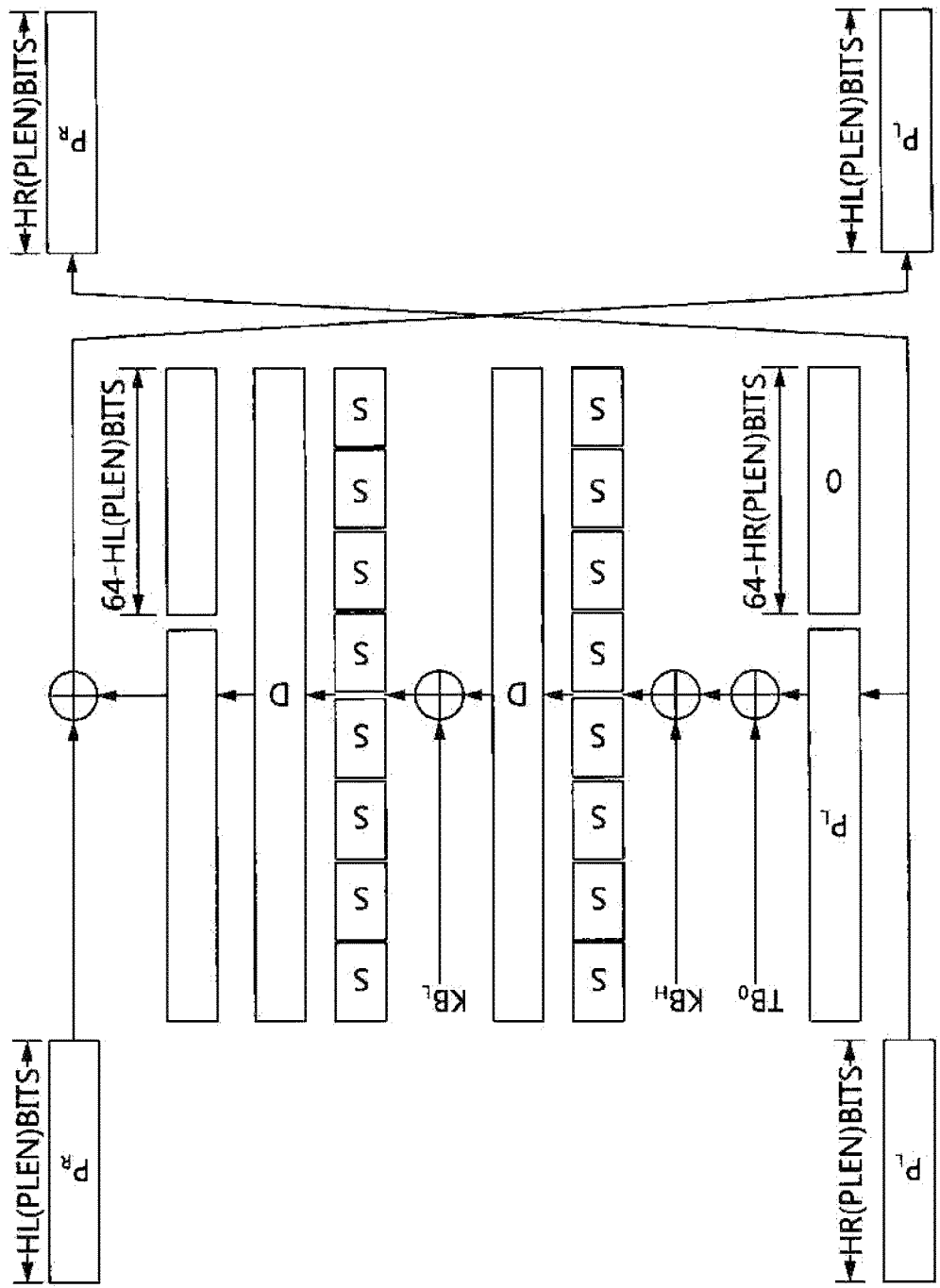
FIG. 35 is a diagram showing an example of an algorithm used by a 2-2-th encryption round unit shown in FIGS. 24 and 25 to generate encryption round function values.

An example of an algorithm used by the 2-2-th encryption round units 133 to generate encryption round function values (P$_L$, P$_R$) will be described in detail with reference to FIG. 35. Referring to FIG. 35, the 2-2-th encryption round units 133 sequentially receive encryption round function values (P$_L$, P$_R$) which are output from a previous encryption round, the length of plaintext (Plen), the encryption/decryption tweak B(TB$_0$), and the encryption/decryption keys B(KB$_2$, KB$_8$, . . . , KB$_{6-\lceil NRB/6 \rceil-4}$). Thereafter, each 2-2-th encryption round unit 133 configures A having a 64-bit length by connecting 0's corresponding to a 64-HR(Plen)-bit length to a portion after P$_L$ having an HR(Plen)-bit length. Then, B having a 64-bit length is calculated by performing an XOR operation on A having a 64-bit length and TB$_0$ having a 64-bit length. E having a 64-bit length is calculated by performing an XOR operation on B having a 64-bit length and upper 64 bits (KB$_H$) of KB$_{6i-4}$($1 \leq i \leq \lceil NRB/6 \rceil$). U having a 64-bit length is obtained by applying eight 8-bit input/output functions S( ) in parallel to E having a 64-bit length. Then, V having a 64-bit length is obtained by applying a 64-bit input/output function D( ) to U having a 64-bit length. Next, W having a 64-bit length is calculated by performing an XOR operation on V having a 64-bit length and lower 64 bits (KB$_L$) of KB$_{6i-4}$($1 \leq i \leq \lceil NRB/6 \rceil$). Then, X having a 64-bit length is calculated by applying eight 8-bit input/output functions S( ) in parallel to W having a 64-bit length. Y having a 64-bit length is obtained by applying a 64-bit input/output function D( ) to X having a 64-bit length. Then, Z is obtained by selecting upper HL (Plen) bits of Y having a 64-bit length. Thereafter, encryption round function values (P$_L$, P$_R$) are output after P$_L$=P$_R$⊕Z and P$_R$=P$_L$ are set.

The 2-3-th encryption round units 134 sequentially receive the encryption round function values (P$_L$, P$_R$) which are output from a previous encryption round, the length of plaintext (Plen), encryption/decryption tweak B(TB$_1$), and encryption/decryption keys B(KB$_3$, KB$_9$, . . . , KB$_{6-\lceil NRB/6 \rceil-3}$), and output encryption round function values (P$_L$, P$_R$). Here, the received encryption round function values (P$_L$, P$_R$) output from the previous encryption round may be a combination of P$_L$ having an HL(Plen)-bit length and P$_R$ having an HR(Plen)-bit length. The length of plaintext (Plen) may have a value ranging from 8 to 128. The encryption/decryption tweak B(TB$_1$) may have a 64-bit length. The encryption/decryption keys B(KB$_3$, KB$_9$, . . . , KB$_{6-\lceil NRB/6 \rceil-3}$) may include $\lceil NRB/6 \rceil$ values, each having a 128-bit length. Further, the output encryption round function values (P$_L$, P$_R$) may be a combination of P$_L$ having an HR(Plen)-bit length and P$_R$ having an HL(Plen)-bit length.

Figure 36:
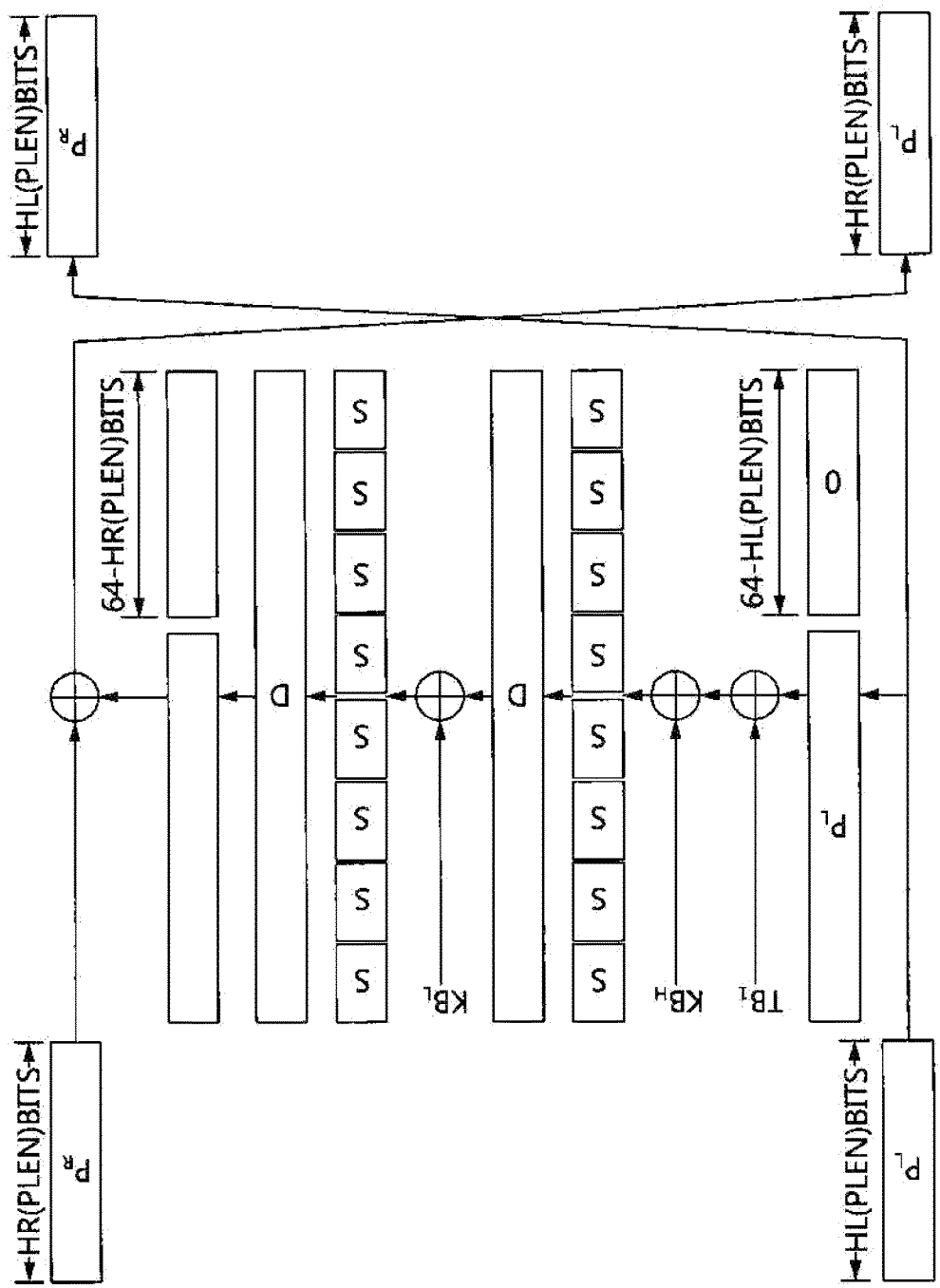
FIG. 36 is a diagram showing an example of an algorithm used by a 2-3-th encryption round unit shown in FIGS. 24 and 25 to generate encryption round function values.

An example of an algorithm used by the 2-3-th encryption round units 134 to generate the encryption round function values ($P_L$, $P_R$) will be described in detail with reference to FIG. 36. Referring to FIG. 36, the 2-3-th encryption round units 134 sequentially receive the encryption round function values ($P_L$, $P_R$) which are output from a previous encryption round, the length of plaintext (Plen), the encryption/decryption tweak B ($TB_1$), and the encryption/decryption keys B ($KB_3$, $KB_9$, ..., $KB_{6-\lceil NRB/6 \rceil-3}$). Thereafter, each 2-3-th encryption round unit 134 configures A having a 64-bit length by connecting 0's corresponding to a 64-HL(Plen)-bit length to a portion after $P_L$ having an HL(Plen)-bit length. Then, B having a 64-bit length is calculated by performing an XOR operation on A having a 64-bit length and $TB_1$ having a 64-bit length. E having a 64-bit length is calculated by performing an XOR operation on B having a 64-bit length and upper 64 bits ($KB_H$) of $KB_{6i-3}$($1 \le i \le \lceil NRB/6 \rceil$). U having a 64-bit length is obtained by applying eight 8-bit input/output functions S( ) in parallel to E having a 64-bit length. V having a 64-bit length is obtained by applying a 64-bit input/output function D( ) to U having a 64-bit length. Thereafter, W having a 64-bit length is calculated by performing an XOR operation on V having a 64-bit length and lower 64 bits ($KB_L$) of $KB_{6i-3}$($1 \le i \le \lceil NRB/6 \rceil$). X having a 64-bit length is obtained by applying eight 8-bit input/output functions S( ) in parallel to W having a 64-bit length. Then, Y having a 64-bit length is obtained by applying a 64-bit input/output function DO to X having a 64-bit length. Then, Z is obtained by selecting upper HR (Plen) bits of Y having a 64-bit length. Thereafter, the encryption round function values ($P_L$, $P_R$) are output after $P_L = P_R \oplus Z$ and $P_R = P_L$ are set.

The 2-4-th encryption round units 135 sequentially receive encryption round function values ($P_L$, $P_R$) which are output from a previous encryption round, the length of plaintext (Plen), encryption/decryption keys B ($KB_4$, $KB_{10}$, ..., $KB_{6-\lceil NRB/6 \rceil-2}$), and output encryption round function values ($P_L$, $P_R$). Here, the received encryption round function values ($P_L$, $P_R$) output from the previous encryption round may be a combination of $P_L$ having an HR(Plen)-bit length and $P_R$ having an HL(Plen)-bit length. The length of plaintext (Plen) may have a value ranging from 8 to 128. The encryption/decryption keys B($KB_4$, $KB_{10}$, ..., $KB_{6-\lceil NRB/6 \rceil-2}$) may include $\lceil NRB/6 \rceil$ values, each having a 128-bit length. Further, the output encryption round function values ($P_L$, $P_R$) may be a combination of $P_L$ having an HL(Plen)-bit length and a $P_R$ having an HR(Plen)-bit length.

Figure 37:
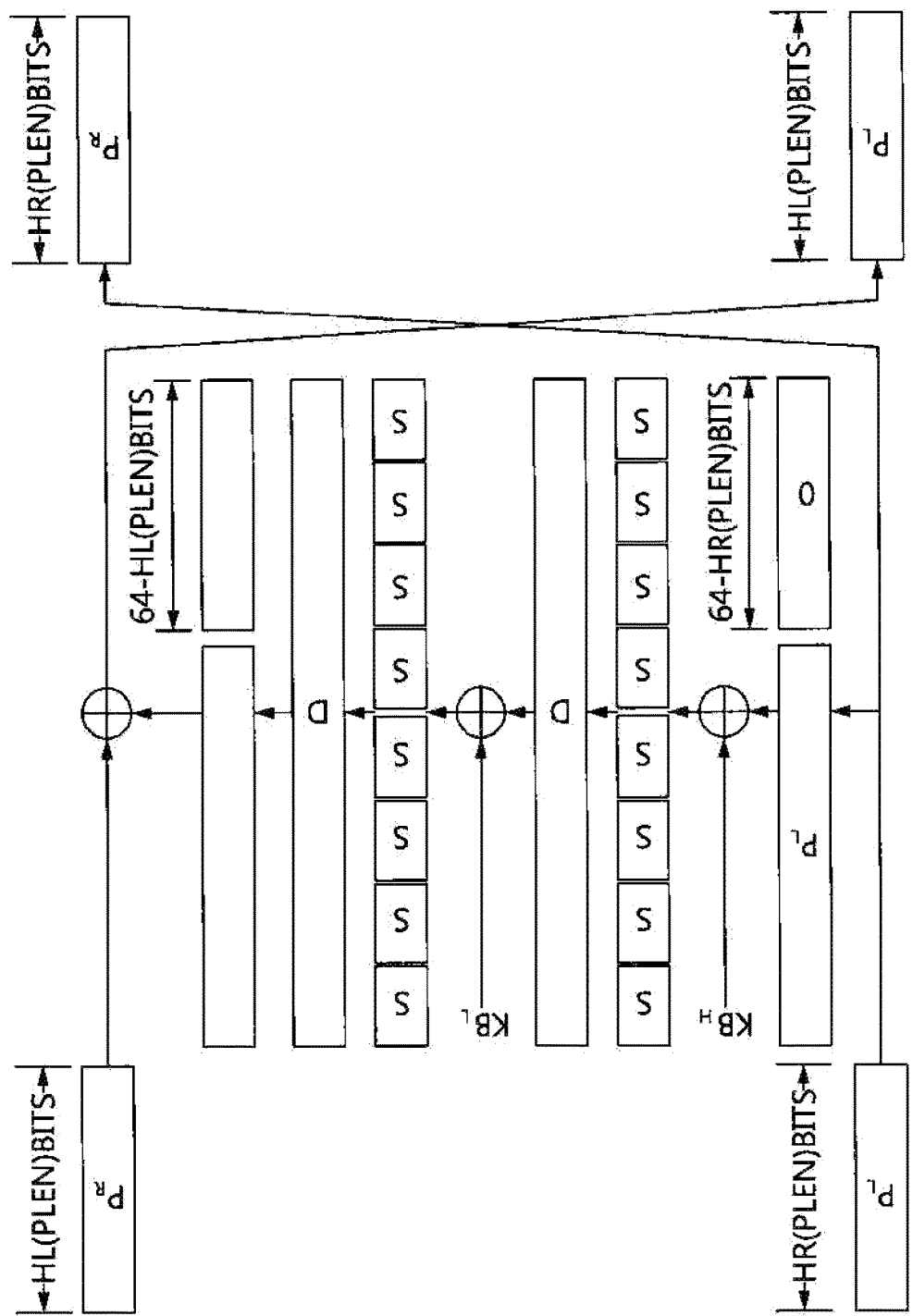
FIG. 37 is a diagram showing an example of an algorithm used by a 2-4-th encryption round unit shown in FIGS. 24 and 25 to generate encryption round function values.

An example of an algorithm generated by the 2-4-th encryption round units 135 to generate encryption round function values ($P_L$, $P_R$) will be described in detail with reference to FIG. 37. Referring to FIG. 37, the 2-4-th encryption round units 135 sequentially receive encryption round function values ($P_L$, $P_R$) which are output from a previous round, the length of plaintext (Plen), and encryption/decryption keys B($KB_4$, $KB_{10}$, ..., $KB_{6-\lceil NRB/6 \rceil-2}$). Then, each 2-4-th encryption round unit 135 configures A having a 64-bit length by connecting 0's corresponding to a 64-HR(Plen)-bit length to a portion after $P_L$ having an HR(Plen)-bit length. B having a 64-bit length is calculated by performing an XOR operation on A having a 64-bit length and upper 64 bits ($KB_H$) of $KB_{6i-2}$($1 \le i \le \lceil NRB/6 \rceil$). U having a 64-bit length is obtained by applying eight 8-bit input/output functions S( ) in parallel to B having a 64-bit length. V having a 64-bit length is obtained by applying a 64-bit input/output function D( ) to U having a 64-bit length. W having a 64-bit length is calculated by performing an XOR operation on V having a 64-bit length and lower 64 bits ($KB_L$) of $KB_{6i-2}$($1 \le i \le \lceil NRB/6 \rceil$). X having a 64-bit length is obtained by applying eight 8-bit input/output functions S( ) in parallel to W having a 64-bit length. Y having a 64-bit length is obtained by applying a 64-bit input/output function D( ) to X having a 64-bit length. Then, Z is obtained by selecting upper HL (Plen) bits of Y having a 64-bit length. Next, encryption round function values ($P_L$, $P_R$) are output after $P_L = P_R \oplus Z$ and $P_R = P_L$ are set.

The 2-5-th encryption round units 136 sequentially receive the encryption round function values ($P_L$, $P_R$) which are output from a previous encryption round, the length of plaintext (Plen), encryption/decryption tweak B($TB_0$), and encryption/decryption keys B ($KB_5$, $KB_{11}$, ..., $KB_{6-\lceil NRB/6 \rceil-1}$), and output encryption round function values ($P_L$, $P_R$). Here, the received encryption round function values ($P_L$, $P_R$) output from the previous encryption round may be a combination of $P_L$ having an HL(Plen)-bit length and $P_R$ having an HR(Plen)-bit length. The length of plaintext (Plen) may have a value ranging from 8 to 128. The encryption/decryption tweak B($TB_0$) may have a 64-bit length. The encryption/decryption keys B ($KB_5$, $KB_{11}$, ..., $KB_{6-\lceil NRB/6 \rceil-1}$) may include $\lceil NRB/6 \rceil$ values, each having a 128-bit length. Further, the output encryption round function values ($P_L$, $P_R$) may be a combination of $P_L$ having an HR(Plen)-bit length and $P_R$ having an HL(Plen)-bit length.

Figure 38:
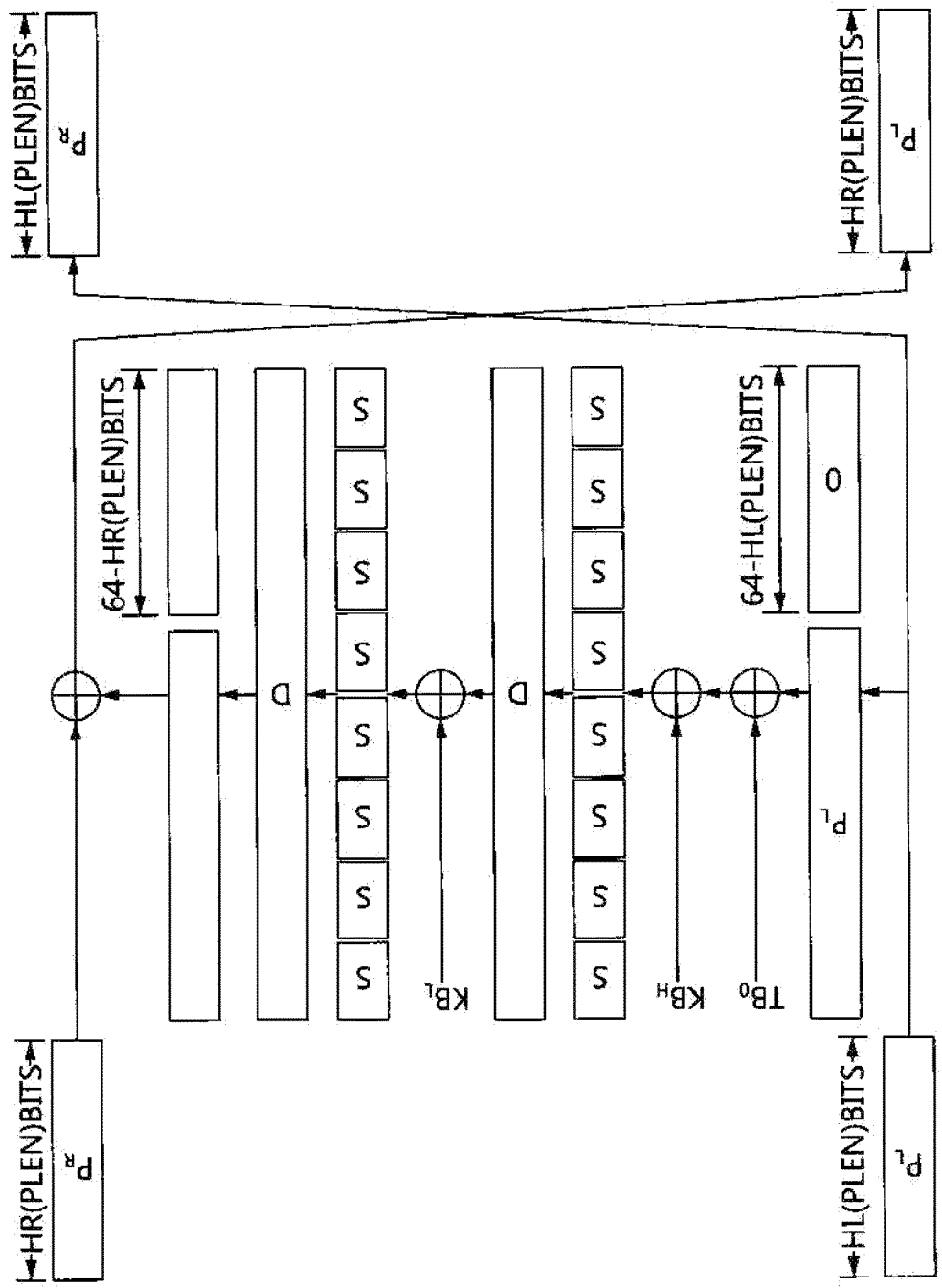
FIG. 38 is a diagram showing an example of an algorithm used by a 2-5-th encryption round unit shown in FIGS. 24 and 25 to generate encryption round function values.

An example of an algorithm used by the 2-5-th encryption round units 136 to generate the encryption round function values ($P_L$, $P_R$) will be described in detail with reference to FIG. 38. Referring to FIG. 38, the 2-5-th encryption round units 136 sequentially receive the encryption round function values ($P_L$, $P_R$) which are output from a previous encryption round, the length of plaintext (Plen), the encryption/decryption tweak B($TB_0$), and the encryption/decryption keys B ($KB_5$, $KB_{11}$, ..., $KB_{6-\lceil NRB/6 \rceil-1}$). Then, each 2-5-th encryption round unit 136 configures A having a 64-bit length by connecting 0's corresponding to a 64-HL(Plen)-bit length to a portion after $P_L$ having an HL(Plen)-bit length. Then, B having a 64-bit length is calculated by performing an XOR operation on A having a 64-bit length and $TB_0$ having a 64-bit length. E having a 64-bit length is calculated by performing an XOR operation on B having a 64-bit length and upper 64 bits ($KB_H$) of $KB_{6i-1}$($1 \le i \le \lceil NRB/6 \rceil$). U having a 64-bit length is obtained by applying eight 8-bit input/output functions S( ) in parallel to E having a 64-bit length. V having a 64-bit length is obtained by applying a 64-bit input/output function D( ) to U having a 64-bit length. W having a 64-bit length is calculated by performing an XOR operation on V having 64-bit length and lower 64 bits ($KB_L$) of $KB_{6i-1}$($1 \le i \le \lceil NRB/6 \rceil$). X having a 64-bit length is obtained by applying eight 8-bit input/output functions S( ) in parallel to W having a 64-bit length. Y having a 64-bit length is obtained by applying a 64-bit input/output function D( ) to X having a 64-bit length. Then, Z is obtained by selecting upper HR(Plen) bits of Y having a 64-bit length. Thereafter, the encryption round function values ($P_L$, $P_R$) are output after $P_L = P_R \oplus Z$ and $P_R = P_L$ are set.

The 2-6-th encryption round units 137 sequentially receive encryption round function values ($P_L$, $P_R$) which are output from a previous encryption round, the length of plaintext (Plen), encryption/decryption tweak B($TB_1$), and encryption/decryption keys B($KB_6$, $KB_{12}$, ..., $KB_{6-\lceil NRB/6 \rceil}$), and output encryption round function values ($P_L$, $P_R$). Here, the received encryption round function values ($P_L$, $P_R$) output from the previous encryption round may be a combination of $P_L$ having an HR(Plen)-bit length and $P_R$ having an HL(Plen)-bit length. The length of plaintext (Plen) may have a value ranging from 8 to 128. The encryption/decryption tweak B($TB_1$) may have a 64-bit length. The encryption/decryption keys B ($KB_6$, $KB_{12}, \ldots, KB_{6 \cdot \lceil NRB/6 \rceil}$) may include $\lceil NRB/6 \rceil$ values, each having a 128-bit length. Further, the output encryption round function values ($P_L$, $P_R$) may be a combination of $P_L$ having an HL(Plen)-bit length and $P_R$ having an HR(Plen)-bit length.

Figure 39:
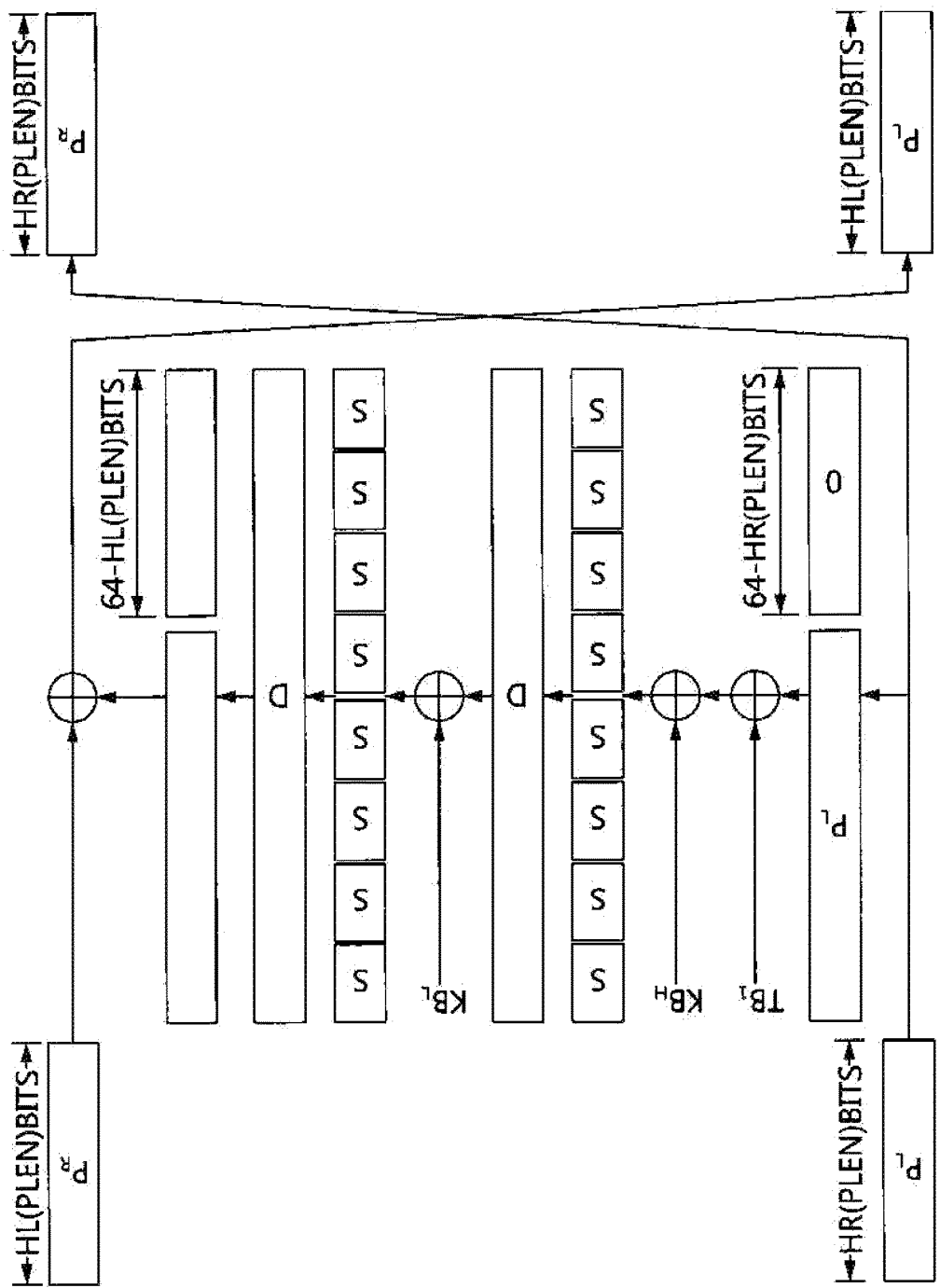
FIG. 39 is a diagram showing an example of an algorithm used by a 2-6-th encryption round unit shown in FIGS. 24 and 25 to generate encryption round function values.

An example of an algorithm used by the 2-6-th encryption round units 137 to generate encryption round function values ($P_L$, $P_R$) will be described in detail with reference to FIG. 39. Referring to FIG. 39, the 2-6-th encryption round units 137 sequentially receive encryption round function values ($P_L$, $P_R$) which are output from a previous encryption round, the length of plaintext (Plan), the encryption/decryption tweak B($TB_1$), and the encryption/decryption keys B($KB_6$, $KB_{12}$, KB . . . , $KB_{6 \cdot \lceil NRB/6 \rceil}$). Then, each 2-6-th encryption round unit 137 configures A having a 64-bit length by connecting 0's corresponding to a 64-HR(Plen)-bit length to a portion after $P_L$ having an HR(Plen)-bit length. B having a 64-bit length is calculated by performing an XOR operation on A having a 64-bit length and $TB_1$ having a 64-bit length. E having a 64-bit length is calculated by performing an XOR operation on B having a 64-bit length and upper 64 bits ($KB_H$) of $KB_{6i}(1 \leq i \leq \lceil NRB/6 \rceil)$. U having a 64-bit length is calculated by applying eight 8-bit input/output functions S( ) in parallel to E having a 64-bit length. V having a 64-bit length is obtained by applying a 64-bit input/output function D( ) to U having a 64-bit length. W having a 64-bit length is calculated by performing an XOR operation on V having a 64-bit length and lower 64 bits ($KB_L$) of $KB_{6i}(1 \leq i \leq \lceil NRB/6 \rceil)$. X having a 64-bit length is obtained by applying eight 8-bit input/output functions S( ) in parallel to W having a 64-bit length. Y having a 64-bit length is obtained by applying a 64-bit input/output function D( ) to X having a 64-bit length. Z is obtained by selecting upper HL(Plen) bits of Y having a 64-bit length. Then, the encryption round function values ($P_L$, $P_R$) are output after $P_L = P_R \oplus Z$ and $P_R = P_L$ are set.

The third encryption round unit 138 receives the encryption round function values ($P_L$, $P_R$) which are output from a previous encryption round, the length of a secret key (MKlen), and the length of plaintext (Plen), and then outputs ciphertext C. When the length of the secret key (MKlen) is 128 or 256 bits, the received encryption round function values ($P_L$, $P_R$) output from the previous encryption round may be a combination of $P_L$ having an HL(Plen)-bit length and $P_R$ having an HR(Plen)-bit length. When the length of the secret key (MKlen) is 192 bits, the received encryption round function values ($P_L$, $P_R$) output from the previous encryption round may be a combination of $P_L$ having an HR(Plen)-bit length and $P_R$ having an HL(Plen)-bit length. In this way, the length of the secret key (MKlen) may be 128, 192 or 256 bits. The length of the plaintext (Plen) may have a value ranging from 8 to 128. Further, the output ciphertext C may have a Plen-bit length.

Figure 40:
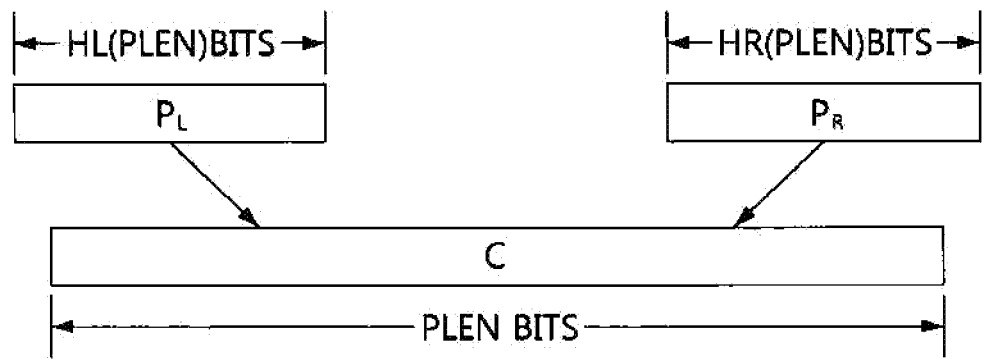
FIG. 40 is a diagram showing an example of an algorithm used by a third encryption round unit shown in FIGS. 24 and 25 to generate ciphertext when the length of a secret key is 128 or 256 bits.

An example of an algorithm used by the third encryption round unit 138 to generate ciphertext C when the length of the secret key (MKlen) is 128 or 256 bits will be described in detail with reference to FIG. 40. Referring to FIG. 40, the third encryption round unit 138 receives encryption round function values ($P_L$, $P_R$) which are output from a previous encryption round, the length of the secret key (MKlen), and the length of plaintext (Plen). Then, the third encryption round unit 138 outputs ciphertext C having a Plen-bit length by connecting two values $P_L$ and $P_R$ to each other.

Figure 41:
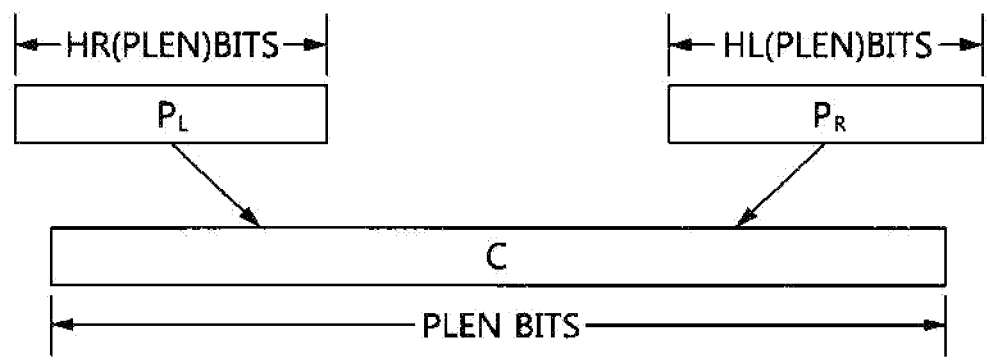
FIG. 41 is a diagram showing an example of an algorithm used by the third encryption round unit shown in FIGS. 24 and 25 to generate ciphertext when the length of a secret key is 192 bits.

Meanwhile, an example of an algorithm used by the third encryption round unit 138 to generate ciphertext C when the length of the secret key (MKlen) is 192 bits will be described in detail with reference to FIG. 41. Referring to FIG. 41, the third encryption round unit 138 receives encryption round function values ($P_L$, $P_R$) which are output from a previous encryption round, the length of the secret key (MKlen), and the length of plaintext (Plen). Then, the third encryption round unit 138 outputs ciphertext C having a Plen-bit length by connecting two values $P_L$ and $P_R$ to each other.

The above-described 2-1-th encryption round units 132 and 2-4-th encryption round units 135 are collectively designated as a 2-1-th encryption round unit in the accompanying claims (claim 7) of the present invention. The above-described 2-2-th encryption round units 133 and 2-5-th encryption round units 136 are collectively designated as a 2-2-th encryption round unit in the accompanying claims (claim 7) of the present invention. The above-described 2-3-th encryption round units 134 and 2-6-th encryption round units 137 are collectively designated as a 2-3-th encryption round unit in the accompanying claims (claim 7) of the present invention.

FIG. 42 is a block diagram showing a decryption device in the apparatus for providing a Feistel-based variable length block cipher, which receives a tweak having any bit length, according to an embodiment of the present invention when the length of a secret key (MKlen) is 128 or 256 bits, and FIG. 43 is a block diagram showing a decryption device in the apparatus for providing a Feistel-based variable length block cipher, which receives a tweak having any bit length, according to an embodiment of the present invention when the length of a secret key (MKlen) is 192 bits. Hereinafter, components having the same names as components described in the encryption device have the same functions as the above-described components, and thus a detailed description thereof will be omitted.

A decryption device 200 shown in FIGS. 42 and 43 includes an encryption/decryption key generation unit 210, an encryption/decryption tweak generation unit 220, and a plaintext reconstruction unit 230.

The plaintext reconstruction unit 230 may reconstruct plaintext P having the same bit length as ciphertext C using the ciphertext C, the length of the ciphertext (Clen), the length of a secret key (MKlen), generated encryption/decryption keys B($KB_1$, $KB_2$, . . . , $KB_{NRB}$), and encryption/decryption tweaks B($TB_0$, $TB_1$).

The plaintext reconstruction unit 230 may include a first decryption round unit 231, 2-1-th decryption round units 232, 2-2-th decryption round units 233, 2-3-th decryption round units 234, 2-4-th decryption round units 235, 2-5-th decryption round units 236, 2-6-th decryption round units 237, and a third decryption round unit 238.

The first decryption round unit 231 receives ciphertext C, the length of the ciphertext (Clen), and the length of the secret key (MKlen), and outputs decryption round function values ($C_L$, $C_R$). Here, the received ciphertext C may have a Clen-bit length. The length of the ciphertext (Clen) may have a value ranging from 8 to 128. The length of the secret key (MKlen) may be 128, 192, or 256 bits. Further, when the length of the secret key (MKlen) is 128 or 256 bits, the output decryption round function values ($C_L$, $C_R$) may include $C_L$ having an HL(Clen)-bit length and $C_R$ having an HR(Clen)-bit length. When the length of the secret key (MKlen) is 192 bits, the decryption round function values ($C_L$, $C_R$) may include $C_L$ having an HR(Clen)-bit length and $C_R$ having an HL(Clen)-bit length.

Figure 44:
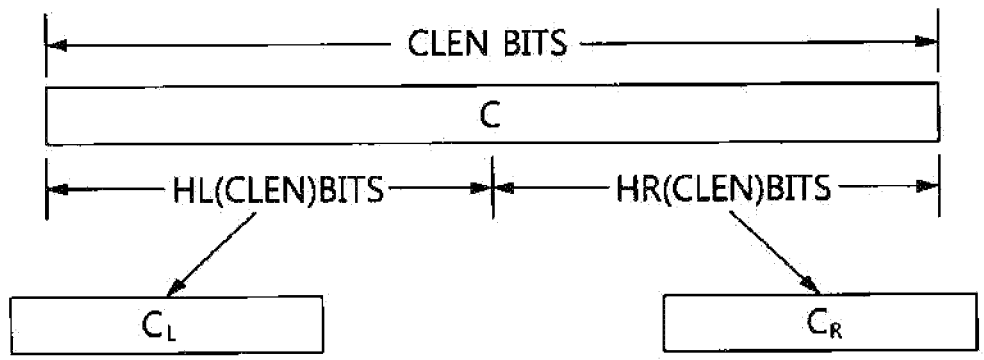
FIG. 44 is a diagram showing an example of an algorithm used by a first decryption round unit shown in FIGS. 42 and 43 to generate decryption round function values when the length of a secret key is 128 or 256 bits.

An example of an algorithm used by the first decryption round unit 231 to generate decryption round function values ($C_L$, $C_R$) when the length of the secret key (MKlen) is 128 or 256 bits will be described in detail with reference to FIG. 44. Referring to FIG. 44, when the length of the secret key (MKlen) is 128 or 256 bits, the first decryption round unit 231 receives ciphertext C and the length of the ciphertext (Clen). Then, the first decryption round unit 231 divides the ciphertext C into upper HL(Clen) bits and lower HR(Clen) bits, and outputs decryption round function values $C_L$ and $C_R$.

Figure 45:
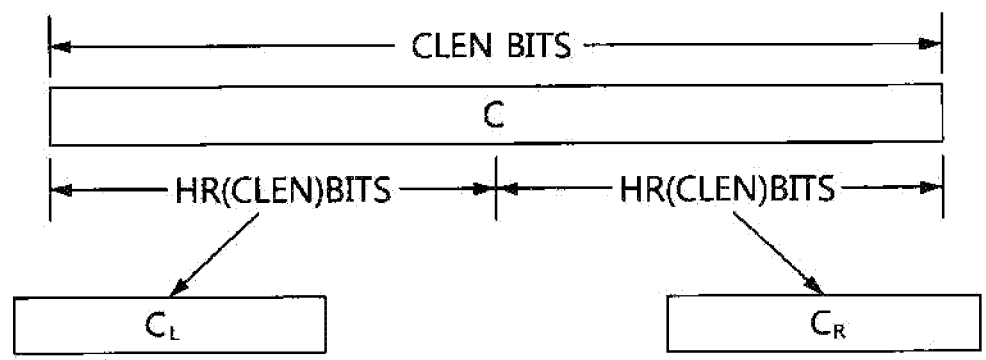
FIG. 45 is a diagram showing an example of an algorithm used by the first decryption round unit shown in FIGS. 42 and 43 to generate decryption round function values when the length of a secret key is 192 bits.

An example of an algorithm used by the first decryption round unit 231 to generate decryption round function values $(C_L, C_R)$ when the length of the secret key (MKlen) is 192 bits will be described in detail with reference to FIG. 45. Referring to FIG. 45, when the length of the secret key (MKlen) is 192 bits, the first decryption round unit 231 receives ciphertext C and the length of the ciphertext (Clen). The first decryption round unit 231 divides the ciphertext C into upper HR(Clen) bits and lower HL(Clen) bits and outputs decryption round function values $C_L$ and $C_R$.

The 2-1-th decryption round units 232 sequentially receive decryption round function values $(C_L, C_R)$ which are output from a previous decryption round, the length of ciphertext (Clen), encryption/decryption tweak $B(TB_1)$, and encryption/decryption keys $B(KB_{6-\lceil NRB/6 \rceil}, KB_{6-\lceil NRB/6 \rceil-6}, \ldots, KB_6)$, and output decryption round function values $(C_L, C_R)$. Here, the received decryption round function values $(C_L, C_R)$ output from the previous decryption round may include $C_L$ having an HL(Clen)-bit length and $C_R$ having an HR(Clen)-bit length. The length of the ciphertext (Clen) may have a value ranging from 8 to 128. The encryption/decryption tweak $B(TB_1)$ may have a 64-bit length. The encryption/decryption keys $B(KB_{6-\lceil NRB/6 \rceil}, KB_{6-\lceil NRB/6 \rceil-6}, \ldots, KB_6)$ may include $\lceil NRB/6 \rceil$ values, each having a 128-bit length. Further, the output decryption round function values $(C_L, C_R)$ may have $C_L$ having an HR(Clen)-bit length and $C_R$ having an HL(Clen)-bit length.

Figure 46:
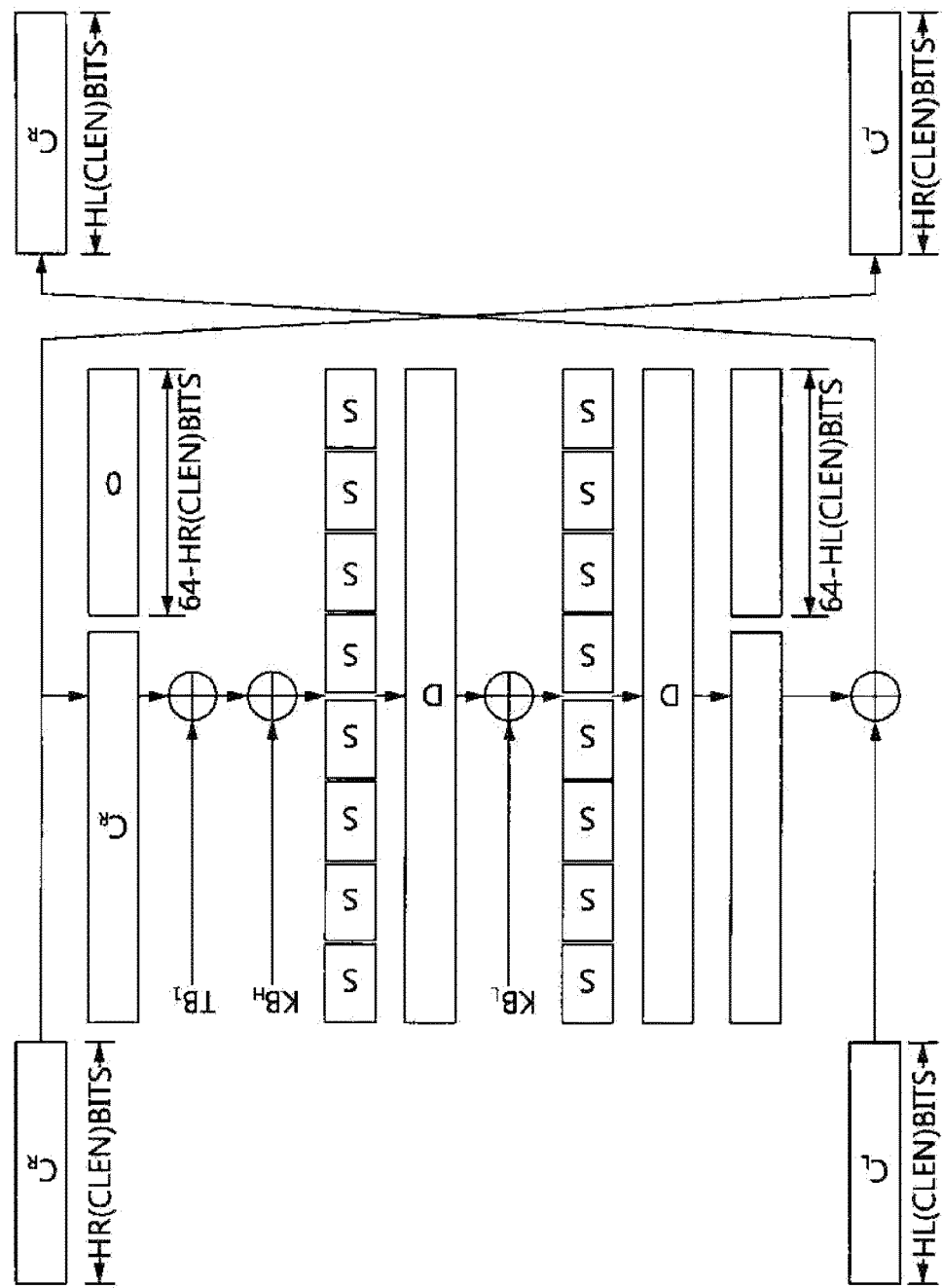
FIG. 46 is a diagram showing an example of an algorithm used by a 2-1-th decryption round unit shown in FIGS. 42 and 43 to generate decryption round function values.

An example of an algorithm used by the 2-1-th decryption round units 232 to generate the decryption round function values $(C_L, C_R)$ will be described in detail with reference to FIG. 46. Referring to FIG. 46, the 2-1-th decryption round units 232 sequentially receive the decryption round function values $(C_L, C_R)$ which are output from a previous decryption round, the length of ciphertext (Clen), the encryption/decryption tweak $B(TB_1)$, and the encryption/decryption keys $B(KB_{6-\lceil NRB/6 \rceil}, KB_{6-\lceil NRB/6 \rceil-6}, \ldots, KB_6)$. Then, each 2-1-th decryption round unit 232 configures A having a 64-bit length by connecting 0's corresponding to a 64-HR(Clen)-bit length to a portion after $C_R$ having an HR(Clen)-bit length. B having a 64-bit length is calculated by performing an XOR operation on A having a 64-bit length and $TB_1$ having a 64-bit length. E having a 64-bit length is calculated by performing an XOR operation on B having a 64-bit length and upper 64 bits $(KB_H)$ of $KB_{6-\lceil NRB/6 \rceil+6-6i}$, $(1 \le i \le \lceil NRB/6 \rceil)$. U having a 64-bit length is obtained by applying eight 8-bit input/output functions S( ) in parallel to E having a 64-bit length. V having a 64-bit length is obtained by applying a 64-bit input/output function D( ) to U having a 64-bit length. W having a 64-bit length is calculated by performing an XOR operation on V having a 64-bit length and lower 64 bits $(KB_L)$ of $KB_{6-\lceil NRB/6 \rceil+6-6i}$ $(1 \le i \le \lceil NRB/6 \rceil)$. X having a 64-bit length is obtained by applying eight 8-bit input/output functions S( ) in parallel to W having a 64-bit length. Then, Y having a 64-bit length is obtained by applying a 64-bit input/output function DO to X having a 64-bit length. Next. Z is obtained by selecting upper HL(Clen) bits of Y having a 64-bit length. Then, the decryption round function values $(C_L, C_R)$ are output after $C_L = C_R$ and $C_R = C_L \oplus Z$ are set.

The 2-2-th decryption round units 233 sequentially receive decryption round function values $(C_L, C_R)$ which are output from a previous decryption round, the length of ciphertext (Clen), encryption/decryption tweak $B(TB_0)$, and encryption/decryption keys $B(KB_{6-\lceil NRB/6 \rceil-1}, KB_{6-\lceil NRB/6 \rceil-7}, \ldots, KB_5)$, and output decryption round function values $(C_L, C_R)$. In this case, the received decryption round function values $(C_L, C_R)$ output from the previous decryption round may include $C_L$ having an HR(Clen)-bit length and $C_R$ having an HL(Clen)-bit length. The length of ciphertext (Clen) may have a value ranging from 8 to 128. The encryption/decryption tweak $B(TB_0)$ may have a 64-bit length. The encryption/decryption keys $B(KB_{6-\lceil NRB/6 \rceil-1}, KB_{6-\lceil NRB/6 \rceil-7}, \ldots, KB_5)$ may include $\lceil NRB/6 \rceil$ values, each having a 128-bit length. Further, the output encryption round function values $(C_L, C_R)$ may include $C_L$ having an HL(Clen)-bit length and $C_R$ having an HR(Clen)-bit length.

Figure 47:
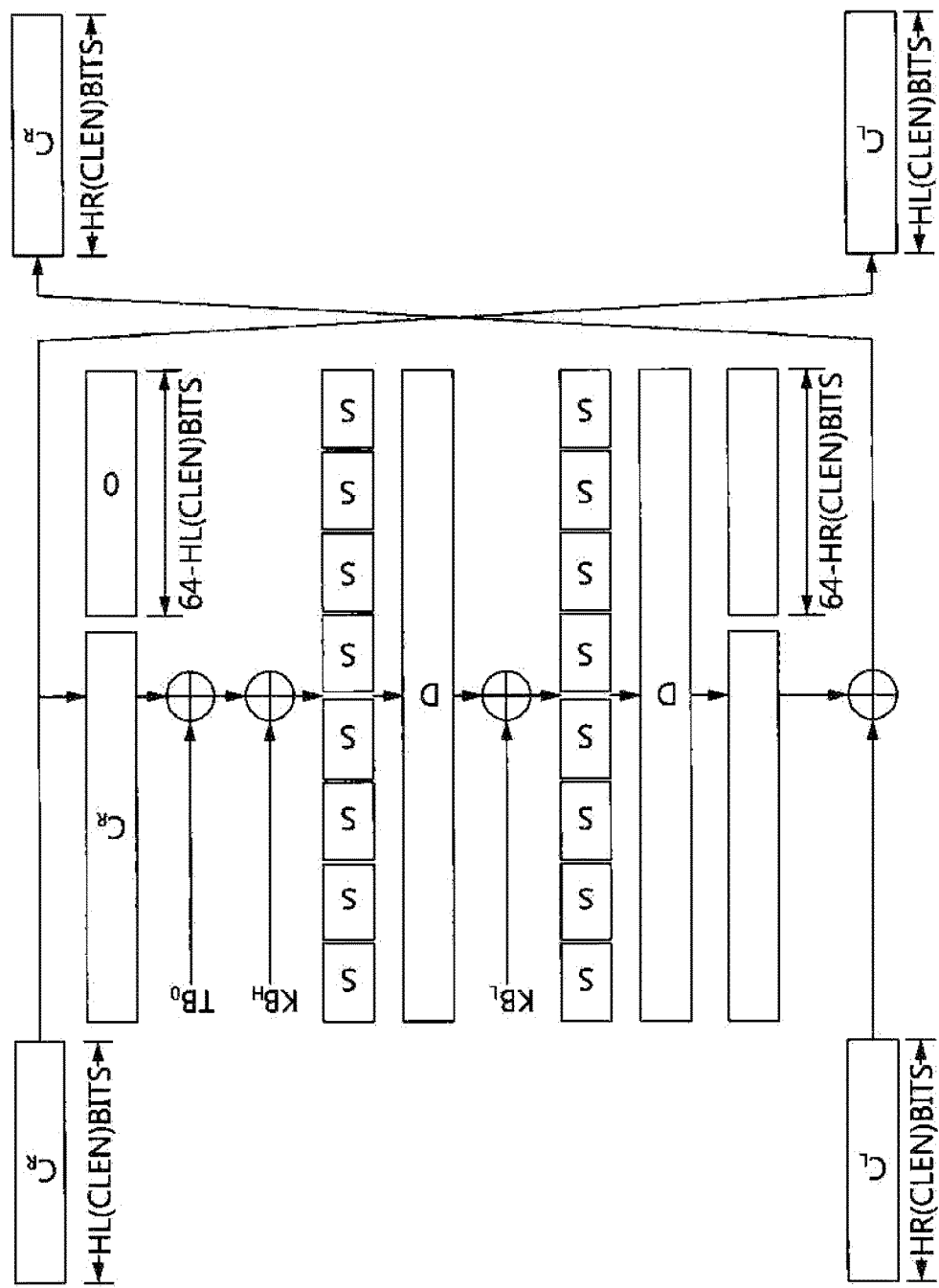
FIG. 47 is a diagram showing an example of an algorithm used by a 2-2-th decryption round unit shown in FIGS. 42 and 43 to generate decryption round function values.

An example of an algorithm used by the 2-2-th decryption round units 233 to generate decryption round function values $(C_L, C_R)$ will be described in detail with reference to FIG. 47. Referring to FIG. 47, the 2-2-th decryption round units 233 sequentially receive decryption round function values $(C_L, C_R)$ which are output from a previous decryption round, the length of ciphertext (Clen), the encryption/decryption tweak $B(TB_0)$, and the encryption/decryption keys $B(KB_{6-\lceil NRB/6 \rceil-1}, KB_{6-\lceil NRB/6 \rceil-7}, \ldots, KB_5)$. Then, each 2-2-th decryption round unit 233 configures A having a 64-bit length by connecting 0's corresponding to a 64-HL(Clen)-bit length to a portion after $C_R$ having an HL(Clen)-bit length. B having a 64-bit length is calculated by performing an XOR operation on A having a 64-bit length and $TB_0$ having a 64-bit length. E having a 64-bit length is calculated by performing an XOR operation on B having a 64-bit length and upper 64 bits $(KB_H)$ of $KB_{6-\lceil NRB/6 \rceil+5-6i}$ $(1 \le i \le \lceil NRB/6 \rceil)$. U having a 64-bit length is obtained by applying eight 8-bit input/output functions S( ) in parallel to E having a 64-bit length. V having a 64-bit length is obtained by applying a 64-bit input/output function D( ) to U having a 64-bit length. W having a 64-bit length is calculated by performing an XOR operation on V having a 64-bit length and lower 64 bits $(KB_L)$ of $KB_{6-\lceil NRB/6 \rceil+5-6i}$ $(1 \le i \le \lceil NRB/6 \rceil)$. X having a 64-bit length is calculated by applying eight 8-bit input/output functions S( ) in parallel to W having a 64-bit length. Y having a 64-bit length is obtained by applying a 64-bit input/output function D( ) to X having a 64-bit length. Then, Z is obtained by selecting upper HR(Clen) bits of Y having a 64-bit length. Then, decryption round function values $(C_L, C_R)$ are output after $C_L = C_R$ and $C_R = C_L \beta Z$ are set.

The 2-3-th decryption round units 234 sequentially receive decryption round function values $(C_L, C_R)$ which are output from a previous decryption round, the length of ciphertext (Clen), and encryption/decryptions keys $B(KB_{6-\lceil NRB/6 \rceil-2}, KB_{6-\lceil NRB/6 \rceil-8}, \ldots, KB_4)$, and output decryption round function values $(C_L, C_R)$. Here, the received decryption round function values $(C_L, C_R)$ output from the previous decryption round may include $C_L$ having an HL(Clen)-bit length and $C_R$ having an HR(Clen)-bit length. The length of ciphertext (Clen) may have a value ranging from 8 to 128. The encryption/decryption keys $B(KB_{6-\lceil NRB/6 \rceil-2}, KB_{6-\lceil NRB/6 \rceil-8}, \ldots, KB_4)$ may include $\lceil NRB/6 \rceil$ values, each having a 128-bit length. Further, the output decryption round function values $(C_L, C_R)$ may include $C_L$ having an HR(Clen)-bit length and $C_R$ having an HL(Clen)-bit length.

Figure 48:
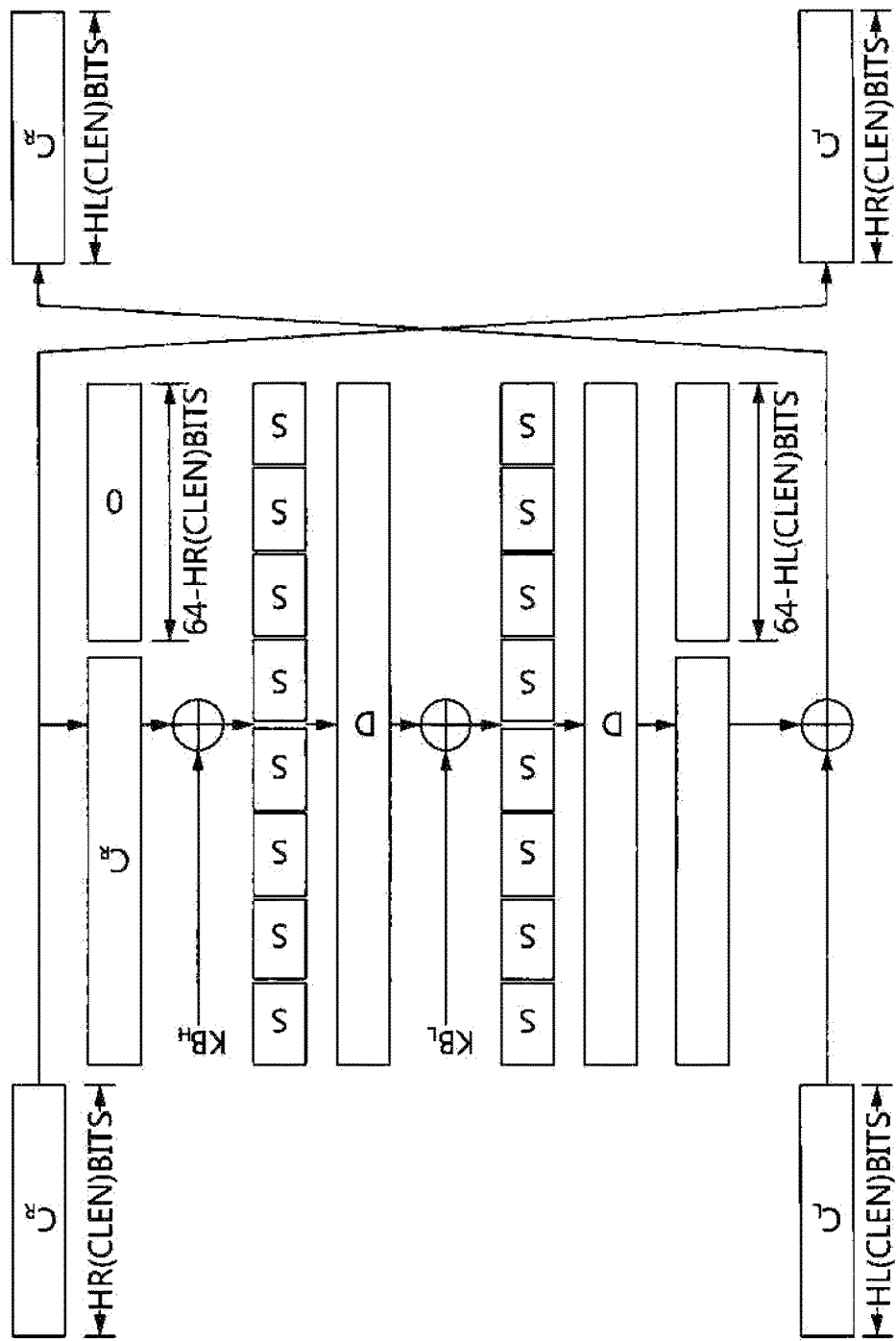
FIG. 48 is a diagram showing an example of an algorithm used by a 2-3-th decryption round unit shown in FIGS. 42 and 43 to generate decryption round function values.

An example of an algorithm used by the 2-3-th decryption round units 234 to generate decryption round function values ($C_L$, $C_R$) will be described in detail with reference to FIG. 48. Referring to FIG. 48, the 2-3-th decryption round units 234 sequentially receive decryption round function values ($C_L$, $C_R$) which are output from a previous decryption round, the length of ciphertext (Clen), and encryption/decryption keys B($KB_{6-\lceil NRB/6 \rceil-2}$, $KB_{6-\lceil NRB/6 \rceil-8}$, ..., $KB_4$). Then, each 2-3-th decryption round unit 234 configures A having a 64-bit length by connecting 0's corresponding to a 64-HR(Clen)-bit length to a portion after $C_R$ having an HR(Clen)-bit length. B having a 64-bit length is calculated by performing an XOR operation on A having a 64-bit length and upper 64 bits ($KB_H$) of $KB_{6-\lceil NRB/6 \rceil+4-6i}$ ($1 \leq i \leq \lceil NRB/6 \rceil$). U having a 64-bit length is obtained by applying eight 8-bit input/output functions S( ) in parallel to B having a 64-bit length. V having a 64-bit length is obtained by applying a 64-bit input/output function D( ) to U having a 64-bit length. W having a 64-bit length is calculated by performing an XOR operation on V having a 64-bit length and lower 64 bits ($KB_L$) of $KB_{6-\lceil NRB/6 \rceil+4-6i}$ ($1 \leq i \leq \lceil NRB/6 \rceil$). X having a 64-bit length is obtained by applying eight 8-bit input/output functions S( ) in parallel to W having a 64-bit length. Y having a 64-bit length is obtained by applying a 64-bit input/output function D( ) to X having a 64-bit length. Next, Z is obtained by selecting upper HL(Clen) bits of Y having a 64-bit length. Then, the decryption round function values ($C_L$, $C_R$) are output after $C_L = C_R$ and $C_R = C_L \oplus Z$ are set.

The 2-4 decryption round units 235 sequentially receive the decryption round function values ($C_L$, $C_R$) which are output from a previous decryption round, the length of ciphertext (Clen), encryption/decryption tweak B($TB_1$), and encryption/decryption keys B ($KB_{6-\lceil NRB/6 \rceil-3}$, $KB_{6-\lceil NRB/6 \rceil-9}$, ..., $KB_3$), and output decryption round function values ($C_L$, $C_R$). Here, the received decryption round function values ($C_L$, $C_R$) output from the previous decryption round may include $C_L$ having an HR(Clen)-bit length and $C_R$ having an HL(Clen)-bit length. The length of ciphertext (Clen) may have a value ranging from 8 to 128. The encryption/decryption tweak B($TB_1$) may have a 64-bit length. The encryption/decryption keys B($KB_{6-\lceil NRB/6 \rceil-3}$, $KB_{6-\lceil NRB/6 \rceil-9}$, ..., $KB_3$) may include $\lceil NRB/6 \rceil$ values, each having a 128-bit length. Further, the output decryption round function values ($C_L$, $C_R$) may have $C_L$ having an HL(Clen)-bit length and $C_R$ having an HR(Clen)-bit length.

Figure 49:
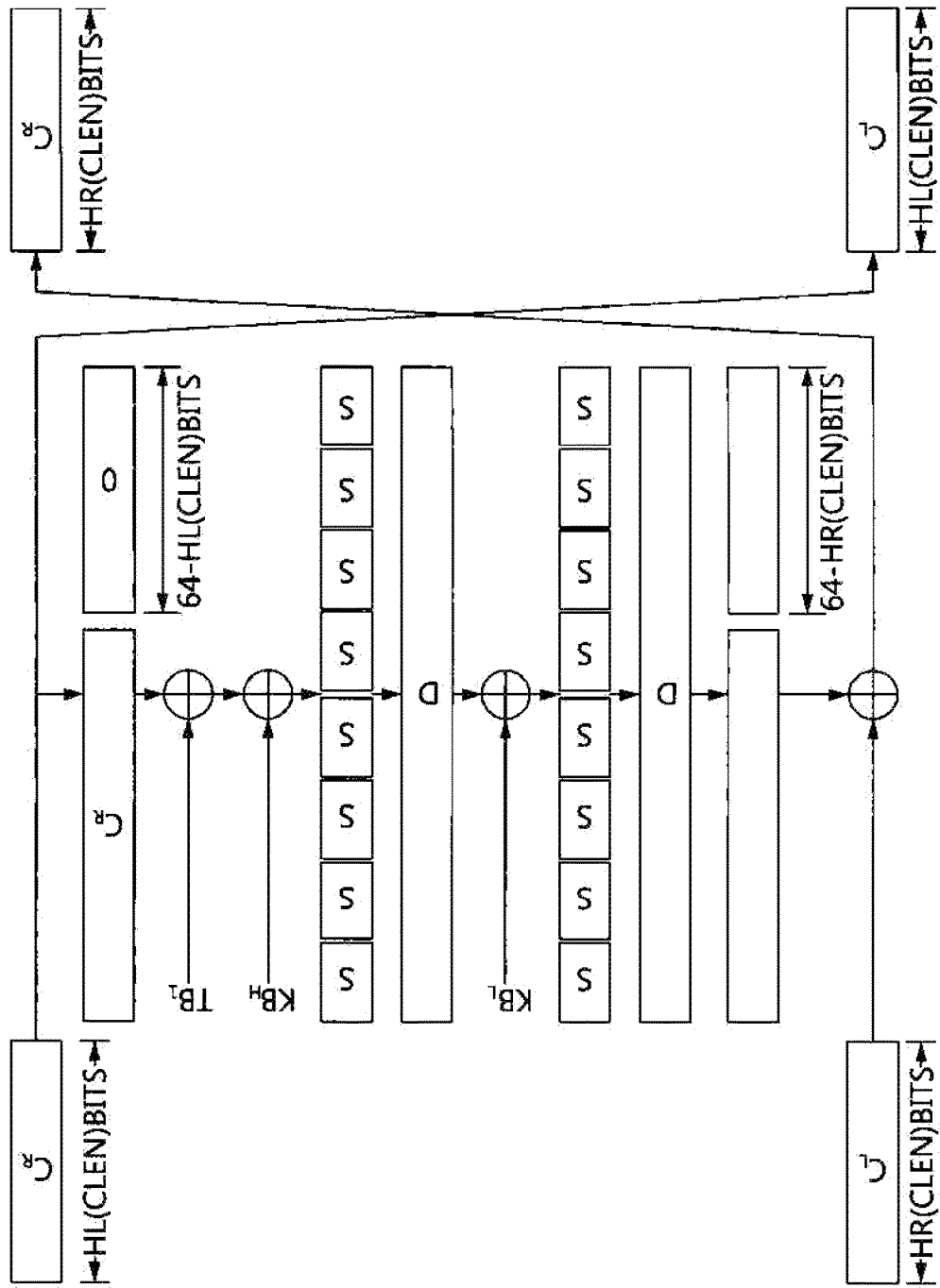
FIG. 49 is a diagram showing an example of an algorithm used by a 2-4-th decryption round unit shown in FIGS. 42 and 43 to generate decryption round function values.

An example of an algorithm used by the 2-4-th decryption round units 235 to generate decryption round function values ($C_L$, $C_R$) will be described in detail with reference to FIG. 49. Referring to FIG. 49, the 2-4-th decryption round units 235 sequentially receive decryption round function values ($C_L$, $C_R$) which are output from a previous decryption round, the length of ciphertext (Clen), the encryption/decryption tweak B($TB_1$), and the encryption/decryption keys B($KB_{6-\lceil NRB/6 \rceil-3}$, $KB_{6-\lceil NRB/6 \rceil-9}$, ..., $KB_3$). Then, each 2-4-th decryption round unit 235 configures A having a 64-bit length by connecting 0's corresponding to a 64-HL(Clen)-bit length to a portion after $C_R$ having an HL(Clen)-bit length. Then, B having a 64-bit length is calculated by performing an XOR operation on A having a 64-bit length and $TB_1$ having a 64-bit length. E having a 64-bit length is calculated by performing an XOR operation on B having a 64-bit length and upper 64 bits ($KB_H$) of $KB_{6-\lceil NRB/6 \rceil+3-6i}$ ($1 \leq i \leq \lceil NRB/6 \rceil$). U having a 64-bit length is obtained by applying eight 8-bit input/output functions S( ) in parallel to E having a 64-bit length. V having a 64-bit length is obtained by applying a 64-bit input/output function D( ) to U having a 64-bit length. W having a 64-bit length is calculated by performing an XOR operation on V having a 64-bit length and lower 64 bits ($KB_L$) of $KB_{6-\lceil NRB/6 \rceil+3-6i}$ ($1 \leq i \leq \lceil NRB/6 \rceil$). X having a 64-bit length is obtained by applying eight 8-bit input/output functions S( ) in parallel to W having a 64-bit length. Then, Y having a 64-bit length is obtained by applying a 64-bit input/output function DO to X having a 64-bit length. Thereafter, Z is obtained by selecting upper HR(Clen) bits of Y having a 64-bit length. Then, the decryption round function values ($C_L$, $C_R$) are output after $C_L = C_R$ and $C_R = C_L \oplus Z$ are set.

The 2-5-th decryption round units 236 sequentially receive encryption round function values ($C_L$, $C_R$) which are output from a previous decryption round, the length of ciphertext (Clen), encryption/decryption tweak B($TB_0$), and encryption/decryption keys B($KB_{6-\lceil NRB/6 \rceil-4}$, $KB_{6-\lceil NRB/6 \rceil-10}$, ..., $KB_2$), and output decryption round function values ($C_L$, $C_R$). In this case, the received decryption round function values ($C_L$, $C_R$) output from the previous decryption round may include $C_L$ having an HL(Clen)-bit length and $C_R$ having an HR(Clen)-bit length. The length of ciphertext (Clen) may have a value ranging from 8 to 128. The encryption/decryption tweak B($TB_0$) may have a 64-bit length. The encryption/decryption keys B($KB_{6-\lceil NRB/6 \rceil-4}$, $KB_{6-\lceil NRB/6 \rceil-10}$, ..., $KB_2$) may have $\lceil NRB/6 \rceil$ values, each having a 128-bit length. Further, the output decryption round function values ($C_L$, $C_R$) may include $C_L$ having an HR(Clen)-bit length and $C_R$ having an HL(Clen) bit length.

Figure 50:
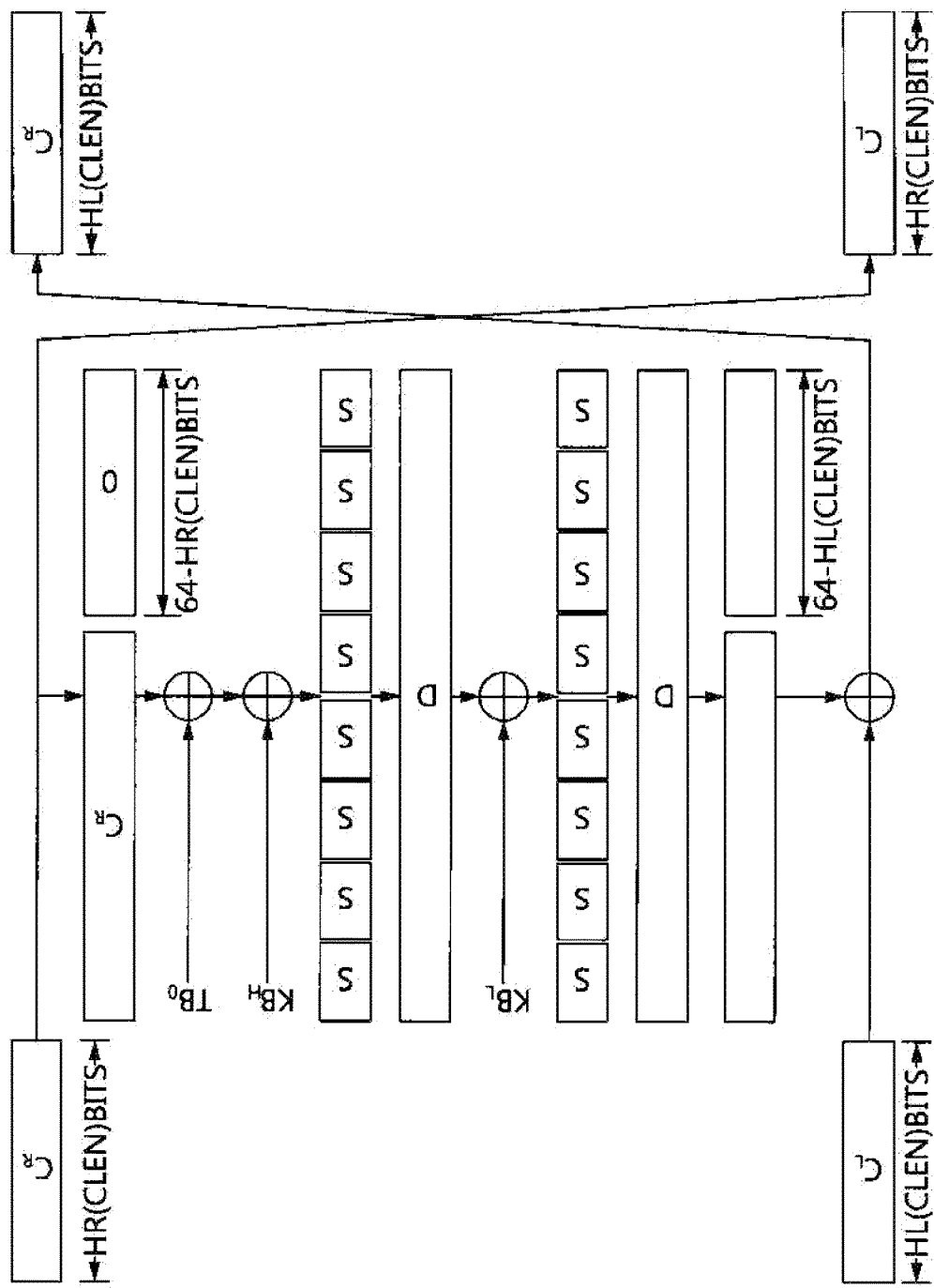
FIG. 50 is a diagram showing an example of an algorithm used by a 2-5-th decryption round unit shown in FIGS. 42 and 43 to generate decryption round function values.

An example of an algorithm used by the 2-5-th decryption round units 236 to generate the decryption round function values ($C_L$, $C_R$) will be described in detail with reference to FIG. 50. Referring to FIG. 50, the 2-5-th decryption round units 236 sequentially receive decryption round function values ($C_L$, $C_R$) which are output from a previous decryption round, the length of ciphertext (Clen), the encryption/decryption tweak B($TB_0$), and the encryption/decryption keys B($KB_{6-\lceil NRB/6 \rceil-4}$, $KB_{6-\lceil NRB/6 \rceil-10}$, ..., $KB_2$). Then, each 2-5-th decryption round unit 236 configures A having a 64-bit length by connecting 0's corresponding to a 64-HR(Clen)-bit length to a portion after $C_R$ having an HR(Clen)-bit length. B having a 64-bit length is calculated by performing an XOR operation on A having a 64-bit length and $TB_0$ having a 64-bit length. E having a 64-bit length is calculated by performing an XOR operation on B having a 64-bit length and upper 64 bits ($KB_H$) of $KB_{6-\lceil NRB/6 \rceil+2-6i}$ ($1 \leq i \leq \lceil NRB/6 \rceil$). U having a 64-bit length is obtained by applying eight 8-bit input/output functions S( ) in parallel to E having a 64-bit length. V having a 64-bit length is obtained by applying a 64-bit input/output function D( ) to U having a 64-bit length. W having a 64-bit length is calculated by performing an XOR operation on V having a 64-bit length and lower 64 bits ($KB_L$) of $KB_{6-\lceil NRB/6 \rceil+2-6i}$ ($1 \leq i \leq \lceil NRB/6 \rceil$). X having a 64-bit length is obtained by applying eight 8-bit input/output functions S( ) in parallel to W having a 64-bit length. Next, Y having a 64-bit length is obtained by applying a 64-bit input/output function DO to X having a 64-bit length. Thereafter, Z is obtained by selecting upper HL(Clen) bits of Y having a 64-bit length. Then, the decryption round function values ($C_L$, $C_R$) are output after $C_L = C_R$ and $C_R = C_L \oplus Z$ are set.

The 2-6-th decryption round units 237 sequentially receive the decryption round function values ($C_L$, $C_R$) which are output from a previous decryption round, the length of ciphertext (Clen), and encryption/decryption keys B($KB_{6-\lceil NRB/6 \rceil-5}$, $KB_{6-\lceil NRB/6 \rceil-11}$, ..., $KB_1$), and output decryption round function values ($C_L$, $C_R$). Here, the received decryption round function values ($C_L$, $C_R$) output from the previous decryption round may include $C_L$ having an HR(Clen)-bit length and $C_R$ having an HL(Clen)-bit length. The length of ciphertext (Clen) may have a value ranging from 8 to 128. The encryption/decryption keys $B(KB_{6-\lceil NRB/6 \rceil-5}, KB_{6-\lceil NRB/6 \rceil-11}, \ldots, KB_1)$ may include $\lceil NRB/6 \rceil$ values, each having a 128-bit length. Further, the output decryption round function values ($C_L$, $C_R$) may include $C_L$ having an HL(Clen)-bit length and $C_R$ having an HR(Clen)-bit length.

Figure 51:
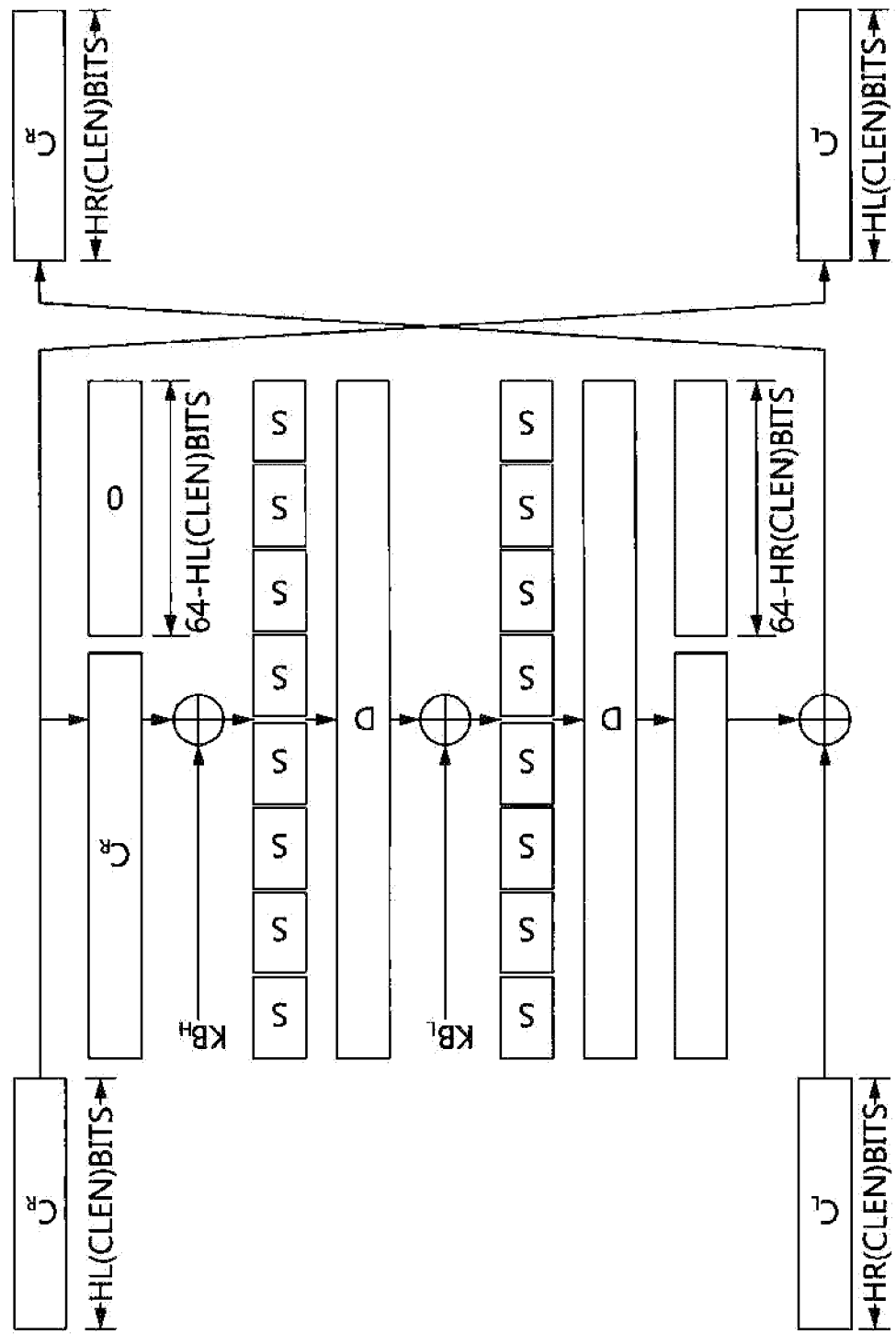
FIG. 51 is a diagram showing an example of an algorithm used by a 2-6-th decryption round unit shown in FIGS. 42 and 43 to generate decryption round function values.

An example of an algorithm generated by the 2-6-th decryption round units 237 to generate the decryption round function values ($C_L$, $C_R$) will be described in detail with reference to FIG. 51. Referring to FIG. 51, the 2-6-th decryption round units 237 sequentially receive decryption round function values ($C_L$, $C_R$) which are output from a previous decryption round, the length of ciphertext (Clen), and the encryption/decryption keys $B(KB_{6-\lceil NRB/6 \rceil-5}, KB_{6-\lceil NRB/6 \rceil-11}, \ldots, KB_1)$. Then, each 2-6-th decryption round unit 237 configures A having a 64-bit length by connecting 0's corresponding to a 64-HL(Clen)-bit length to a portion after $C_R$ having an HL(Clen)-bit length. B having a 64-bit length is calculated by performing an XOR operation on A having a 64-bit length and upper 64 bits ($KB_H$) of $KB_{6-\lceil NRB/6 \rceil+1-6i}$ ($1 \le i \le \lceil NRB/6 \rceil$). U having a 64-bit length is obtained by applying eight 8-bit input/output functions S( ) in parallel to B having a 64-bit length. V having a 64-bit length is obtained by applying a 64-bit input/output function D( ) to U having a 64-bit length. W having a 64-bit length is calculated by performing an XOR operation on V having a 64-bit length and lower 64 bits ($KB_L$) of $KB_{6-\lceil NRB/6 \rceil+1-6i}$ ($1 \le i \le \lceil NRB/6 \rceil$). X having a 64-bit length is obtained by applying eight 8-bit input/output functions S( ) in parallel to W having a 64-bit length. Y having a 64-bit length is obtained by applying a 64-bit input/output function D( ) to X having a 64-bit length. Next, Z is obtained by selecting upper HR(Clen) bits of Y having a 64-bit length. Then, the decryption round function values ($C_L$, $C_R$) are output after $C_L = C_R$ and $C_R = C_L \oplus Z$ are set.

The above-described 2-1-th decryption round units 232 and 2-4-th decryption round units 235 are collectively designated as a 2-1-th decryption round unit in the accompanying claims (claim 17) of the present invention. The above-described 2-2-th decryption round units 233 and 2-5-th decryption round units 236 are collectively designated as a 2-2-th decryption round unit in the accompanying claims (claim 17) of the present invention. The above-described 2-3-th decryption round units 234 and 2-6-th decryption round units 237 are collectively designated as a 2-3-th decryption round unit in the accompanying claims (claim 17) of the present invention.

Figure 52:
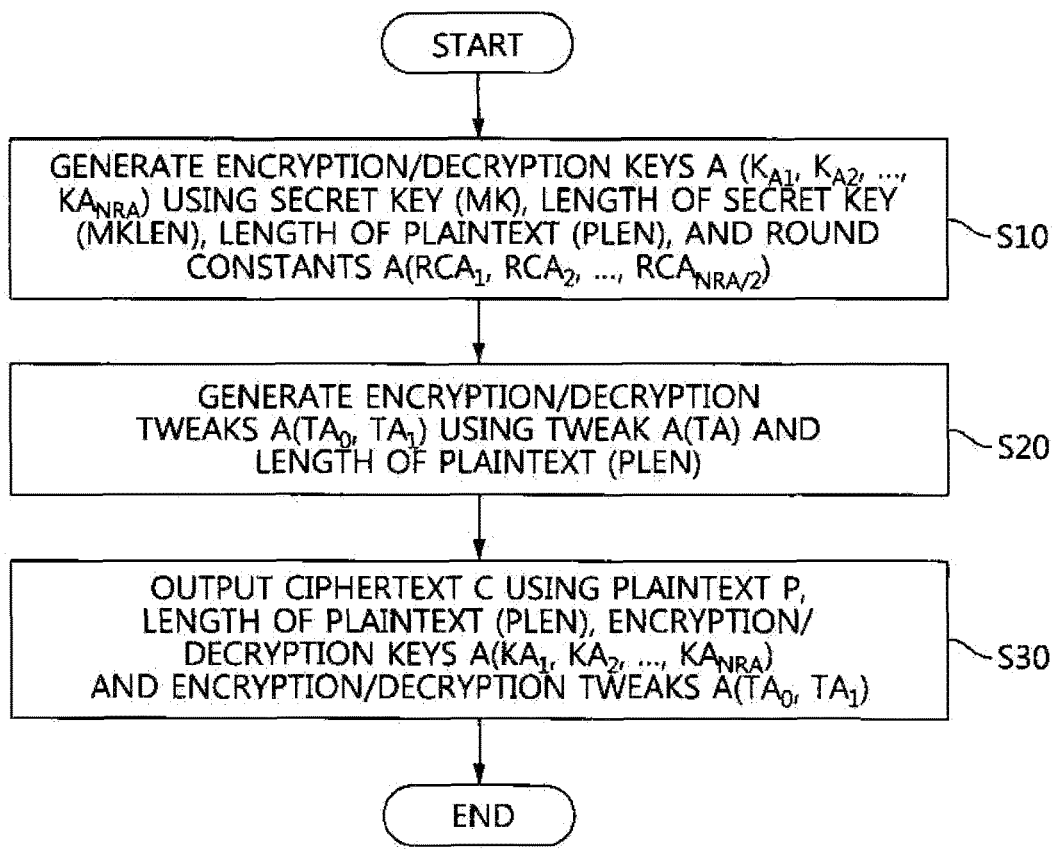
FIG. 52 is a flowchart showing an encryption method performed by the encryption device of the apparatus for providing a Feistel-based variable length block cipher, which receives a tweak having a fixed bit length, according to an embodiment of the present invention.

FIG. 52 is a flowchart showing an encryption method performed by the encryption device of the apparatus for providing a Feistel-based variable length block cipher, which receives a tweak having a fixed bit length, according to an embodiment of the present invention. For example, FIG. 52 may be regarded as an embodiment of an encryption method performed by the encryption device 10 of FIG. 1. Since the encryption method performed by the encryption device 10 has been described in detail with reference to FIG. 1, a brief description will be made to avoid repeated descriptions.

First, at step S10, the encryption/decryption key generation unit 20 of the encryption device 10 generates NRA encryption/decryption keys A ($KA_1$, $KA_2$, ..., $KA_{NRA}$), each having a 128-bit length, by using a secret key (MK), the length of the secret key (MKlen), the length of plaintext (Plen), and round constants $A(RCA_1, RCA_2, \ldots, RCA_{NRA/2})$. As described above, the secret key (MK) may have a 128, 192, or 256-bit length, and may be configured via a connection of sub-keys, each having an 8-bit length.

Further, the number of rounds (round number) A(NRA) may be preset to a suitable value according to the length of the secret key (MKlen) in consideration of the security of a Feistel-based variable length block cipher algorithm that receives a tweak having a fixed bit length.

Then, at step S20, the encryption/decryption tweak generation unit 30 receives tweak A(TA) and the length of plaintext (Plen), and generates encryption/decryption tweaks $A(TA_0, TA_1)$. Here, as described above, tweak A(TA) may have a 128-Plen-bit length.

At step S30, the ciphertext output unit 40 outputs ciphertext C having the same length as plaintext P using the plaintext P, the length of plaintext (Plen), the encryption/decryption keys $A(KA_1, KA_2, \ldots, KA_{NRA})$ and the encryption/decryption tweaks $A(TA_0, TA_1)$. In other words, the ciphertext output unit 40 may receive the plaintext P and the length of the plaintext (Plen), and output encryption round function values ($P_L$, $P_R$). Accordingly, the ciphertext output unit 40 may repeatedly perform a round for sequentially receiving the encryption round function values ($P_L$, $P_R$) output from a previous encryption round, the length of plaintext (Plen), the encryption/decryption tweak $A(TA_0)$, and the encryption/decryption keys $A(KA_1, KA_3, \ldots, KA_{NRA-1})$, and for outputting encryption round function values ($P_L$, $P_R$); and a round for sequentially receiving the encryption round function values ($P_L$, $P_R$) output from a previous encryption round, the length of plaintext (Plen), the encryption/decryption tweak $A(TA_1)$, and encryption/decryption keys $A(KA_2, KA_4, \ldots, KA_{NRA})$, and for outputting encryption round function values ($P_L$, $P_R$). Consequently, the ciphertext output unit 40 receives the encryption round function values ($P_L$, $P_R$) output from the previous encryption round and the length of plaintext (Plen), and finally outputs ciphertext C having the same length as the plaintext P.

Figure 53:
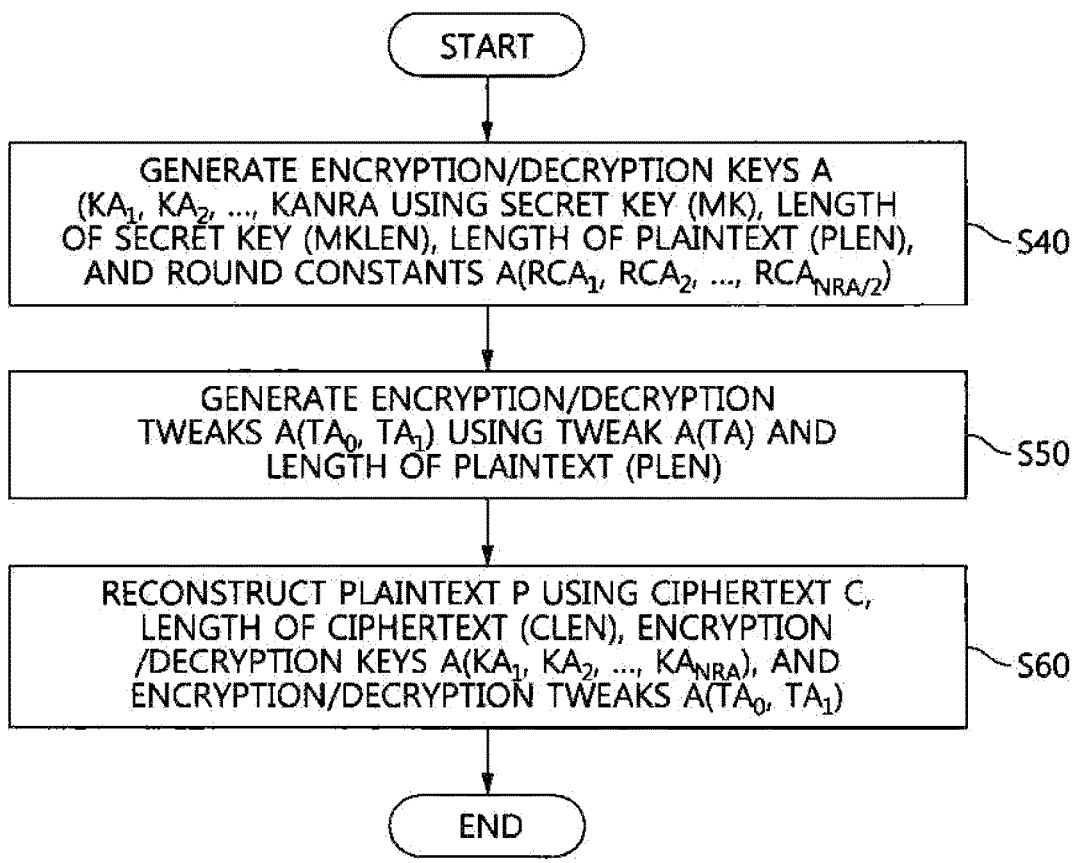
FIG. 53 is a flowchart showing a decryption method performed by the decryption device of the apparatus for providing a Feistel-based variable length block cipher, which receives a tweak having a fixed bit length, according to an embodiment of the present invention.

FIG. 53 is a flowchart showing a decryption method performed by the decryption device of the apparatus for providing a Feistel-based variable length block cipher, which receives a tweak having a fixed bit length, according to an embodiment of the present invention. FIG. 53 may be regarded as an embodiment of a decryption method performed by the decryption device 50 of FIG. 19. Since the decryption method performed by the decryption device 50 has been described in detail with reference to FIG. 19, a brief description will be made so as to avoid repeated descriptions.

First, at step S40, the encryption/decryption key generation unit 60 of the decryption device 50 generates NRA encryption/decryption keys $A(KA_1, KA_2, \ldots, KA_{NRA})$, each having a 128-bit length, by using a secret key (MK), the length of the secret key (MKlen), the length of plaintext (Plen), and round constants $A(RCA_1, RCA_2, \ldots, RCA_{NRA/2})$.

Next, at step S50, the encryption/decryption tweak generation unit 70 receives tweak A(TA) and the length of plaintext (Plen) and then generates encryption/decryption tweaks A ($TA_0$, $TA_1$).

Next, at step S60, the plaintext reconstruction unit 80 receives ciphertext C, the length of the ciphertext (Clen), the encryption/decryption keys $A(KA_1, KA_2, \ldots, KA_{NRA})$, and the encryption/decryption tweaks $A(TA_0, TA_1)$, and reconstructs plaintext P having the same length as the ciphertext C. In other words, the plaintext reconstruction unit 80 may receive the ciphertext C and the length of the ciphertext (Clen), and output the decryption round function values ($C_L$, $C_R$). Accordingly, the plaintext reconstruction unit 80 may repeatedly perform a round for sequentially receiving the decryption round function values ($C_L$, $C_R$) output from a previous decryption round, the length of ciphertext (Clen), the encryption/decryption tweak A(TA$_1$), and the encryption/decryption keys A(KA$_{NRA}$, KA$_{NRA-2}$, ..., KA$_2$) and for outputting the decryption round function values (C$_L$, C$_R$); and a round for sequentially receiving the decryption round function values (C$_L$, C$_R$) output from a previous decryption round, the length of ciphertext (Clen), the encryption/decryption tweak A(TA$_0$), and the encryption/decryption keys A(KA$_{NRA-1}$, KA$_{NRA-3}$, ..., KA$_1$) and for outputting the decryption round function values (C$_L$, C$_R$). Consequently, the plaintext reconstruction unit 80 may receive the decryption round function values (C$_L$, C$_R$) output from the previous decryption round and the length of ciphertext (Clen), and finally reconstruct plaintext P having the same length as the ciphertext C.

Figure 54:
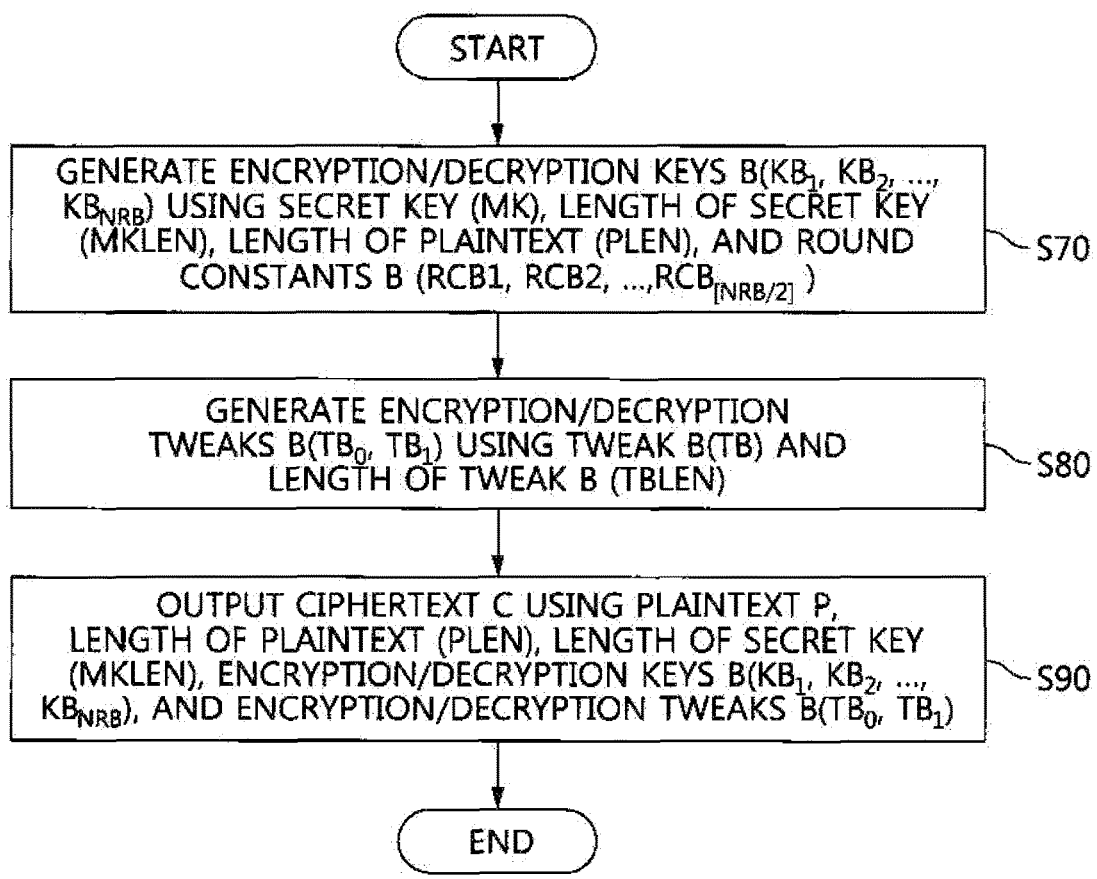
FIG. 54 is a flowchart showing an encryption method performed by the encryption device of the apparatus for providing a Feistel-based variable length block cipher, which receives a tweak having any bit length, according to an embodiment of the present invention.

FIG. 54 is a flowchart showing an encryption method performed by the encryption device of the apparatus for providing a Feistel-based variable length block cipher, which receives a tweak having any bit length, according to an embodiment of the present invention. For example, FIG. 54 may be regarded as an embodiment of an encryption method performed by the encryption device 100 of FIGS. 24 and 25. Since the encryption method performed by the encryption device 100 has been described in detail with reference to FIGS. 24 and 25, a brief description will be made to avoid repeated descriptions.

At step S70, the encryption/decryption key generation unit 110 of the encryption device 100 generates NRB encryption/decryption keys B(KB$_1$, KB$_2$, ..., KB$_{NRB}$), each having a 128-bit length, by using a secret key (MK), the length of the secret key (MKlen), the length of plaintext (Plen), and round constants B (RCB$_1$, RCB$_2$, ..., RCB$_{[NRB/2]}$). As described above, the secret key (MK) may have a 128, 192, or 256-bit length, and may be configured via a connection of sub-keys, each having an 8-bit length. Further, the number of rounds (round number B)(NRB) is preset to a suitable value according to the length of the secret key (MKlen) in consideration of the security of a Feistel-based variable length block cipher algorithm for receiving a tweak having any bit length.

Next, at step S80, the encryption/decryption tweak generation unit 120 receives the tweak B(TB) and the length of the tweak B (TBlen), and generates encryption/decryption tweaks B(TB$_0$, TB$_1$). As described above, the tweak B(TB) may have any bit length.

Thereafter, at step S90, the ciphertext output unit 130 outputs ciphertext C having the same length as the plaintext P using the plaintext P, the length of the plaintext (Plen), the length of the secret key (MKlen), encryption/decryption keys B(KB$_1$, KB$_2$, ..., KB$_{NRB}$), and the encryption/decryption tweaks B(TB$_0$, TB$_1$). In other words, the ciphertext output unit 130 may receive the plaintext P and the length of the plaintext (Plen), and output encryption round function values (P$_L$, P$_R$). Accordingly, the ciphertext output unit 130 may repeatedly perform a round for sequentially receiving encryption round function values (P$_L$, P$_R$) output from the previous encryption round, the length of plaintext (Plen), and encryption/decryption keys B(KB$_1$, KB$_7$, ..., KB$_{6-[NRB/6]-5}$) and for outputting encryption round function values (P$_L$, P$_R$); a round for sequentially receiving encryption round function values (P$_L$, P$_R$) output from a previous encryption round, the length of plaintext (Plen), the encryption/decryption tweak B(TB$_0$), and encryption/decryption keys B(KB$_2$, KB$_8$, ..., KB$_{6-[NRB/6]-4}$) and for outputting encryption round function values (P$_L$, P$_R$); a round for sequentially receiving encryption round function values (P$_L$, P$_R$) output from a previous encryption round, the length of plaintext (Plen), the encryption/decryption tweak B(TB$_1$), and encryption/decryption keys B(KB$_3$, KB$_9$, ..., KB$_{6-[NRB/6]-3}$) and for outputting encryption round function values (P$_L$, P$_R$); a round for sequentially receiving encryption round function values (P$_L$, P$_R$) output from a previous encryption round, the length of plaintext (Plen), and encryption/decryption keys B(KB$_4$, KB$_{10}$, ..., KB$_{6-[NRB/6]-2}$) and for outputting encryption round function values (P$_L$, P$_R$); a round for sequentially receiving encryption round function values (P$_L$, P$_R$) output from a previous encryption round, the length of plaintext (Plen), the encryption/decryption tweak B(TB$_0$) and encryption/decryption keys B(KB$_5$, KB$_{11}$, ..., KB$_{6-[NRB/6]-1}$) and for outputting encryption round function values (P$_L$, P$_R$); and a round for sequentially receiving encryption round function values (P$_L$, P$_R$) output from a previous encryption round, the length of plaintext (Plen), the encryption/decryption tweak B(TB$_1$), and encryption/decryption keys B(KB$_6$, KB$_{12}$, ..., KB$_{6-[NRB/6]}$) and for outputting encryption round function values (P$_L$, P$_R$). Consequently, the ciphertext output unit 130 may receive the encryption round function values (P$_L$, P$_R$) output from a previous encryption round, the length of the secret key (MKlen), and the length of plaintext (Plen) and finally output the ciphertext C having the same length as the plaintext P.

Figure 55:
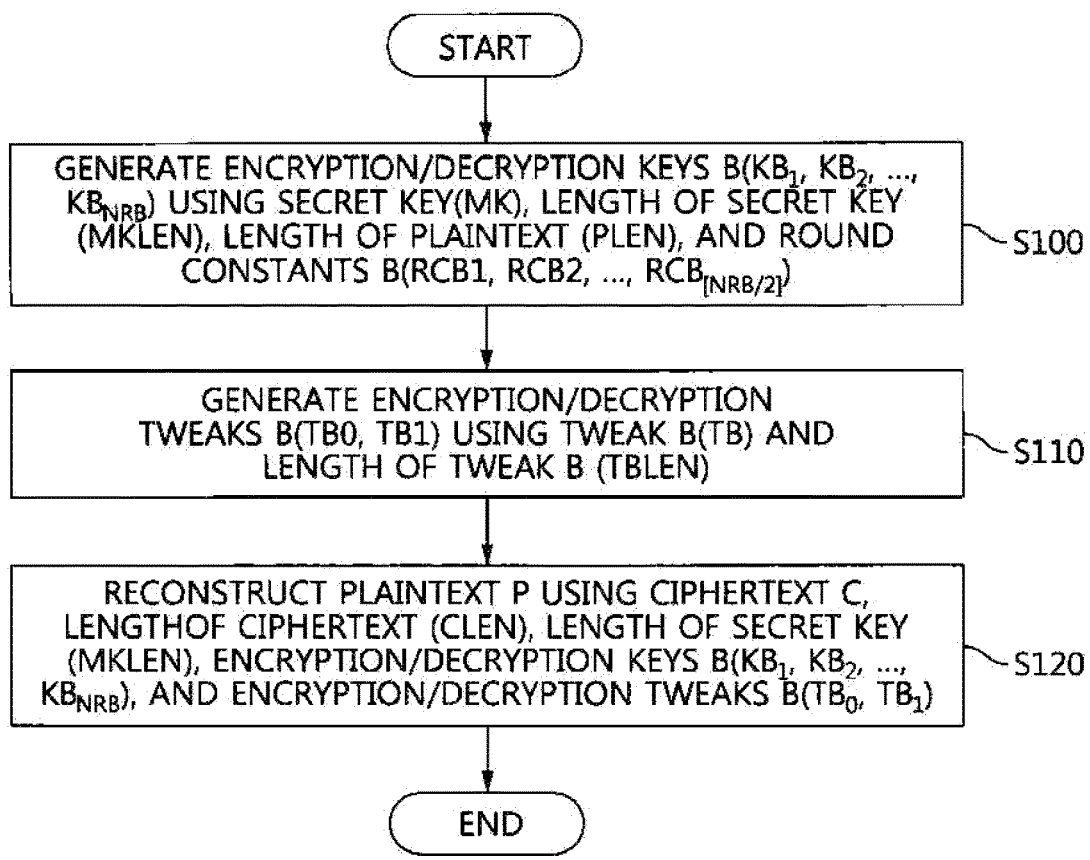
FIG. 55 is a flowchart showing a decryption method performed by the decryption device of the apparatus for providing a Feistel-based variable length block cipher, which receives a tweak having any bit length, according to an embodiment of the present invention.

FIG. 55 is a flowchart showing a decryption method performed by the decryption device of the apparatus for a Feistel-based variable length block cipher, which receives a tweak having any bit length, according to an embodiment of the present invention. FIG. 55 may be regarded as an embodiment of a decryption method performed by the decryption device 200 of FIGS. 42 and 43. Since the decryption method performed by the decryption device 200 has been described in detail with reference to FIGS. 42 and 43, a brief description will be made so as to avoid repeated descriptions.

First, at step S100, the encryption/decryption key generation unit 210 of the decryption device 200 generates NRB encryption/decryption keys B(KB$_1$, KB$_2$, ..., KB$_{NRB}$), each having a 128-bit length, by using a secret key (MK), the length of the secret key (MKlen), the length of plaintext (Plen) and round constants B(RCB$_1$, RCB$_2$, ..., RCB$_{[NRB/2]}$).

Then, at step S110, the encryption/decryption tweak generation unit 220 receives tweak B(TB) and the length of the tweak B (TBlen), and generates encryption/decryption tweaks B(TB$_0$, TB$_1$).

Next, at step S120, the plaintext reconstruction unit 230 receives ciphertext C, the length of the ciphertext (Clen), the length of the secret key (MKlen), encryption/decryption keys B(KB$_1$, KB$_2$, ..., KB$_{NRB}$), and the encryption/decryption tweaks B(TB$_0$, TB$_3$), and reconstructs plaintext P having the same length as the ciphertext C. In other words, the plaintext reconstruction unit 230 may receive the ciphertext C, the length of the ciphertext (Clen), and the length of the secret key (MKlen), and output decryption round function values (C$_L$, C$_R$). Accordingly, the plaintext reconstruction unit 230 may repeatedly perform a round for sequentially receiving decryption round function values (C$_L$, C$_R$) output from a previous decryption round, the length of ciphertext (Clen), the encryption/decryption tweak B(TB$_1$), and encryption/decryption keys B(KB$_{6-[NRB/6]}$, KB$_{6-[NRB/6]-6}$, ..., KB$_6$) and for outputting decryption round function values (C$_L$, C$_R$); a round for sequentially receiving decryption round function values (C$_L$, C$_R$) output from a previous decryption round, the length of ciphertext (Clen), the encryption/decryption tweak B(TB$_0$), and encryption/decryption keys $B(KB_{6-[NRB/6]-1}, KB_{6-[NRB/6]-7}, \ldots, KB_5)$ and for outputting the decryption round function values ($C_L$, $C_R$); a round for sequentially receiving decryption round function values ($C_L$, $C_R$) output from a previous decryption round, the length of ciphertext (Clen), and encryption/decryption keys $B(KB_{6-[NRB/6]-2}, KB_{6-[NRB/6]-8}, \ldots, KB_4)$ and for outputting decryption round function values ($C_L$, $C_R$); a round for sequentially receiving decryption round function values ($C_L$, $C_R$) output from a previous decryption round, the length of ciphertext (Clen), the encryption/decryption tweak $B(TB_1)$, and encryption/decryption keys $B(KB_{6-[NRB/6]-3}, KB_{6-[NRB/6]-9}, \ldots, KB_3)$ and for outputting decryption round function values ($C_L$, $C_R$); a round for sequentially receiving decryption round function values ($C_L$, $C_R$) output from a previous decryption round, the length of ciphertext (Clen), the encryption/decryption tweak $B(TB_0)$, and the encryption/decryption keys $B(KB_{6-[NRB/6]-4}, KB_{6-[NRB/6]-10}, \ldots, KB_2)$, and for outputting decryption round function values ($C_L$, $C_R$); and a round for sequentially receiving decryption round function values ($C_L$, $C_R$) output from a previous decryption round, the length of ciphertext (Clen), and encryption/decryption keys $B(KB_{6-[NRB/6]-5}, KB_{6-[NRB/6]-11}, \ldots, KB_1)$, and for outputting decryption round function values ($C_L$, $C_R$). Consequently, the plaintext reconstruction unit 230 receives the decryption round function values ($C_L$, $C_R$) output from the previous decryption round and the length of ciphertext (Clen), and finally reconstructs plaintext P having the same length as the ciphertext C.

Figure 56:
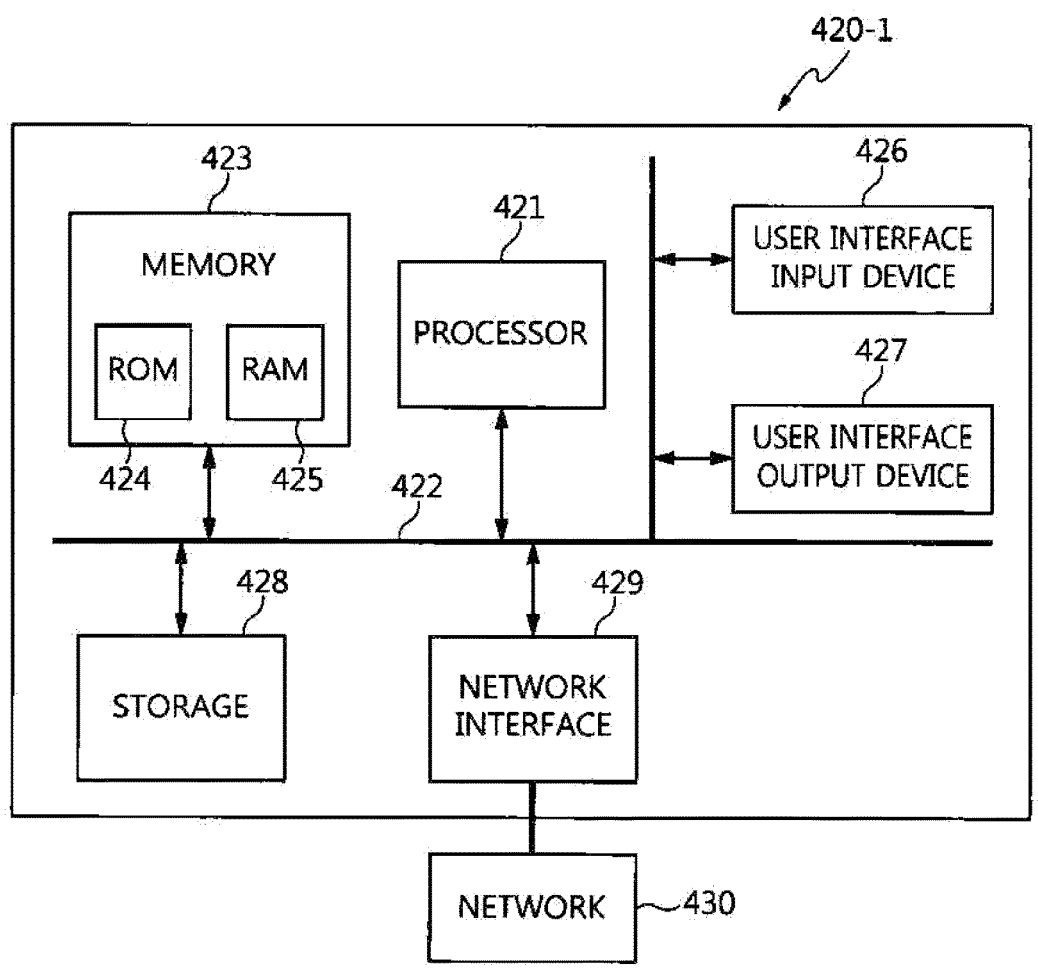
FIG. 56 is an embodiment of the present invention implemented in a computer system.

FIG. 56 is an embodiment of the present invention implemented in a computer system.

Referring to FIG. 56, an embodiment of the present invention may be implemented in a computer system, e.g., as a computer readable medium. As shown in in FIG. 56, a computer system 420-1 may include one or more of a processor 421, a memory 423, a user input device 426, a user output device 427, and a storage 428, each of which communicates through a bus 422. The computer system 420-1 may also include a network interface 429 that is coupled to a network 430. The processor 421 may be a central processing unit (CPU) or a semiconductor device that executes processing instructions stored in the memory 423 and/or the storage 428. The memory 423 and the storage 428 may include various forms of volatile or non-volatile storage media. For example, the memory may include a read-only memory (ROM) 424 and a random access memory (RAM) 425.

Accordingly, an embodiment of the invention may be implemented as a computer implemented method or as a non-transitory computer readable medium with computer executable instructions stored thereon. In an embodiment, when executed by the processor, the computer readable instructions may perform a method according to at least one aspect of the invention.

In accordance with the present invention having the above configuration, there is an advantage in that, for plaintext having a bit length ranging from 8 to 128, ciphertext having the same bit length as the plaintext may be promptly generated, and the ciphertext may be promptly reconstructed into plaintext.

Further, in accordance with the encryption/decryption apparatus and method for preserving the encoding format of data using a proposed variable length block cipher, there is an advantage in that, for plaintext having a specific encoding format, ciphertext having the same encoding format as the plaintext may be promptly generated, and the ciphertext may be promptly reconstructed into plaintext.

As described above, optimal embodiments of the present invention have been disclosed in the drawings and the specification. Although specific terms have been used in the present specification, these are merely intended to describe the present invention and are not intended to limit the meanings thereof or the scope of the present invention described in the accompanying claims. Therefore, those skilled in the art will appreciate that various modifications and other equivalent embodiments are possible from the embodiments. Therefore, the technical scope of the present invention should be defined by the technical spirit of the claims.

What is claimed is:

1. An apparatus for providing a Feistel-based variable length block cipher, comprising:
   a hardware processor;
   an encryption/decryption key generation device for generating a number of encryption/decryption keys corresponding to a preset number of rounds according to a length of a secret key, based on the secret key, the length of the secret key, a length of plaintext, and a round constant;
   an encryption/decryption tweak generation device for generating an encryption/decryption tweak based on a tweak, a length of the tweak, and the length of the plaintext; and
   a ciphertext output device for outputting ciphertext having a length identical to that of the plaintext, based on the plaintext, the length of the plaintext, the length of the secret key, the encryption/decryption keys, and the encryption/decryption tweak,
   wherein:
   the tweak has a fixed bit length, and
   the encryption/decryption tweak generation device generates the encryption/decryption tweak using the tweak and the length of the plaintext, among the weak, the length of the tweak, and the length of the plaintext, wherein the encryption/decryption tweak includes a first encryption/decryption tweak and a second encryption/decryption tweak,
   wherein the ciphertext output device comprises:
   a first encryption round device for outputting an encryption round function value based on the plaintext and the length of the plaintext;
   a 2-1-th encryption round device for outputting an encryption round function value based on an encryption round function value from a previous encryption round, the length of the plaintext, the first encryption/decryption tweak, and the encryption/decryption keys;
   a 2-2-th encryption round device for outputting an encryption round function value based on an encryption round function value from a previous encryption round, the length of the plaintext, the second encryption/decryption tweak, and the encryption/decryption keys; and
   a third encryption round device for outputting the ciphertext based on an encryption round function value from a previous encryption round and the length of the plaintext,
   wherein the encryption/decryption keys that are respectively input to the 2-1-th encryption round device and to the 2-2-th encryption round device are different from each other, and
   wherein when data having a specific encoding format is encrypted or decrypted using the variable length block cipher, the data having the same encoding format as the specific encoding format is generated.

2. The apparatus of claim 1,
wherein the secret key is configured via a connection of sub-keys, each having an 8-bit length, and has a length corresponding to any one of 128 bits, 192 bits, and 256 bits, and
wherein the encryption/decryption key generation device comprises:
a first encryption/decryption key generation round device for generating an encryption/decryption key generation round function value based on the secret key and the length of the secret key; and
a second encryption/decryption key generation round device for generating an encryption/decryption key generation round function value based on an encryption/decryption key generation round function value from a previous encryption/decryption key generation round, the length of the secret key, the length of the plaintext, and the round constant.

3. An apparatus for providing a Feistel-based variable length block cipher, comprising:
a hardware processor;
an encryption/decryption key generation device for generating a number of encryption/decryption keys corresponding to a preset number of rounds according to a length of a secret key, based on the secret key, the length of the secret key, a length of plaintext, and a round constant;
an encryption/decryption tweak generation device for generating an encryption/decryption tweak based on a tweak, a length of the tweak, and the length of the plaintext; and
a ciphertext output device for outputting ciphertext having a length identical to that of the plaintext, based on the plaintext, the length of the plaintext, the length of the secret key, the encryption/decryption keys, and the encryption/decryption tweak,
wherein:
the tweak has a variable bit length, and
the encryption/decryption tweak generation device generates the encryption/decryption tweak using the tweak and the length of the tweak, among the tweak, the length of the tweak, and the length of the plaintext, wherein the encryption/decryption tweak includes a first encryption/decryption tweak and a second encryption/decryption tweak,
wherein the ciphertext output device comprises:
a first encryption round device for outputting an encryption round function value based on the plaintext and the length of the plaintext;
a 2-1-th encryption round device for outputting an encryption round function value based on an encryption round function value from a previous encryption round, the length of the plaintext, and the encryption/decryption keys;
a 2-2-th encryption round device for outputting an encryption round function value based on an encryption round function value from a previous encryption round, the length of the plaintext, the first encryption/decryption tweak, and the encryption/decryption keys;
a 2-3-th encryption round device for outputting an encryption round function value based on an encryption round function value from a previous encryption round, the length of the plaintext, the second encryption/decryption tweak, and the encryption/decryption keys; and
a third encryption round device for outputting, the ciphertext based on an encryption round function value from a previous encryption round, the length of the secret key, and the length of the plaintext,
wherein the encryption/decryption keys that are respectively input to the 2-1-th encryption round device, the 2-2-th encryption round device, and the 2-3-th encryption round device are different from each other, and
wherein when data having a specific encoding format is encrypted or decrypted using the variable length block cipher, the data having the same encoding format as the specific encoding format is generated.

4. A computer-implemented method using a hardware processor for providing a Feistel-based variable length block cipher, the method comprising:
generating, by an encryption/decryption key generation device, a number of encryption/decryption keys corresponding to a preset number of rounds according to a length of a secret key, based on the secret key, the length of the secret key, a length of plaintext, and a round constant;
generating, by an encryption/decryption tweak generation device, an encryption/decryption tweak based on a tweak, a length of the tweak, and the length of the plaintext; and
outputting by using the hardware processor, by a ciphertext output device, ciphertext having a length identical to that of the plaintext, based on the plaintext, the length of the plaintext, the length of the secret key, the encryption/decryption keys, and the encryption/decryption tweak,
wherein:
the tweak has a variable bit length, and
generating the encryption/decryption tweak comprises generating the encryption/decryption tweak using the tweak and the length of the tweak, among the tweak, the length of the tweak, and the length of the plaintext, wherein the encryption/decryption tweak includes a first encryption/decryption tweak and a second encryption/decryption tweak,
wherein outputting the ciphertext comprises:
outputting an encryption round function value based on the plaintext and the length of the plaintext;
outputting an encryption round function value based on an encryption round function value from a previous encryption round, the length of the plaintext, and the encryption/decryption keys;
outputting an encryption round function value based on an encryption round function value from a previous encryption round, the length of the plaintext, the first encryption/decryption tweak, and the encryption/decryption keys;
outputting an encryption round function value based on an encryption round function value from a previous encryption round, the length of the plaintext, the second encryption/decryption tweak, and the encryption/decryption keys; and
outputting the ciphertext based on an encryption round function value from a previous encryption round, the length of the secret key, and the length of the plaintext,
wherein the encryption/decryption keys in outputting the encryption round function value based on the encryption round function value from the previous encryption round, the length of the plaintext, and the encryption/decryption keys; the encryption/decryption keys in outputting the encryption round function value based on the encryption round function value from the previous encryption round, the length of the plaintext, the first encryption/decryption tweak, and the encryption/ decryption keys; and the encryption/decryption keys in outputting the encryption round function value based on the encryption round function value from the previous encryption round, the length of the plaintext, the second encryption/decryption tweak, and the encryption/decryption keys, are different from each other, and wherein when data having a specific encoding format is encrypted or decrypted using the variable length block cipher, the data having the same encoding format as the specific encoding format is generated.

5. The method of claim 4, wherein the secret key is configured via a connection of sub-keys, each having an 8-bit length, and has a length corresponding to any one of 128 bits, 192 bits, and 256 bits, and wherein generating the encryption/decryption keys comprises:

generating an encryption/decryption key generation round function value based on the secret key and the length of the secret key; and generating an encryption/decryption key generation round function value based on an encryption/decryption key generation round function value from a previous encryption/decryption key generation round, the length of the secret key, the length of the plaintext, and the round constant.

6. A computer-implemented method using a hardware processor for providing a Feistel-based variable length block cipher, the method comprising:

generating, by an encryption/decryption key generation device, a number of encryption/decryption keys corresponding to a preset number of rounds according to a length of a secret key, based on the secret key, the length of the secret key, a length of plaintext, and a round constant;

generating, by an encryption/decryption tweak generation device, an encryption/decryption tweak based on a tweak, a length of the tweak, and the length of the plaintext; and outputting by using the hardware processor, by a ciphertext output device, ciphertext having a length identical to that of the plaintext, based on the plaintext, the length of the plaintext, the length of the secret key, the encryption/decryption keys, and the encryption/decryption tweak, wherein:

the tweak has a fixed bit length, and generating the encryption/decryption tweak comprises generating the encryption/decryption tweak using the tweak and the length of the plaintext, among the tweak, the length of the tweak, and the length of the plaintext, wherein the encryption/decryption tweak includes a first encryption/decryption tweak and a second encryption/decryption tweak, wherein outputting the ciphertext comprises:

outputting an encryption round function value based on the plaintext and the length of the plaintext;

outputting an encryption round function value based on an encryption round function value from a previous encryption round, the length of the plaintext, the first encryption/decryption tweak, and the encryption/decryption keys;

outputting an encryption round function value based on an encryption round function value from a previous encryption round, the length of the plaintext, the second encryption/decryption tweak, and the encryption/decryption keys; and outputting the ciphertext based on an encryption round function value from a previous encryption round and the length of the plaintext, wherein the encryption/decryption keys in outputting the encryption round function value based on the encryption round function value from the previous encryption round, the length of the plaintext, the first encryption/decryption tweak, and the encryption/decryption keys, and the encryption/decryption keys in outputting the encryption round function value based on the encryption round function value from the previous encryption round, the length of the plaintext, the second encryption/decryption tweak, and the encryption/decryption keys, are different from each other, and wherein when data having a specific encoding format is encrypted or decrypted using the variable length block cipher, the data having the same encoding format as the specific encoding format is generated.

7. An apparatus for providing a Feistel-based variable length block cipher, comprising:

a hardware processor;

an encryption/decryption key generation device for generating a number of encryption/decryption keys corresponding to a preset number of rounds according to a length of a secret key, based on the secret key, the length of the secret key, a length of plaintext, and a round constant;

an encryption/decryption tweak generation device for generating an encryption/decryption tweak based on a tweak, a length of the tweak, and the length of the plaintext; and a plaintext reconstruction device for reconstructing plaintext having a length identical to that of ciphertext, based on the ciphertext, a length of the ciphertext, the length of the secret key, the encryption/decryption keys, and the encryption/decryption tweak, wherein:

the tweak has a fixed bit length, and the encryption/decryption tweak generation device generates the encryption/decryption tweak using the tweak and the length of the plaintext, among the tweak, the length of the tweak, and the length of the plaintext, wherein the encryption/decryption tweak includes a first encryption/decryption tweak and a second encryption/decryption tweak, wherein the plaintext reconstruction device comprises:

a first decryption round device for outputting a decryption round function value based on the ciphertext and the length of the ciphertext;

a 2-1-th decryption round device for, outputting a decryption round function value based on a decryption round function value from a previous decryption round, the length of the ciphertext, the second encryption/decryption tweak, and the encryption/decryption keys;

a 2-2-th decryption round device for outputting a decryption round function value based on a decryption round function value from a previous decryption round, the length of the ciphertext, the first encryption/decryption tweak, and the encryption/decryption keys; and a third decryption round device for outputting the plaintext based on a decryption round function value from a previous decryption round and the length of the ciphertext, wherein the encryption/decryption keys that are respectively input to the 2-1-th decryption round device and, to the 2-2-th decryption round device are different from each other, and wherein when data having a specific encoding format is encrypted or decrypted using the variable length block cipher, the data having the same encoding format as the specific encoding format is generated.

8. An apparatus for providing a Feistel-based variable length block cipher, comprising:
a hardware processor;
an encryption/decryption key generation device for generating a number of encryption/decryption keys corresponding to a preset number of rounds according to a length of a secret key, based on the secret key, the length of the secret key, a length of plaintext, and a round constant;
an encryption/decryption tweak generation device for generating an encryption/decryption tweak based on a tweak, a length of the tweak, and the length of the plaintext; and
a plaintext reconstruction device for reconstructing plaintext having a length identical to that of ciphertext, based on the ciphertext, a length of the ciphertext, the length of the secret key, the encryption/decryption keys, and the encryption/decryption tweak,
wherein:
the tweak has a variable bit length, and
the encryption/decryption tweak generation device generates the encryption/decryption tweak using the tweak and the length of the tweak, among the tweak, the length of the tweak, and the length of the plaintext, wherein the encryption/decryption tweak includes a first encryption/decryption tweak and a second encryption/decryption tweak, wherein the plaintext reconstruction device comprises:
a first decryption round device for outputting a decryption round function value based on the ciphertext, the length of the ciphertext, and the length of the secret key;
a 2-1-th decryption round device for outputting a decryption round function value based on a decryption round function value from a previous decryption round, the length of the ciphertext, the second encryption/decryption tweak, and the encryption/decryption keys;
a 2-2-th decryption round device for outputting a decryption round function value based on a decryption round function value from a previous decryption round, the length of the ciphertext, the first encryption/decryption tweak, and the encryption/decryption keys;
a 2-3-th decryption round device for outputting a decryption round function value based on a decryption round function value from a previous decryption round, the length of the ciphertext, and the encryption/decryption keys; and
a third decryption round device for outputting the plaintext based on a decryption round function value from a previous decryption round and the length of the ciphertext,
wherein the encryption/decryption keys that are respectively input to the 2-1-th decryption round device, the 2-2-th decryption round device, and the 2-3-th decryption round device are different from each other, and
wherein when data having a specific encoding format is encrypted or decrypted using the variable length block cipher, the data having the same encoding format as the specific encoding format is generated.

* * * * *